United States Patent
Ghetti et al.

(10) Patent No.: US 9,614,670 B1
(45) Date of Patent: Apr. 4, 2017

(54) SYSTEMS AND METHODS FOR ENCRYPTION AND PROVISION OF INFORMATION SECURITY USING PLATFORM SERVICES

(71) Applicant: Ionic Security, Inc., Atlanta, GA (US)

(72) Inventors: Adam Ghetti, Atlanta, GA (US); James Jordan, Roswell, GA (US); Kenneth Silva, Round Hill, VA (US); Jeremy Eckman, Annapolis, MD (US); Robert McColl, Atlanta, GA (US); Ryan Speers, Silver Spring, MD (US)

(73) Assignee: Ionic Security Inc., Atlanta, GA (US)

( * ) Notice: Subject to any disclaimer, the term of this patent is extended or adjusted under 35 U.S.C. 154(b) by 0 days.

(21) Appl. No.: 15/017,255

(22) Filed: Feb. 5, 2016

Related U.S. Application Data

(60) Provisional application No. 62/112,638, filed on Feb. 5, 2015.

(51) Int. Cl.
  *H04L 9/32* (2006.01)
  *H04L 9/08* (2006.01)
  *H04L 29/06* (2006.01)

(52) U.S. Cl.
  CPC .......... *H04L 9/083* (2013.01); *H04L 63/0428* (2013.01); *H04L 63/0815* (2013.01)

(58) Field of Classification Search
  CPC .. H04L 9/083; H04L 63/0428; H04L 63/0815
  USPC ........................................................ 713/168
  See application file for complete search history.

(56) References Cited

U.S. PATENT DOCUMENTS

| | | | |
|---|---|---|---|
| 5,915,025 | A | 6/1999 | Taguchi et al. |
| 5,963,646 | A | 10/1999 | Fielder et al. |
| 6,565,609 | B1 | 5/2003 | Sorge et al. |
| 6,904,521 | B1 | 6/2005 | Jivsov |
| 7,636,439 | B2 | 12/2009 | Nakabayashi et al. |
| 8,495,709 | B1 | 7/2013 | Cooper et al. |
| 9,058,495 | B2 | 6/2015 | Brannon et al. |
| 9,224,000 | B1 | 12/2015 | Ghetti |
| 2002/0031225 | A1 | 3/2002 | Hines |
| 2004/0073617 | A1 | 4/2004 | Milliken et al. |

(Continued)

OTHER PUBLICATIONS

Constantino, et al., "Towards Enforcing On-The-Fly Policies in BYOD Environments", Information Assurance and Security (IAS), 2013 9th International Conference, IEEE, 2013.

*Primary Examiner* — Mohammad W Reza
(74) *Attorney, Agent, or Firm* — Morris, Manning & Martin, LLP; Daniel E. Sineway, Esq.; R. Lee Strasburger, Jr., Esq.

(57) ABSTRACT

Systems and methods for securing or encrypting data or other information arising from a user's interaction with software and/or hardware, resulting in transformation of original data into ciphertext. Generally, the ciphertext is generated using context-based keys that depend on the environment in which the original data originated and/or was accessed. The ciphertext can be stored in a user's storage device or in an enterprise database (e.g., at-rest encryption) or shared with other users (e.g., cryptographic communication). The system generally allows for secure federation across organizations, including mechanisms to ensure that the system itself and any other actor with pervasive access to the network cannot compromise the confidentially of the protected data.

30 Claims, 20 Drawing Sheets

OVERVIEW OF FULLY AUTONOMOUS FEDERATED SECURITY SYSTEM

(56) References Cited

U.S. PATENT DOCUMENTS

| | | |
|---|---|---|
| 2004/0098348 A1 | 5/2004 | Kawasaki et al. |
| 2004/0101141 A1 | 5/2004 | Alve |
| 2004/0151323 A1 | 8/2004 | Olkin et al. |
| 2005/0071280 A1 | 3/2005 | Irwin et al. |
| 2006/0010324 A1 | 1/2006 | Appenzeller et al. |
| 2007/0174613 A1 | 7/2007 | Paddon et al. |
| 2007/0219915 A1 | 9/2007 | Hatano et al. |
| 2007/0271459 A1 | 11/2007 | Gomez |
| 2008/0046718 A1 | 2/2008 | Grab et al. |
| 2008/0077806 A1 | 3/2008 | Cui et al. |
| 2008/0130902 A1* | 6/2008 | Foo Kune ............ H04L 63/062 380/286 |
| 2009/0296926 A1 | 12/2009 | Perlman |
| 2010/0005509 A1 | 1/2010 | Peckover |
| 2010/0042838 A1 | 2/2010 | Ho |
| 2010/0095127 A1* | 4/2010 | Banerjee ............ H04L 63/0428 713/179 |
| 2012/0185612 A1 | 7/2012 | Zhang et al. |
| 2013/0024688 A1* | 1/2013 | Wen .................... H04L 63/0807 713/168 |
| 2013/0097421 A1 | 4/2013 | Lim |
| 2013/0298202 A1 | 11/2013 | Warshavsky et al. |
| 2014/0025786 A1 | 1/2014 | Gage |
| 2014/0215590 A1 | 7/2014 | Brand |
| 2014/0337930 A1 | 11/2014 | Hoyos et al. |
| 2015/0101012 A1 | 4/2015 | White et al. |
| 2015/0200958 A1 | 7/2015 | Muppidi et al. |

* cited by examiner

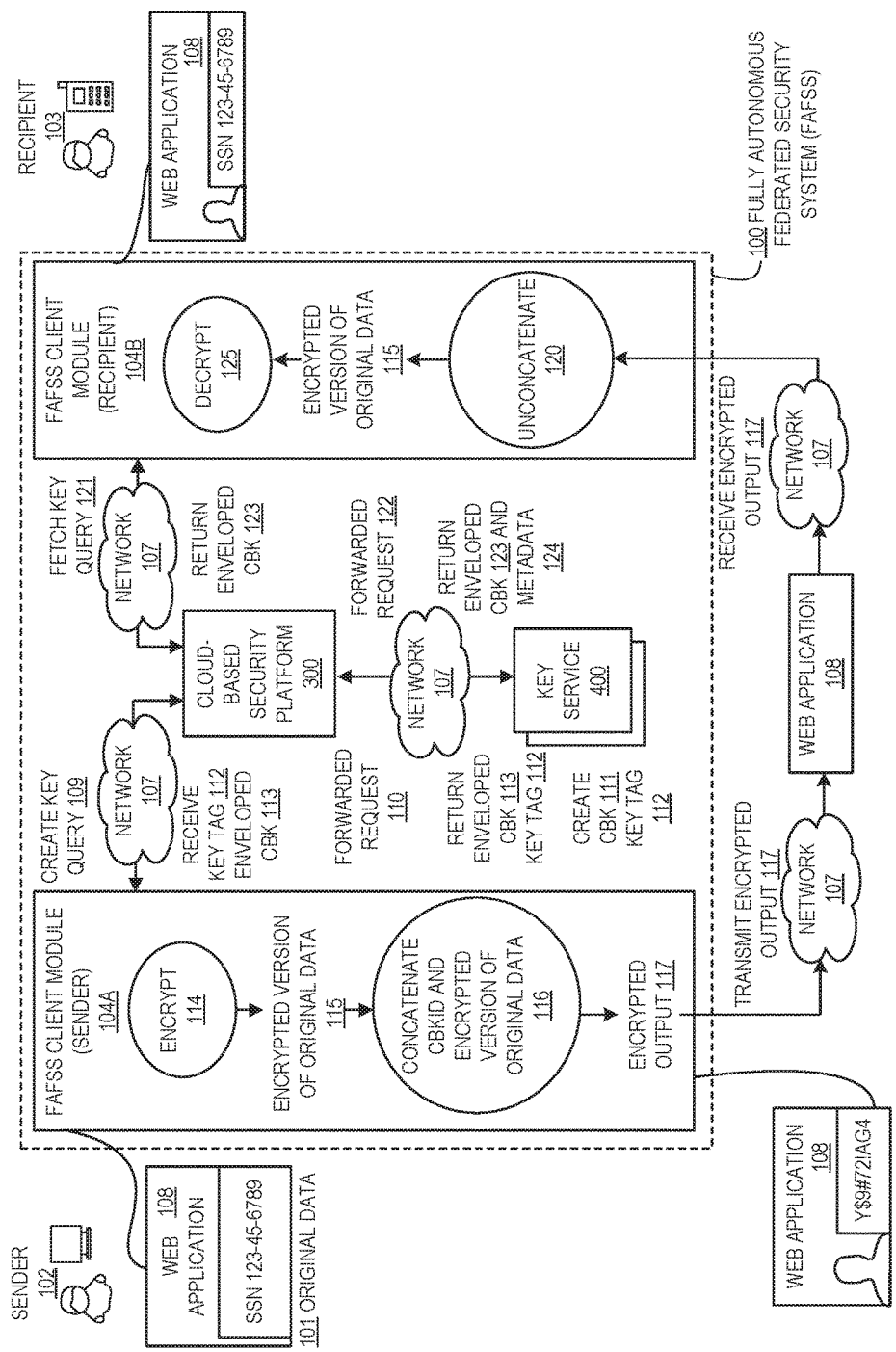
FIG. 1: OVERVIEW OF FULLY AUTONOMOUS FEDERATED SECURITY SYSTEM

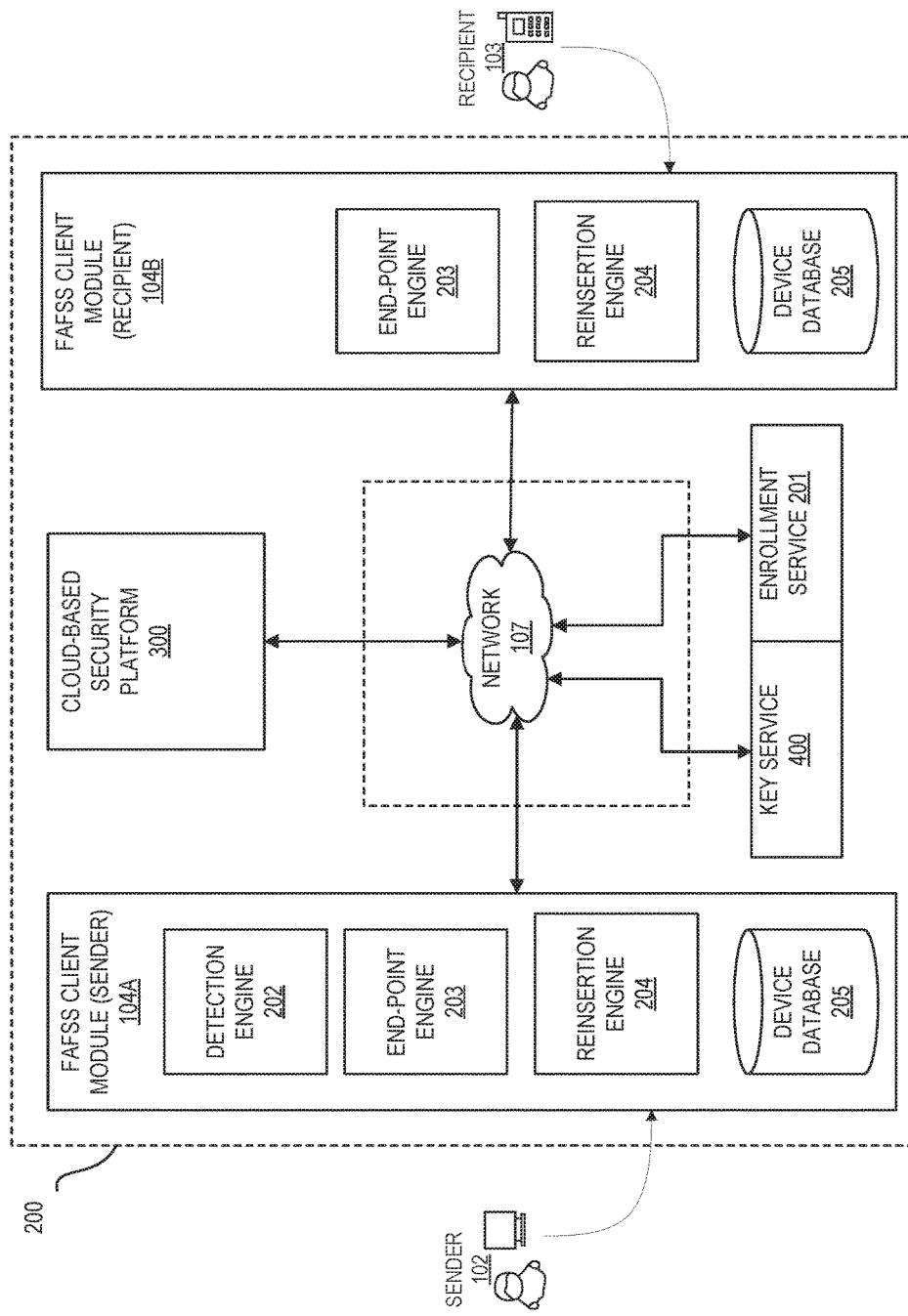
FIG. 2: EXEMPLARY SYSTEM ARCHITECTURE

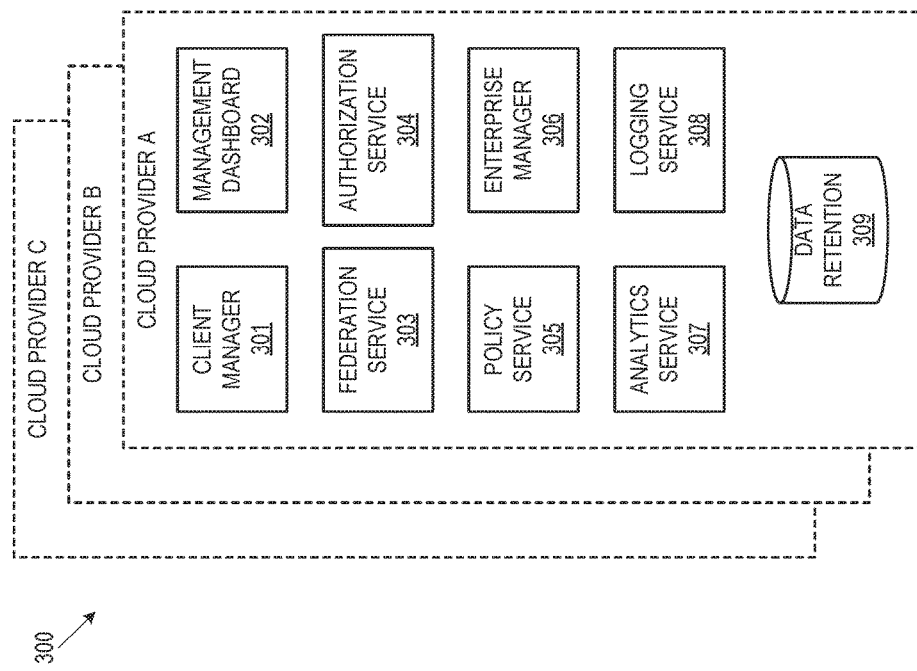
FIG. 3: EXEMPLARY CLOUD-BASED SERVICE PLATFORM ARCHITECTURE

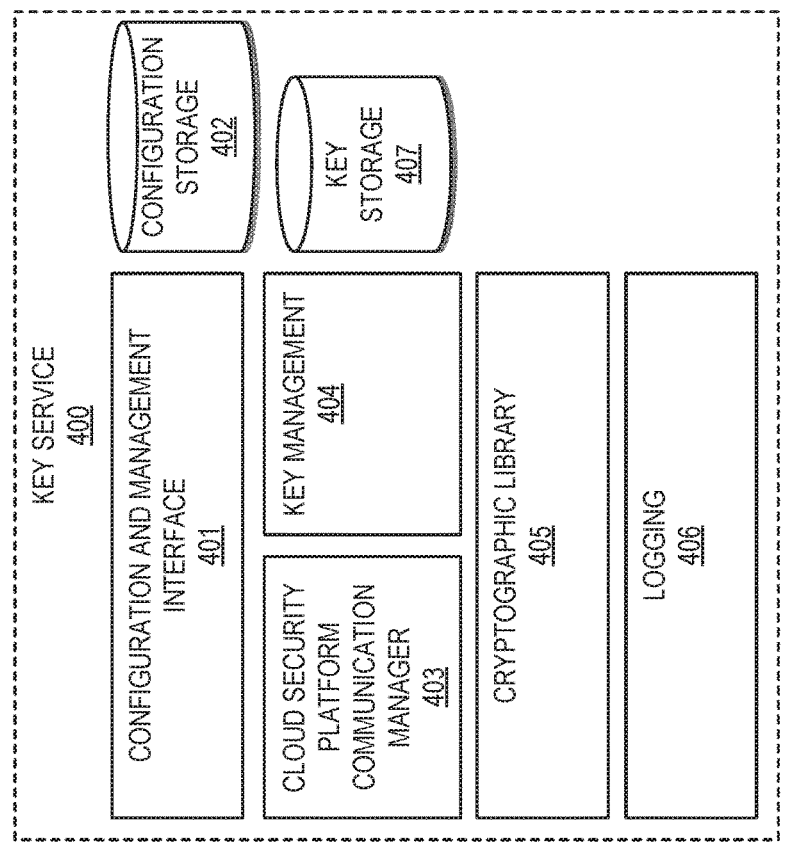
FIG. 4: EXEMPLARY KEY SERVICE ARCHITECTURE

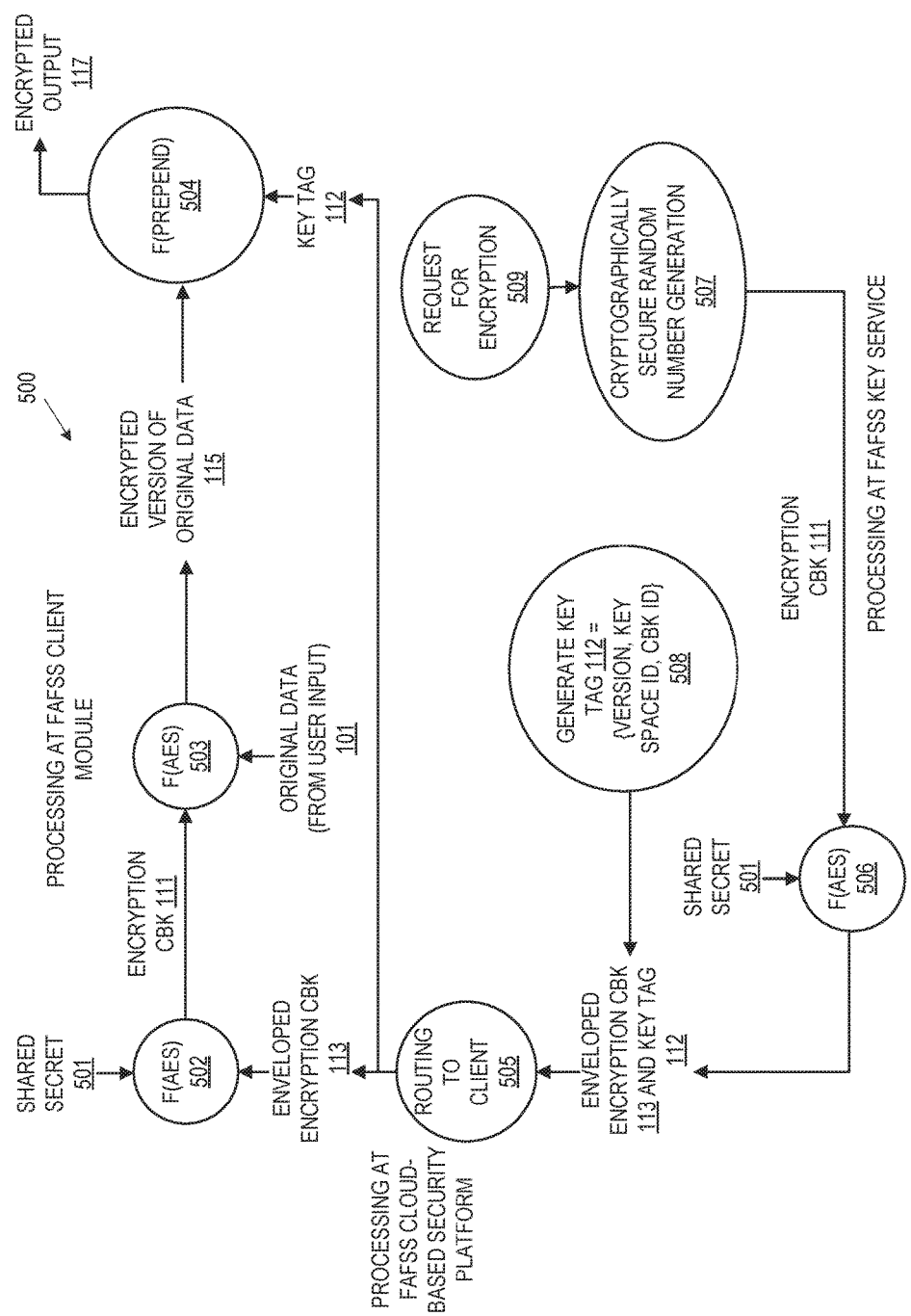
FIG. 5: EXEMPLARY SCHEMA SHOWING ENCRYPTION INCLUDING INTERMEDIATE STEPS AND DATA

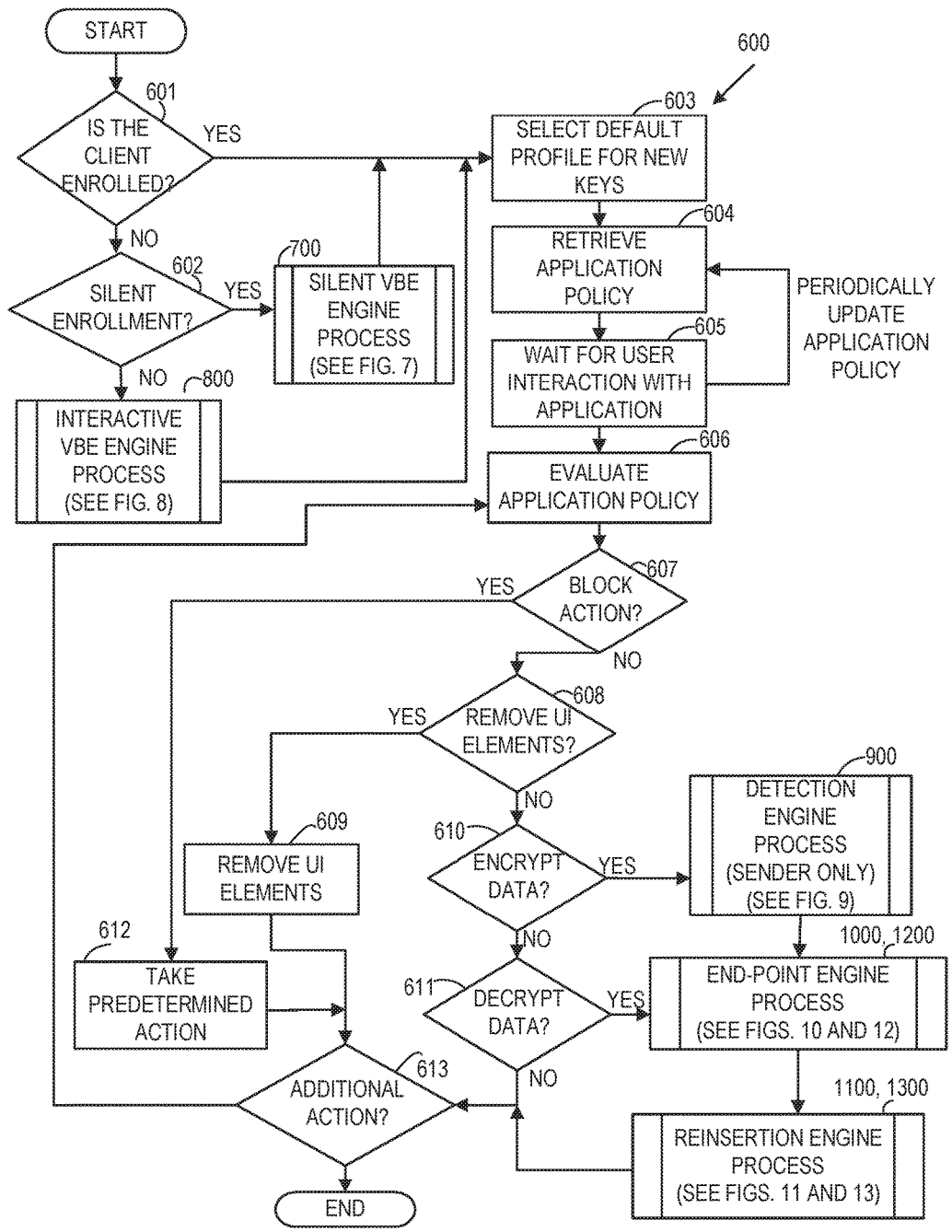
FIG. 6: EXEMPLARY CLIENT MODULE PROCESS

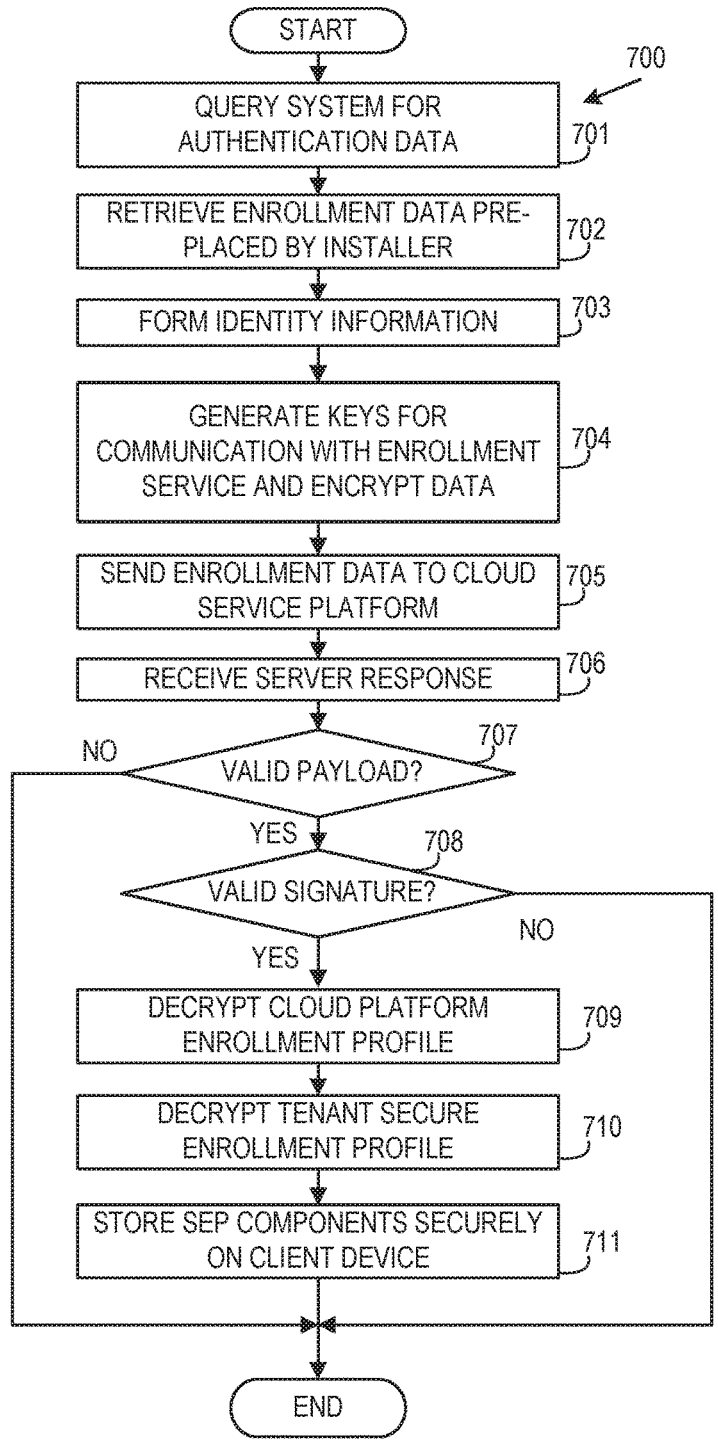
FIG. 7: EXEMPLARY SILENT VBE ENGINE PROCESS

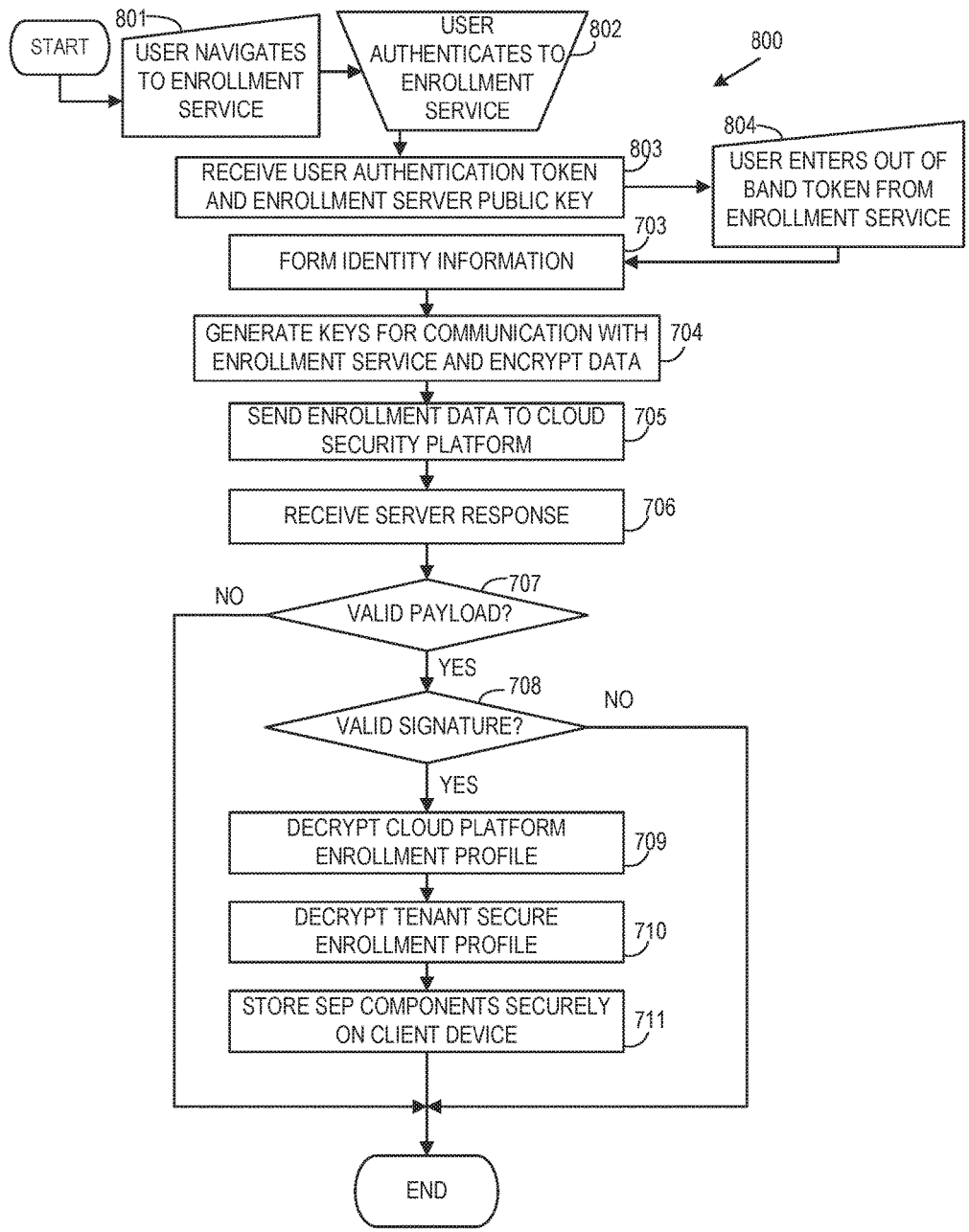
FIG. 8: EXEMPLARY INTERACTIVE VBE ENGINE PROCESS

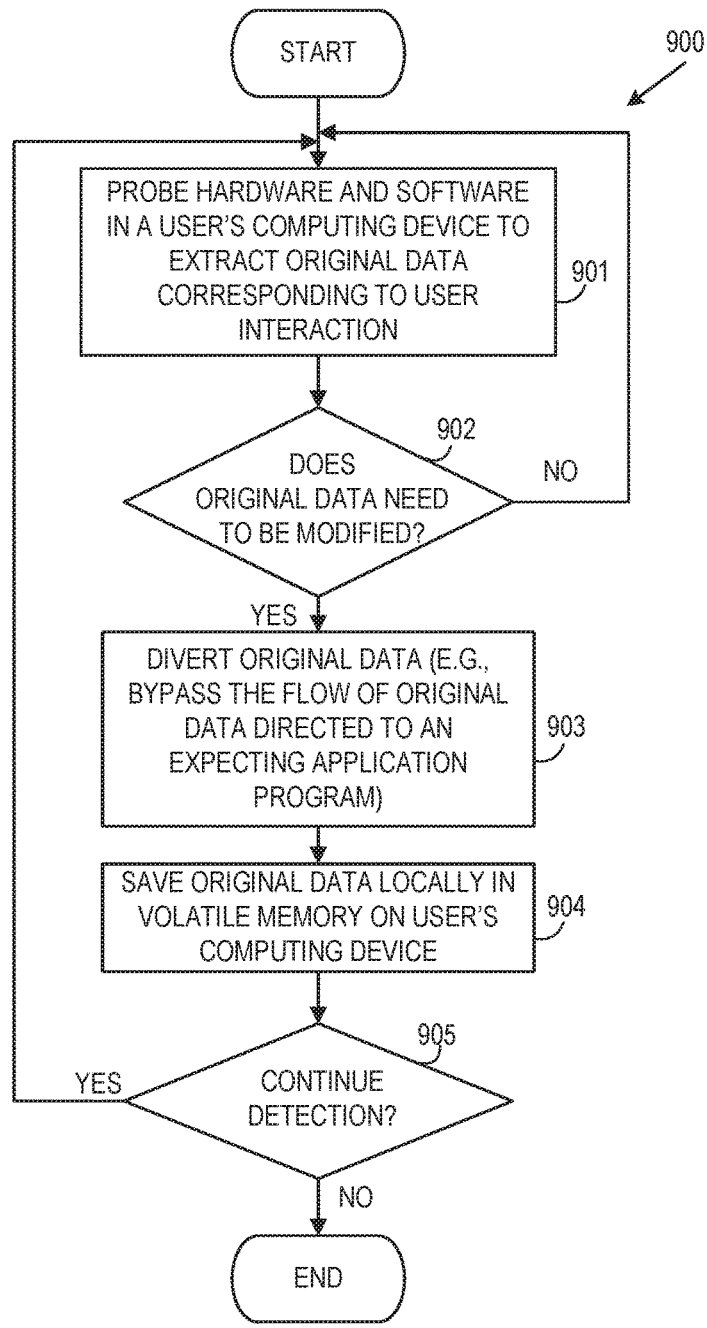
FIG. 9: EXEMPLARY DETECTION ENGINE PROCESS
(SENDER'S PERSPECTIVE)

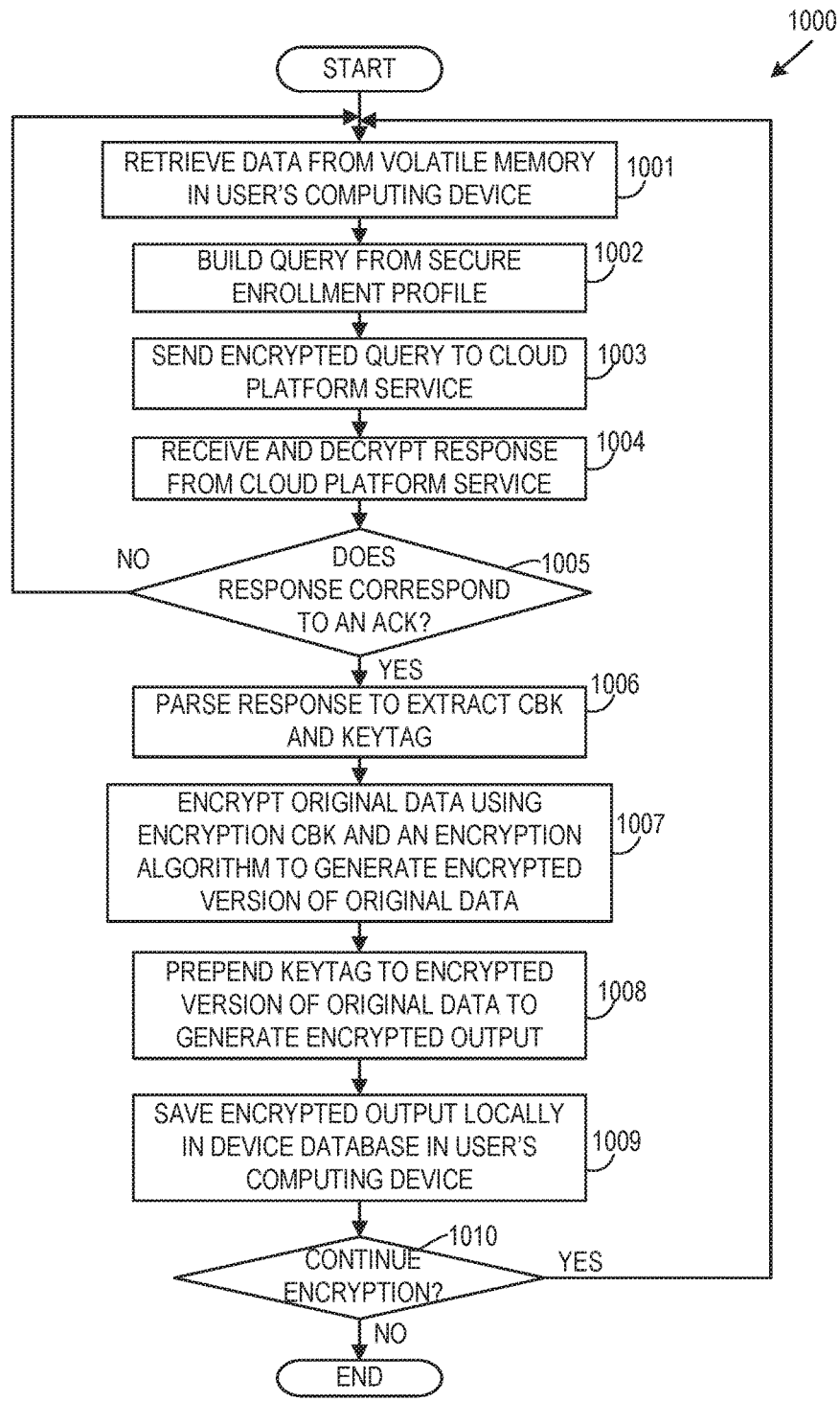
FIG. 10: EXEMPLARY ENDPOINT ENGINE PROCESS (SENDER'S PERSPECTIVE)

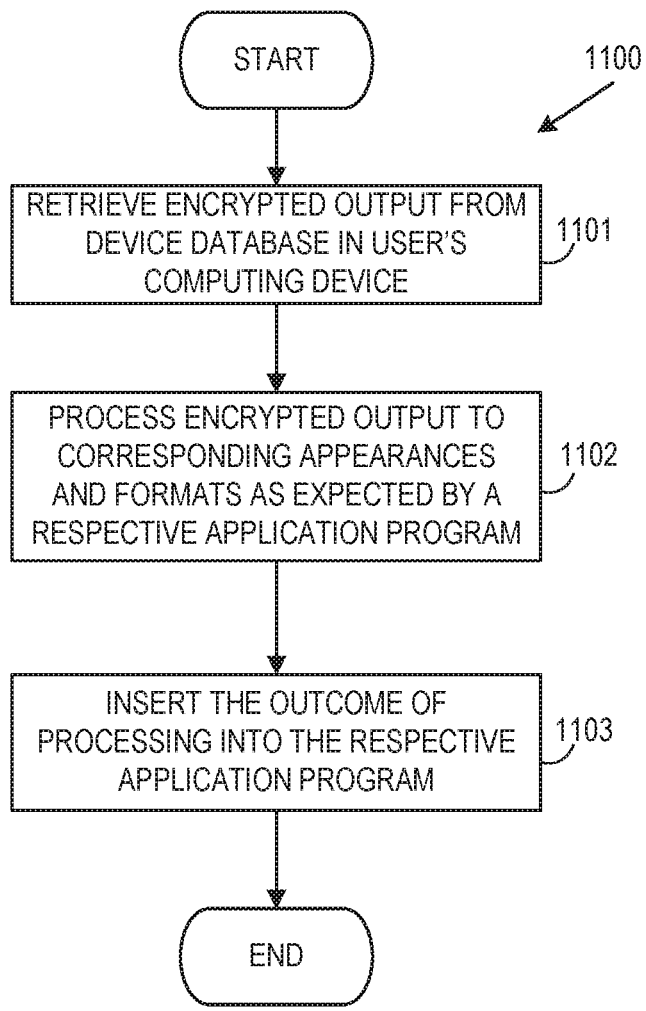
FIG. 11: EXEMPLARY REINSERTION ENGINE PROCESS (SENDER'S PERSPECTIVE)

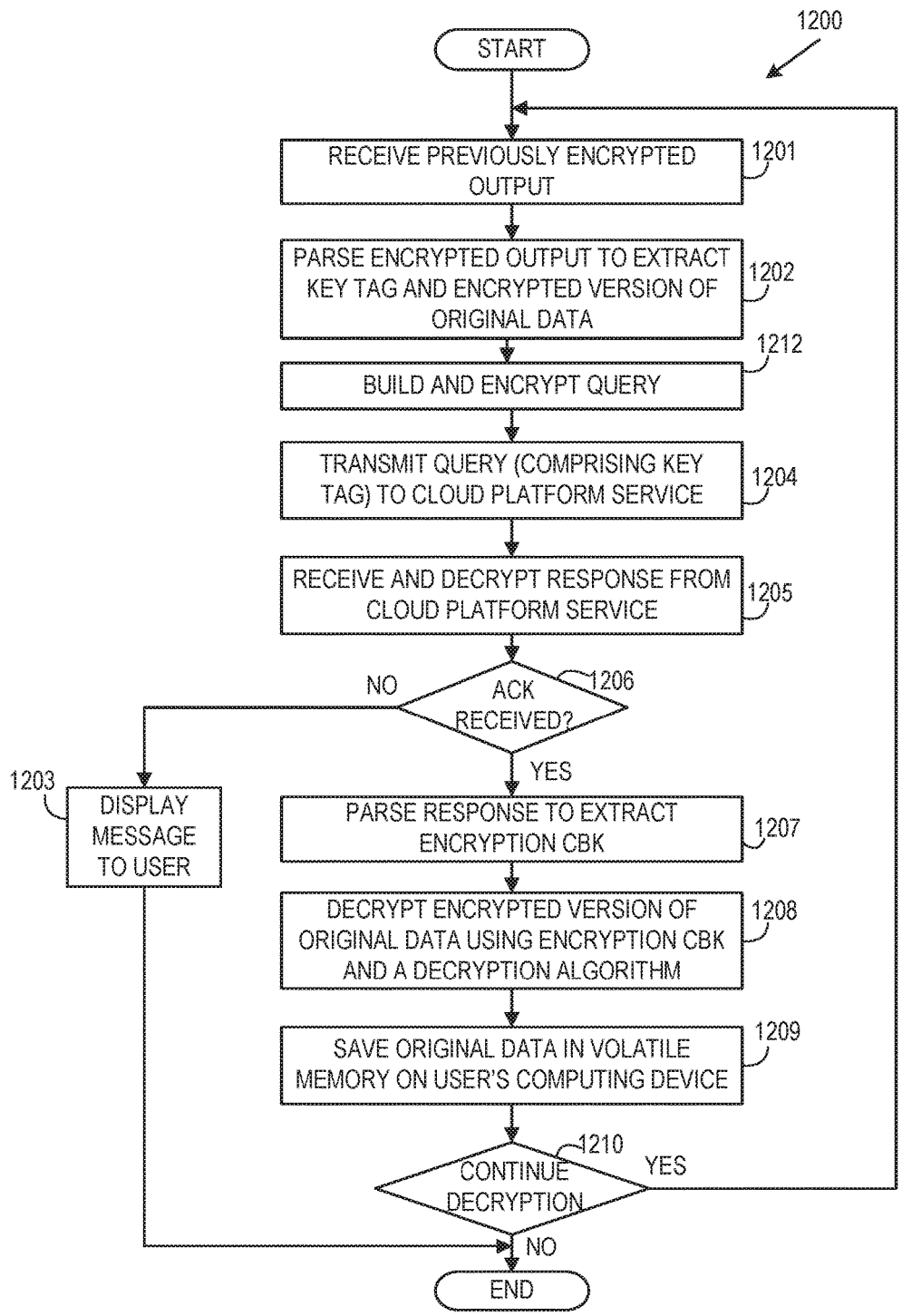
FIG. 12: EXEMPLARY ENDPOINT ENGINE PROCESS
(RECIPIENT'S PERSPECTIVE)

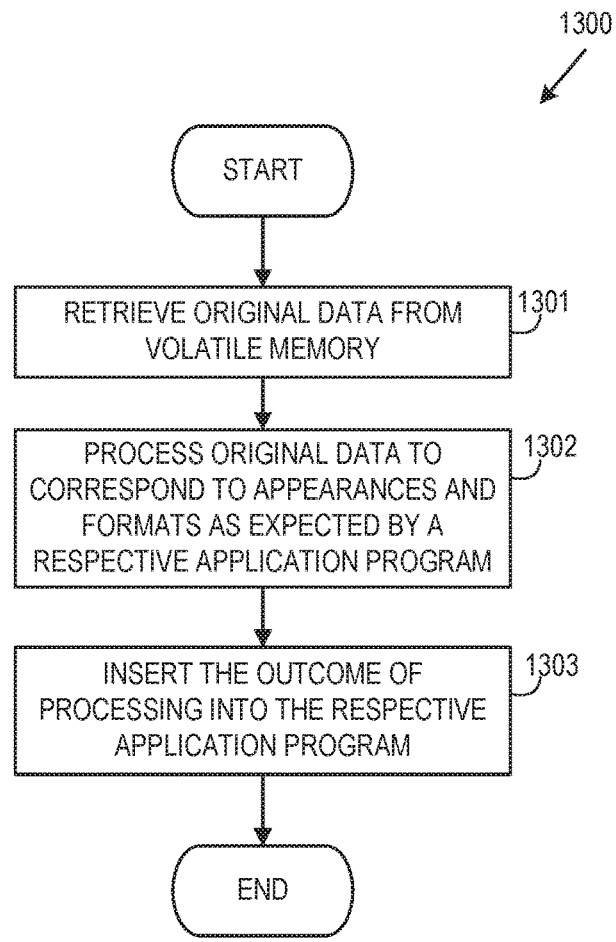
FIG. 13: EXEMPLARY REINSERTION ENGINE PROCESS
(RECIPIENT'S PERSPECTIVE)

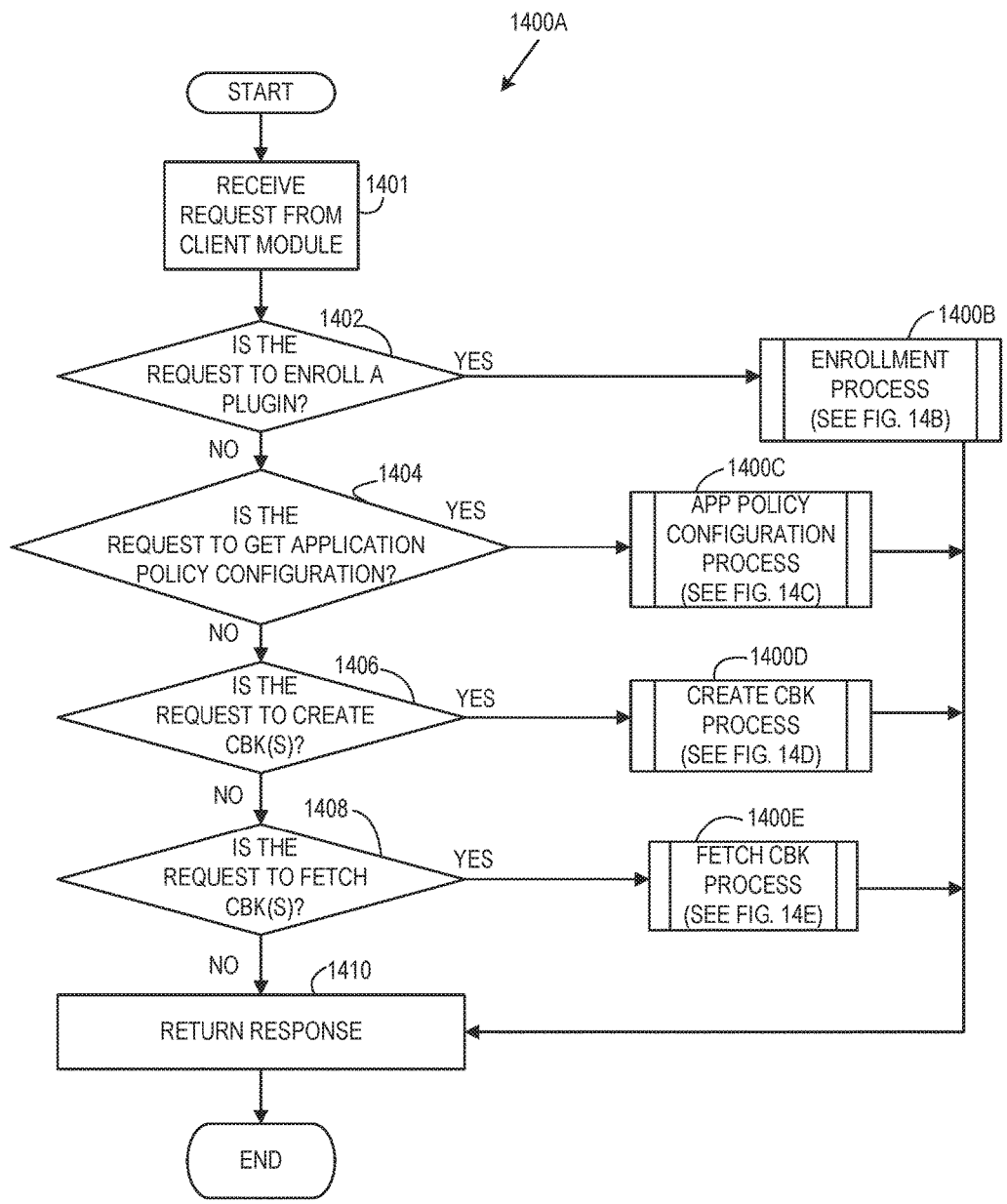
FIG. 14A: EXEMPLARY CLOUD SERVICE PLATFORM PROCESS

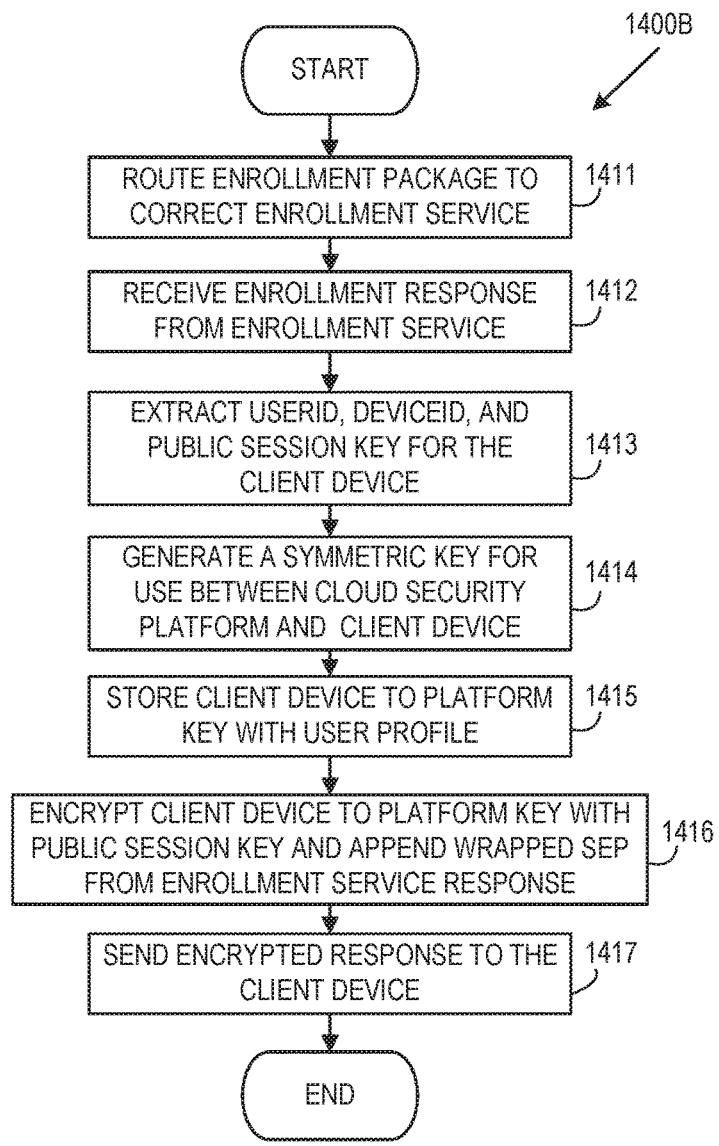
FIG. 14B: EXEMPLARY ENROLLMENT PROCESS

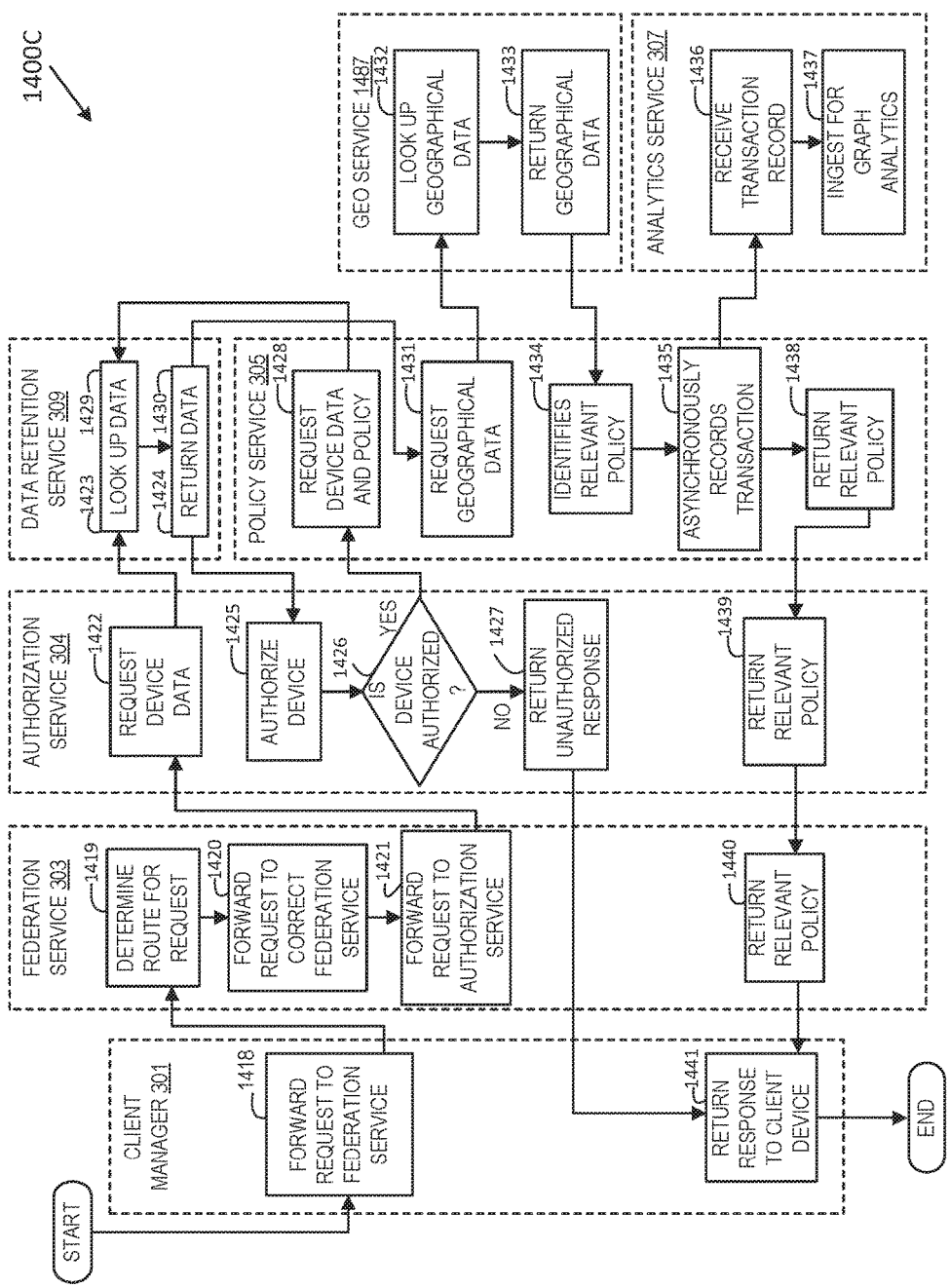
FIG. 14C: EXEMPLARY APPLICATION POLICY CONFIGURATION RETRIEVAL PROCESS

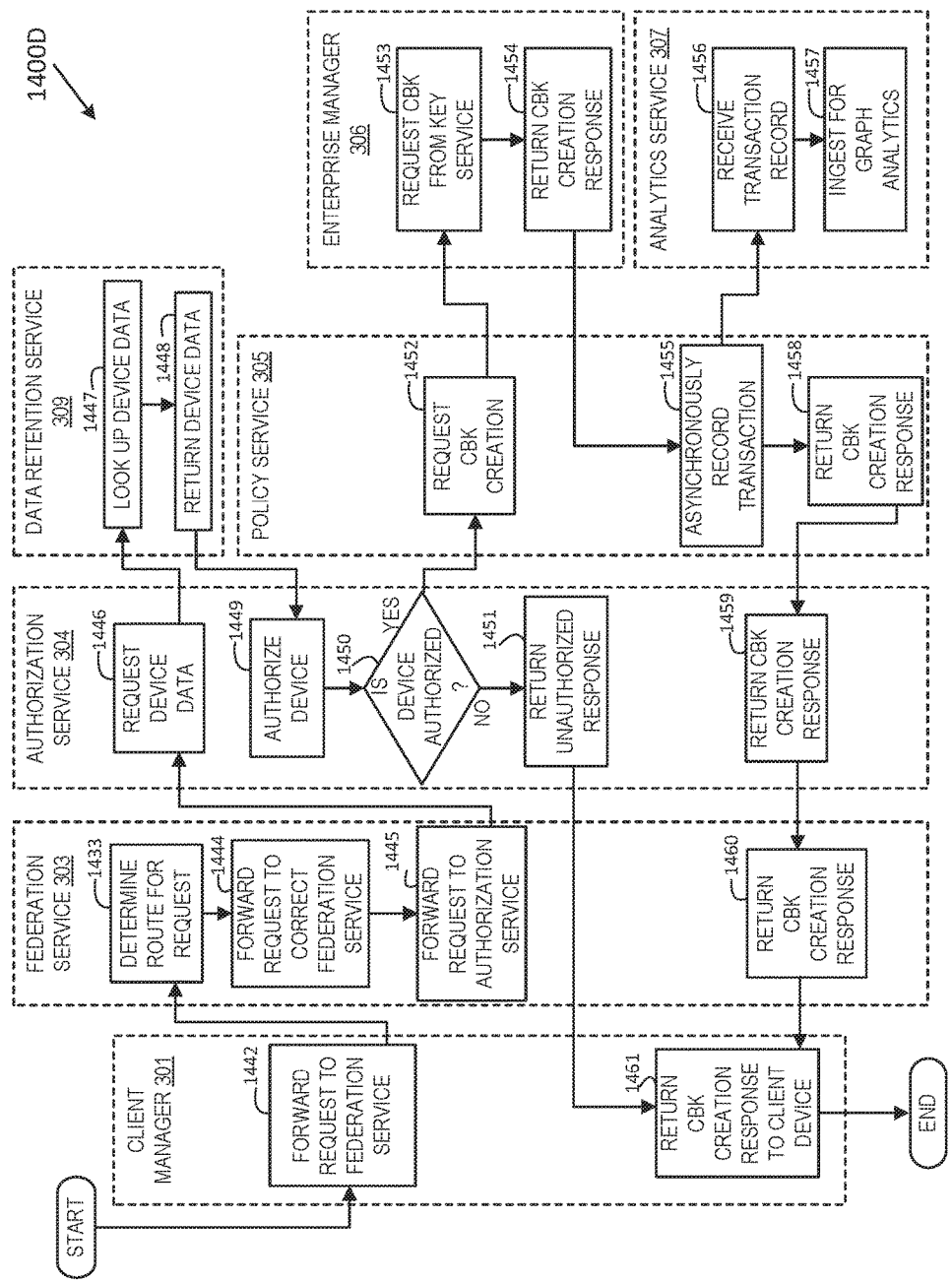
FIG. 14D: EXEMPLARY CBK CREATION PROCESS

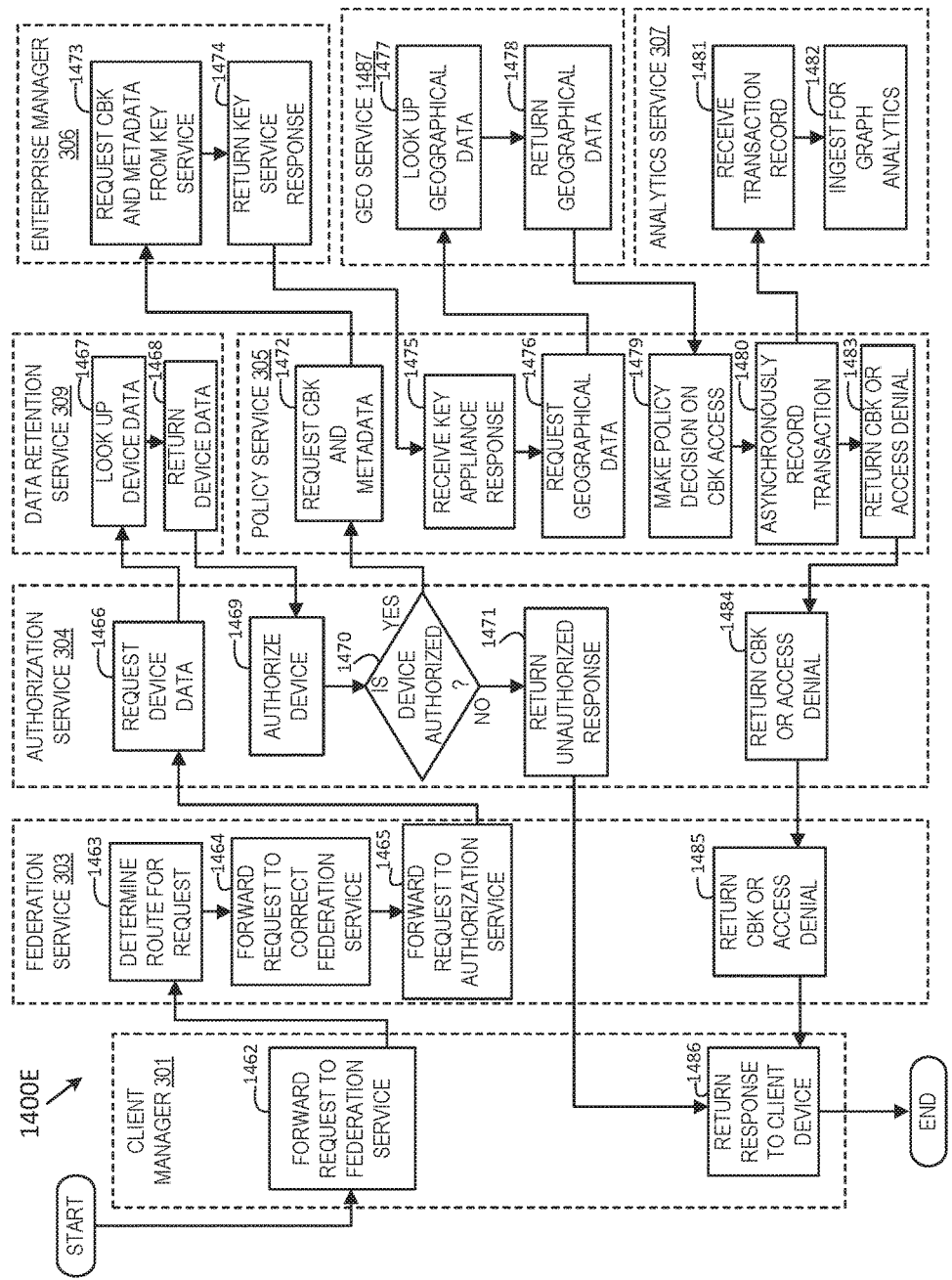
FIG. 14E: EXEMPLARY FETCH CBK PROCESS

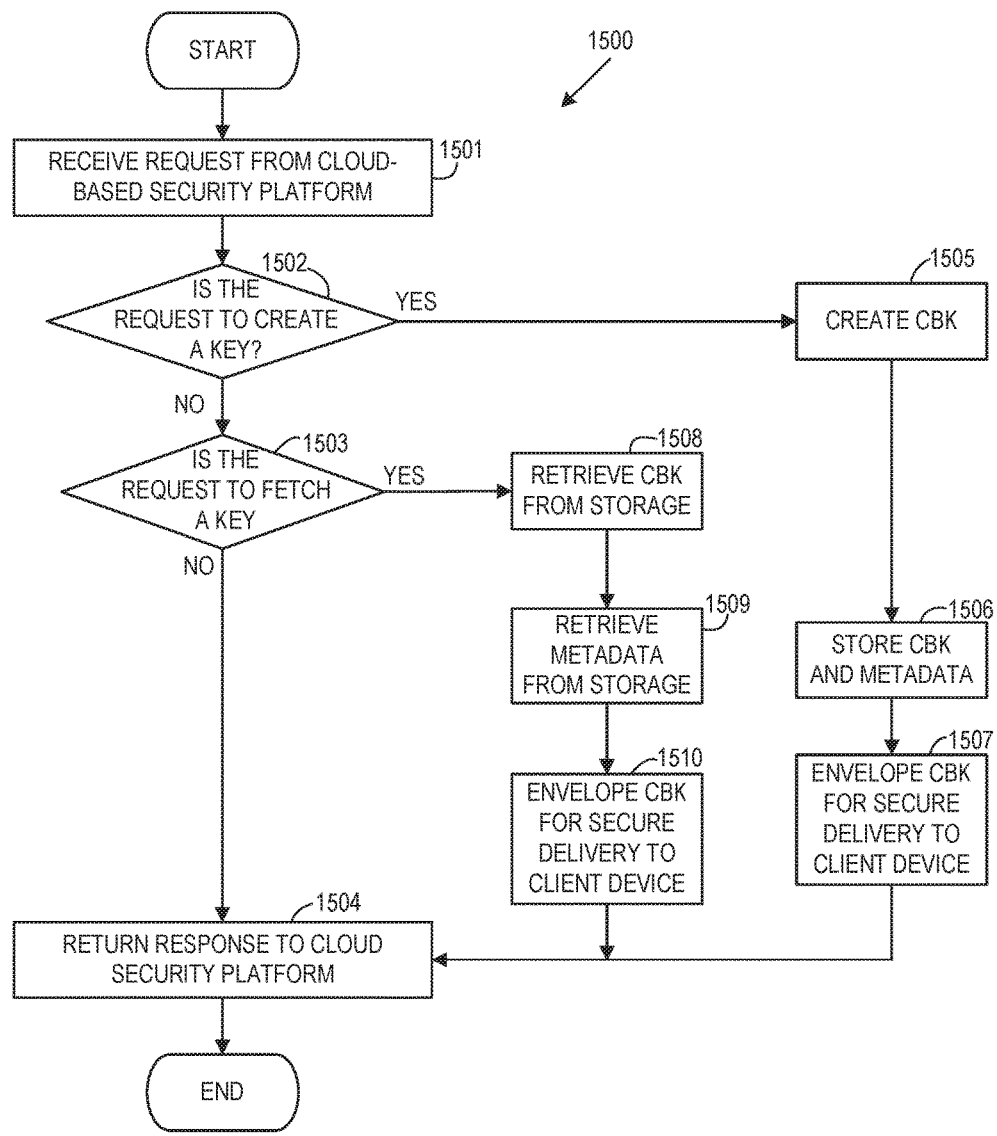
FIG. 15: EXEMPLARY KEY SERVICE PROCESS

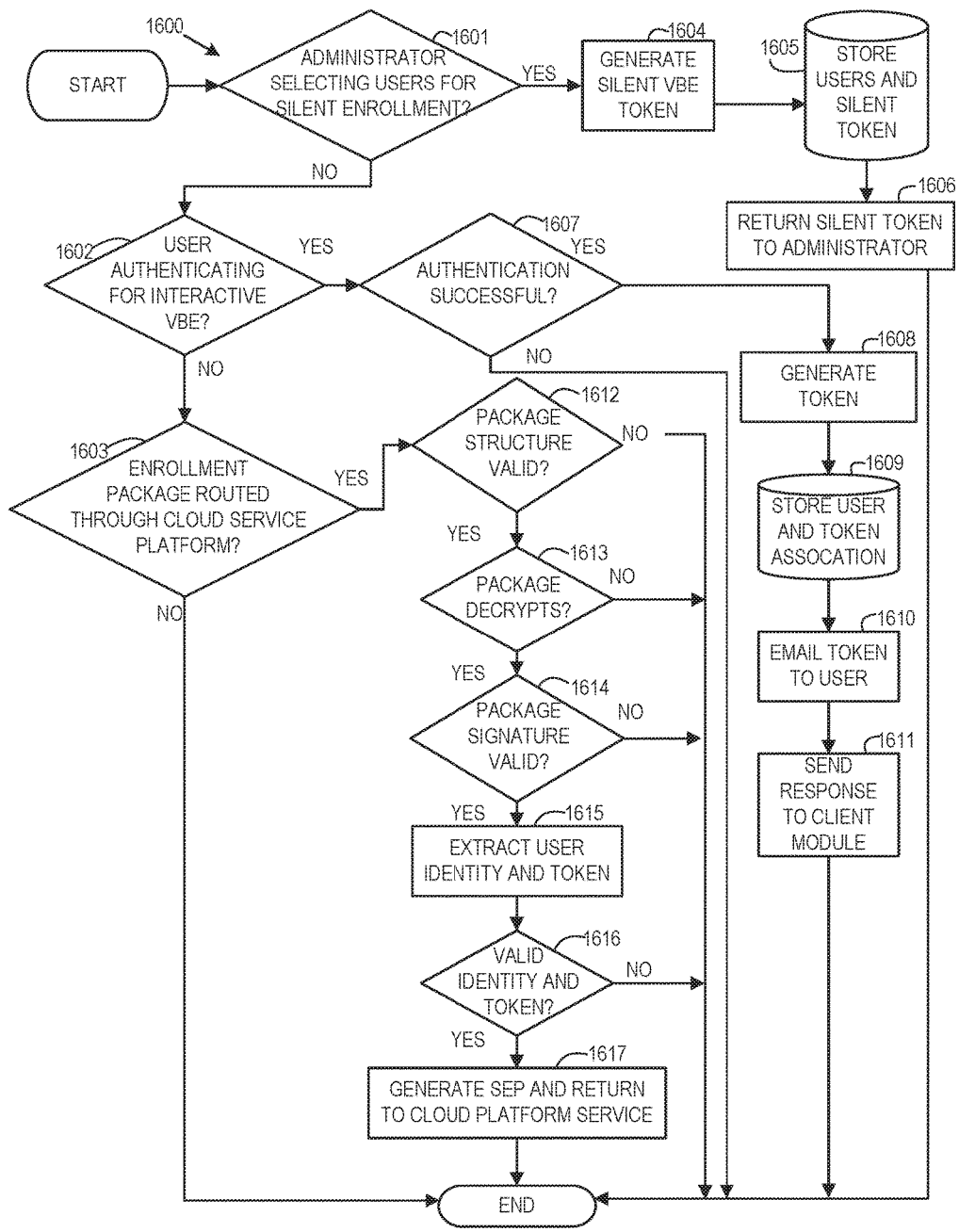
FIG. 16: EXEMPLARY ENROLLMENT SERVICE PROCESS

SYSTEMS AND METHODS FOR ENCRYPTION AND PROVISION OF INFORMATION SECURITY USING PLATFORM SERVICES

CROSS REFERENCE TO RELATED APPLICATIONS

This application claims priority to, the benefit under 35 U.S.C. §119 of, and incorporates by reference herein in its entirety U.S. Provisional Patent Application No. 62/112,638, filed Feb. 5, 2015, and entitled "Systems and Methods for Providing Information Security Using Platform Services."

TECHNICAL FIELD

The present systems and methods relate generally to information security, and more particularly to systems and methods that encrypt or secure data on a contextual basis using a layer of software-based services that orchestrates the movement of context-based encryption keys without requiring plaintext access to the keys themselves.

BACKGROUND

Modern information technology offers a growing number of tools and services to increase business productivity, including mobile devices, browser-based applications, cloud computing and storage, and web-based collaboration systems. However, each new capability brings new risks. Many of these tools and services require storing sensitive information in new locations such as cloud data repositories, software as a service applications, and mobile devices. Advanced collaboration tools create new modalities of data access for legitimate users, but they may also create exploitable security vulnerabilities that allow loss or theft of data.

Many countries have enacted laws that govern the way personal data is handled, transferred, and stored, to include restrictions on the use of cloud computing and mobile devices without additional security measures. Multinational companies operating in those countries must abide by the laws of every country of operation. Companies may also lose potential business or partnership opportunities by failing to take security and privacy considerations into account. In some industries, such as healthcare and financial services, protecting sensitive information, regardless of where the information goes, is of critical importance.

From the perspective of individuals, securing their data is equally important. On numerous occasions, the compromise of even a single large enterprise can result in the compromise of the personal information of tens of millions or even hundreds of millions of individuals. Personal information of users who use online banking, or perform other financial and/or personal transactions, is vulnerable to phishing, eavesdropping, and various other electronic intrusions.

Most conventional information security methodologies (generally known as cryptographic systems) can be typically characterized as belonging to either a public-private key-based (PPK) infrastructure, or a symmetric key-based infrastructure. Public-private key-based infrastructure is a cryptographic system (e.g., RSA-2048 algorithm) that generates two keys for every user—a public key and a private key. A public key is shared by a user (e.g., user A) with other users who wish to send data to user A. Thus, a user who wishes to send data to user A obtains user A's public key (that is publicly available), encrypts the data to be sent to user A, and finally sends the encrypted data. Upon receiving the encrypted data, user A uses a private key (typically, a secret key that is not publicly available) to decrypt the data. Without using the private key, data encrypted using this infrastructure is typically difficult to decrypt.

However, a significant problem with systems designed using the PPK infrastructure is that every user must own a public key and a private key. The public key is shared with other users and used by them for encryption of data, whereas the data is decrypted using the user's private key. Thus, if a user's private key is ever compromised, any data sent to the user can be decrypted easily. For example, in an enterprise, private keys are more prone to be compromised as the private key is usually accessed by persons other than the key owner, such as IT department personnel, outside contractors, and the like. Moreover, key management is difficult because of the need for mapping key owners to a public key every time encrypted data is sent to a key owner. Also, if a user wants to change his or her public and/or private key, it would destroy the integrity of the data that has been encrypted previously. In other words, a significant disadvantage with the conventional PPK infrastructure is that keys are tied to people. Therefore, changing either public or private keys makes it difficult to dynamically scale various aspects of key management. Additionally, a multi-party conversation (e.g., online conversations or communications involving more than two persons) can be problematic as every person must have access to every other person's respective key. Hence, this infrastructure is primarily used for encryption of individual emails, messages, and other such unitary types of data usually limited to small numbers of users (e.g., two people).

Other conventional cryptographic systems typically belong to the family of symmetric key-based systems. In these systems, keys (conceptually similar to passwords) that protect the data are used, in addition to the data to be encrypted, as inputs into an algorithm (e.g., AES) that generates encrypted data as output. Unlike the PPK infrastructure, asymmetric key-based systems involve the use of only one key. The person who wishes to decrypt the data uses the same key that was used during encryption. Although asymmetric key-based systems allow scalability with regard to persons involved in the cryptographic system, in the event the key becomes compromised, all the data protected with the key similarly becomes compromised. In symmetric key-based systems, one key is generally used for all users and/or all data to be encrypted. Symmetric key-based systems are used primarily for bulk data encryption and are flexible to allow for multi-party communications. Thus, the keys do not change with each new instance of data or user communication, but remain the same throughout the key lifecycle.

Generally speaking, most conventional data security systems of today are designed on a "thicker wall" approach using the above-mentioned systems. In other words, these systems attempt to secure the data while the data remains within the electronic premises of an organization's enterprise system, or a user's computing device. However, in today's digital age, such an approach is no longer workable, as the data is often circulated (and shared) among various other entities and systems, e.g., an organization's partners, a user's friends or acquaintances, SaaS providers, email providers, ISPs, hosting providers, and the like. Effective collaboration among suppliers, partners, vendors, and customers requires broader sharing of data. Thus, because so many parties and chances for data leak are involved, there are many opportunities for data breach, hacking, inadequate security measures, and the like. Accordingly, if an individual user's key is compromised at any intermediate system or entity, every bit of data associated with that key is compromised. In summary, systems that assign keys to persons are problematic.

Therefore, there is a long-felt but unresolved need for a system or method that encrypts or secures data on a contextual basis using a layer of software-based services that orchestrates the movement of context-based encryption keys without requiring plaintext access to the keys themselves.

BRIEF SUMMARY OF THE DISCLOSURE

Briefly described, and according to one embodiment, aspects of the present disclosure generally relate to systems and methods for providing information security on a contextual basis using a layer of software-based services that orchestrates the movement of context-based encryption keys without requiring plaintext access to the keys themselves.

Such a system may generate context-based keys (e.g., keys that are based on the environment wherein the data is generated) such that every key relating to every instance of data is different. In contrast to conventional data security systems, the disclosed system may have distinct aspects of authentication and encryption. Because authentication and encryption are considered distinct aspects, users should not encrypt data using a single key. On the contrary, data may be encrypted using context-based or data-based keys, and data access may be allowed based on authentication of users.

Further, the disclosed key management system may provide auditing and validity capabilities, yet be scalable and flexible. Ideal auditing involves generation of an audit trail that is agnostic of the user's application software (e.g., web browser, email software, etc.) or even the operating system/platform on which the program is running.

Moreover, the authentication aspects of the disclosed system may provide the ability to manage the rights of individuals who are able to access data and/or programs according to pre-defined policies/roles (e.g., provide role-based access control functionality). In other words, the disclosed system may be implemented in user computing devices as a generic (e.g., device, platform, or application-agnostic) application software that does not require the use of specifically designed application programming interfaces (e.g., APIs) to communicate with application programs and/or hardware associated with each user's respective computing device.

Further, the system may be highly interactive and easily configurable by users having minimal technical skills and easily operable by system administrators. Further, the system may be easily accessible online by a plurality of users via their respective computing devices so that users can choose to secure data arising out of user interaction with any kind of software and/or hardware system associated any kind of computing device.

Additionally, the system may provide for federation and collaboration among organizations. If two enterprises choose to exchange data, the system may facilitate the secure movement of keys from storage within one enterprise to the end user in a partner organization (e.g., customer, vendor, or other associated organization). This movement may be done without permitting the orchestration layer to have visibility into the context-based keys, to ensure that the orchestration layer cannot, itself, become a threat to the confidentiality of the context-based keys or the data they protect. Similarly, the secure movement of keys prevents eavesdroppers (even those with pervasive access to networks) from accessing the context-based keys.

Briefly described, and according to one embodiment, aspects of the disclosed system, referred to herein as a Fully Autonomous Federated Security System (alternatively referred to herein as a "FAFSS"), include a platform as a service architecture comprising proprietary client software installed in user computing devices, proprietary server software installed in a server computer operated by an entity that utilizes an embodiment of the disclosed system, and a cloud-based platform that orchestrates the management and application of policies and the movement of keys between the end user client and the server software. In one aspect, the client software probes hardware and software associated with user computing devices in order to extract original data arising out of a user's interaction with a computing device (or application or platform operating on said computing device), thereby diverting the flow of original data directed towards an expecting application program running on the user's computing device. As will be understood, the present disclosure does not impose any limitations on the type or other specifics of application programs operating on user computing devices.

According to an aspect of the present disclosure, original data is encrypted or secured using a key created by an embodiment of the FAFSS. According to yet another aspect, the key created by the FAFSS is context-based and unique for every piece (instance) of data that is encrypted. For example, a context-based key might depend on environmental conditions associated with the context of the data (e.g., time instant at which the data is created, application program associated with the data, a unique user identifier, and other conditions). In one embodiment, a context-based key may be generated by a random number generator and stored in association with one or more metadata attributes dependent on the environmental conditions associated with the context of the data. Usually, such original data to be secured arises from user interactions with software and/or hardware components included in a user's electronic computing device. Generally, the data is secured while stored inside a user's computing device and/or enterprise data storage system and/or when electronically communicated to other person(s) or systems. Examples of data that may be secured/encrypted include (but are not limited to) text files, audio files, video files, data files, system files, image files, or any form of digital data comprising emails, electronic documents, online messages, social media posts, web-based forms, etc., or any variant, sub-part, portion, or combination thereof. Generally, the data to be secured is generated by or associated with a user's entry or input with any kind of application programs and/or hardware across a variety of computing devices (e.g., entry into an email program, spreadsheet software, social media website, etc.).

As will be described in greater detail in the discussions that follow, the result of encryption of the original data is referred to herein as the "encrypted version of the original data." In one embodiment, the encrypted version of the original data undergoes further processing and is then referred to as "encrypted output." In one exemplary scenario involving "at-rest encryption", the encrypted output is stored in the user's computing device and only temporarily decrypted via proprietary software (e.g., when later retrieved or accessed by the same user or a different user) so that a user can never access the original data without some policy being applied to that access. Alternately, in scenarios wherein secure cryptographic communication is desirable, the encrypted output is shared by a sender with one or more other users (e.g., recipients, machines, etc.). It will be understood that in many scenarios, such cryptographic communication can include one or more third party systems, providers, or services (e.g., social media systems, online bulletin boards, group email servers, etc.). Generally, encryption is performed by inputting the original data and the key into a cryptographic algorithm such as (but not limited to) Advanced Encryption Standard (AES).

According to an exemplary FAFSS aspect, functionalities of the server computer include generation and storage of encryption keys when requested by cloud-based platform services. Generally, such keys are stored inside exemplary FAFSS databases, optionally secured with a hardware security module and provided to the FAFSS cloud-based platform services when requested to orchestrate delivery of keys to FAFSS clients during a subsequent decryption process running in user computing devices. As will be understood, the disclosed FAFSS allows the same data (e.g., a single document) to be utilized by several users, potentially distributed among multiple organizations.

According to an exemplary FAFSS aspect, functionalities of the cloud-based platform services include the management of policies, delivery of application policies to FAFSS clients, and the adjudication of data protection policies. The FAFSS cloud-based platform manages the rights of individual users who are permitted to send and/or access data or denied the ability to send and/or access data according to pre-defined policies and roles. As will be understood by one skilled in the art, pre-defined policies ensure that only authorized users (e.g., depending on their roles within an organization) are able to access certain data and resources. For example, in an enterprise or corporate organization, an IT manager might be able to review any data associated with the enterprise and also change data access permissions of all employees; a director might access all data but not change access permissions; a department head might change permissions only for employees working in a department; a low-level employee may have very limited access to data; etc. In one embodiment, the FAFSS cloud-based platform routes inbound requests through the proper processing nodes to determine whether a request satisfies security policies set by organizations using the FAFSS. If a policy is satisfied, the FAF SS orchestrates the movement of keys from the sever computer to the FAF SS client, without gaining visibility into the keys themselves.

In one embodiment, a method, comprising the steps of: receiving, at a server, a request for encryption of data from an electronic computing device being operated by a user; determining, at the server, a key space corresponding to the user and/or the electronic computing device based on the request for encryption; transmitting the request for encryption from the server to a key service corresponding to the determined key space for generation of unique cryptographic information relating particularly to the request for encryption; receiving, at the server, the unique cryptographic information from the key service; and transmitting the unique cryptographic information from the server to the electronic computing device for unique encryption of the data.

In one embodiment, a system, comprising: an electronic computing device that generates or receives data and is associated with a user, wherein the electronic computing device generates a request for encryption of the data and transmits the request for encryption to a server; the server that receives the request for encryption from the electronic computing device, wherein the sever determines a key space corresponding to the user and/or the electronic computing device based on the request for encryption and transmits the request for encryption to a key service corresponding to the determined key space; the key service that receives the request for encryption from the server, wherein the key service generates unique cryptographic information relating particularly to the request for encryption and transmits the unique cryptographic information to the server; the server that receives the unique cryptographic information from the key service, wherein the server transmits the unique cryptographic information to the electronic computing device; and the electronic computing device that receives the unique cryptographic information from the server, wherein the electronic computing device uniquely encrypts the data using the unique cryptographic information.

In one embodiment, a method for enrolling a user of an electronic computing device in a multi-party encryption and key management system, comprising the steps of: receiving, at a server, an enrollment request from the electronic computing device corresponding to a user of the electronic computing device for enrollment in the multi-party encryption and key management system, the enrollment request comprising identity data corresponding to the user and routing data for routing the enrollment request, wherein at least the identity data is encrypted; determining, based on the routing data, a key space corresponding to a tenant affiliated with the user; transmitting the enrollment request from the server to a key service corresponding to the determined key space; receiving, at the server, a response from the key service, wherein the response comprises a user identifier, a tenant-specific device identifier, and cryptographic enrollment data for enrolling the user, wherein the response was generated at the key service based on the encrypted identity data; and transmitting the cryptographic enrollment data and tenant-specific device identifier from the server to the electronic computing device for enrollment of the user with the multi-party encryption and key management system.

In one embodiment, a system for enrolling a user of an electronic computing device in a multi-party encryption and key management system, comprising: the electronic computing device that generates an enrollment request corresponding to a user of the electronic computing device for enrollment in the multi-party encryption and key management system and transmits the enrollment request to a server, the enrollment request comprising identity data corresponding to the user and routing data for routing the enrollment request, wherein at least the identity data is encrypted; the server that receives the enrollment request from the electronic computing device, wherein the server determines, based on the routing data, a key space corresponding to a tenant affiliated with the user and transmits the enrollment request to a key service corresponding to the determined key space; the key service that receives the enrollment request, wherein the key service generates, based on the encrypted identity data, a response comprising a user identifier, tenant-specific device identifier, and cryptographic enrollment data for enrolling the user and transmits the response to the server; the server that receives the response from the key service, wherein the server transmits the cryptographic enrollment data and tenant-specific device identifier to the electronic computing device; and the electronic computing device that receives the cryptographic enrollment data and tenant-specific device identifier from the server, wherein the electronic computing device enrolls the user, based on the cryptographic enrollment data and tenant-specific device identifier, in the multi-party encryption and key management system.

In one embodiment, a method for enrolling a user of an electronic computing device in a multi-party encryption and key management system, comprising the steps of: generating, at the electronic computing device, an enrollment request corresponding to a user of the electronic computing device for enrollment in the multi-party encryption and key management system, wherein the enrollment request comprises identity data corresponding to the user and routing data for routing the enrollment request; encrypting, at the electronic computing device, at least the identity data with unique cryptographic information to prevent a server from accessing the identity data; transmitting the enrollment request from the electronic computing device to the server; and receiving, at the electronic computing device, a response from the server, wherein the response comprises a user identifier, a tenant-specific device identifier, and cryptographic enrollment data for enrolling the user, wherein the response was generated both at the server and a key service capable of accessing the encrypted identity data.

In one embodiment, a method, comprising the steps of: retrieving a secure enrollment profile, wherein the profile includes cryptographic identity data corresponding to a user of a particular electronic computing device that is enrolled with a federated security platform associated with one or more tenants; determining, based on the secure enrollment profile, a particular tenant corresponding to the user for enabling secure tenant-specific tracking, by the platform, of electronic activities of the user and the particular electronic computing device; receiving, from a platform server at a predetermined interval, one or more tenant-specific policies defining actions to be taken with respect to certain electronic activities resulting from interaction by the user with the particular electronic computing device; identifying a particular electronic activity resulting from user interaction with the particular electronic computing device; comparing the identified particular electronic activity to the one or more tenant-specific policies to determine the appropriate action to take with respect to the identified particular electronic activity; and initiating the appropriate action with respect to the identified particular electronic activity.

In one embodiment, a system, comprising: a federated security platform associated with one or more tenants, the platform comprising a server; and an electronic computing device enrolled with the platform, the electronic computing device comprising a processor, the processor operative to: retrieve a secure enrollment profile, the profile comprising cryptographic identity data corresponding to a user of the electronic computing device; determine, based on the secure enrollment profile, a particular tenant corresponding to the user for enabling secure tenant-specific tracking, by the platform, of electronic activities of the user and the electronic computing device; receive, from the server at a predetermined interval, one or more tenant-specific policies defining actions to be taken with respect to certain electronic activities resulting from interaction by the user with the electronic computing device; identify a particular electronic activity resulting from user interaction with the electronic computing device; compare the identified particular electronic activity to the one or more tenant-specific policies to determine the appropriate action to take with respect to the identified particular electronic activity; and initiate the appropriate action with respect to the identified particular electronic activity.

According to one aspect of the present disclosure, the method, wherein the request for encryption comprises identifying information that uniquely identifies the electronic computing device and/or the user of the electronic computing device. Furthermore, the method, wherein the identifying information is selected from the group comprising a nonce, a device ID, and a hardware fingerprint hash. Moreover, the method, wherein the user and/or electronic computing device is associated with a particular tenant. Further, the method, wherein the determining step comprises analyzing the identifying information to determine the particular tenant and then identifying the key space associated with the particular tenant. Additionally, the method, wherein the server comprises one or more federation services. Also, the method, wherein the step of determining the key space corresponding to the electronic computing device further comprises the steps of: extracting the identifying information from the request for encryption; determining, based on the extracted identifying information, a particular federation service corresponding to the user and/or the electronic computing device for authenticating the request for encryption; transmitting the request for encryption to the determined particular federation service for authenticating the request for encryption; authenticating, based on the identifying information, the request for encryption; and determining, based on the authenticated request for encryption and the extracted identifying information, the key space corresponding to the user and/or the electronic computing device.

According to one aspect of the present disclosure, the method, wherein the step of determining the key space corresponding to the user and/or the electronic computing device further comprises the step of determining, based on the key space, the key service corresponding to the determined key space. Furthermore, the method, wherein the key service is managed separately from the server. Moreover, the method, wherein the server has no access to data maintained in the key service. Further, the method, wherein the server comprises a cloud-based security platform. Additionally, the method, wherein the key service generates the unique cryptographic information according to one or more predefined rules. Also, the method, wherein the request for encryption of data and the unique cryptographic information are securely enveloped.

According to one aspect of the present disclosure, the method, wherein the electronic computing device encrypts the request for encryption data prior to transmitting the request for encryption to the server. Furthermore, the method, wherein the key service decrypts the request for encryption prior to generating the unique cryptographic information. Moreover, the method, wherein the key service encrypts the unique cryptographic information prior to transmitting the unique cryptographic information to the server. Further, the method, wherein the electronic computing device decrypts the unique cryptographic information prior to using the unique cryptographic information to uniquely encrypt the data. Additionally, the method, wherein the unique cryptographic information comprises an encryption key and a key tag. Also, the method, wherein the encryption key comprises a context-based key.

According to one aspect of the present disclosure, the method, wherein the key tag comprises a context-based key identifier. Furthermore, the method, wherein the request for encryption includes contextual information relating to creation of the data. Moreover, the method, wherein the unique cryptographic information is associated with the contextual information. Further, the method, wherein the unique cryptographic information corresponds to the request for encryption and is used solely to encrypt the data relating to the request for encryption. Additionally, the method, wherein the contextual information is selected from the group comprising: a user identifier associated with a user entering the data, a user identifier of a user interacting with the data, a session identifier, a time instant at which the data was generated, a time instant at which the data was accessed, an electronic computing device identifier, an application program identifier, a tenant identifier, a network address. Also, the method, wherein subsequent decryption of the data is dependent upon one or more predefined policies. Furthermore, the method, wherein the unique cryptographic information is used for a subsequent auditing function.

According to one aspect of the present disclosure, the system, wherein the request for encryption comprises identifying information that uniquely identifies the electronic computing device and/or the user of the electronic computing device. Moreover, the system, wherein the server comprises a cloud-based security platform. Further, the system, wherein the key service is managed separately from the server.

According to one aspect of the present disclosure, the method, wherein the identity data further comprises unique cryptographic information corresponding to the enrollment request. Additionally, the method, wherein the cryptographic enrollment data is encrypted by the key service using the unique cryptographic information corresponding to the enrollment request prior to transmission to the server. Also, the method, wherein the response further comprises the unique cryptographic information corresponding to the enrollment request. Furthermore, the method, further comprising the steps of: generating, at the server, cryptographic server enrollment data; encrypting the cryptographic server enrollment data using the unique cryptographic information corresponding to the enrollment request; and transmitting the transformed cryptographic server enrollment data along with the transformed cryptographic enrollment data and tenant-specific device identifier from the server to the electronic computing device. Moreover, the method, further comprising the step of storing the cryptographic server enrollment data in association with the tenant-specific device identifier and user identifier. Further, the method, wherein the identity data further comprises an enrollment request identifier and an electronic computing device identifier.

According to one aspect of the present disclosure, the method, wherein the enrollment request identifier is compared, by the key service, to the electronic computing device identifier to authenticate the enrollment request. Additionally, the method, further comprising the steps of: prior to receiving the enrollment request, generating, at the server, the enrollment request identifier; generating an enrollment package comprising the enrollment request identifier and unique cryptographic information corresponding to the key service; and transmitting the enrollment package to the electronic computing device, wherein at least the identity data is encrypted using the unique cryptographic information corresponding to the key service. Also, the method, further comprising the steps of: prior to receiving the enrollment request, generating, at the server, the enrollment request identifier; generating an enrollment package comprising the enrollment request identifier and unique cryptographic information corresponding to the key service; receiving, at the server, a request for the enrollment package from the electronic computing device; authenticating the request for the enrollment package; and transmitting, based on the authentication, the enrollment package from the server to the electronic computing device, wherein the identity data is encrypted using the unique cryptographic information corresponding to the key service. Furthermore, the method, wherein the multi-party encryption and key management system comprises the server. Moreover, the method, further comprising the step of extracting, at the server prior to the step of determining the key space, the routing data from the enrollment request. Further, the method, wherein the step of determining the key space further comprises analyzing the extracted routing data to determine the tenant affiliated with the user and then identifying the key space associated with the tenant affiliated with the user. Additionally, the method, wherein the step of determining the key space further comprises the step of determining, based on the key space, the key service corresponding to the determined key space.

According to one aspect of the present disclosure, the system, wherein the identity data further comprises unique cryptographic information corresponding to the enrollment request. Also, the system, wherein the key service encrypts, prior to transmission to the server, the cryptographic enrollment data using the unique cryptographic information corresponding to the enrollment request. Furthermore, the system, wherein the response further comprises the unique cryptographic information corresponding to the enrollment request. Moreover, the system, wherein the server, after receiving the response from the key service: generates cryptographic server enrollment data; encrypts the cryptographic server enrollment data using the unique cryptographic information corresponding to the enrollment request; and transmits the transformed cryptographic server enrollment data along with the transformed cryptographic enrollment data and tenant-specific device identifier to the electronic computing device. Further, the system, wherein the identity data further comprises an enrollment request identifier and an electronic computing device identifier. Additionally, the system, wherein the server, prior to receiving the enrollment request: generates the enrollment request identifier; generates an enrollment package comprising the enrollment request identifier and unique cryptographic information corresponding to the key service; and transmits the enrollment package to the electronic computing device, wherein at least the identity data is encrypted using the unique cryptographic information corresponding to the key service. Also, the system, wherein the server, prior to receiving the enrollment request: generates the enrollment request identifier; generates an enrollment package comprising the enrollment request identifier and unique cryptographic information corresponding to the key service; receives a request for the enrollment package from the electronic computing device;

authenticates the request for the enrollment package; and transmits, based on the authentication, the enrollment package to the electronic computing device, wherein the identity data is encrypted using the unique cryptographic information corresponding to the key service. Furthermore, the system, wherein the multi-party encryption and key management system comprises the server.

According to one aspect of the present disclosure, the method, wherein the identity data further comprises first unique cryptographic information corresponding to the enrollment request. Moreover, the method, wherein the cryptographic enrollment data comprises cryptographic key service enrollment data and cryptographic server enrollment data, wherein at least the cryptographic key service enrollment data was encrypted by the key service using the first unique cryptographic information corresponding to the enrollment request and at least the cryptographic server enrollment data was encrypted by the server using the first unique cryptographic information corresponding to the enrollment request. Further, the method, wherein the electronic computing device decrypts at least the cryptographic key service enrollment data and the cryptographic server enrollment data using second unique cryptographic information corresponding to the enrollment request. Additionally, the method, wherein the identity data further comprises an enrollment request identifier and an electronic computing device identifier. Also, the method, further comprising the steps of: prior to generating the enrollment request, generating a request for an enrollment package from the server; transmitting the request for the enrollment package from the electronic computing device to the server; receiving, at the electronic computing device, the enrollment package from the server, wherein the enrollment package comprises the enrollment request identifier and unique cryptographic information corresponding to the key service; and encrypting the identity data using the unique cryptographic information corresponding to the key service. Furthermore, the method, wherein the multi-party encryption and key management system comprises the server.

According to one aspect of the present disclosure, the method, wherein the cryptographic identity data comprises a tenant-specific device identifier, a key space identifier, and unique cryptographic information. Moreover, the method, further comprising the steps of: prior to retrieving the secure enrollment profile, transmitting an enrollment request to the platform server for enrollment of the user of the particular electronic computing device in the federated security platform; receiving, from the platform server, an enrollment response corresponding to the enrollment request, wherein the enrollment response comprises the cryptographic identity data; generating, based on the enrollment response, the secure enrollment profile; and storing the secure enrollment profile in a database. Further, the method, wherein at least a portion of the enrollment response is encrypted. Additionally, the method, wherein the step of generating the secure enrollment profile further comprises decrypting the encrypted portion of the enrollment response. Also, the method, wherein the appropriate action is selected from the group comprising blocking a particular functionality of a particular application operating on the particular electronic computing device, removing a particular user interface element of a particular application, blocking network traffic associated with a particular application, and encrypting or decrypting electronic data entered into a particular data field of a particular application. Furthermore, the method, wherein identifying the particular electronic activity further comprises the step of detecting, via a client module operating on the particular electronic computing device, an item of original data entered into the particular data field that could be encrypted.

According to one aspect of the present disclosure, the method, wherein comparing the identified particular electronic activity to the one or more tenant-specific policies further comprises the step of identify a need to encrypt the item of original data. Moreover, the method, wherein initiating the appropriate action further comprises the steps of: identifying, via the client module, contextual information relating to the item of original data; transmitting a request for encryption of the item of original data from the client module to the platform server, wherein the request includes the contextual information relating to the item of original data; receiving, at the client module, a response from the platform server, wherein the response comprises unique cryptographic information generated based on the contextual information corresponding to the item of original data; and generating an encrypted output of the item of original data as a function of the item of original data and the unique cryptographic information. Further, the method, wherein identifying the particular electronic activity further comprises the step of detecting, via a client module operating on the particular electronic computing device, an encrypted output of an item of original data entered into the particular data field that could be decrypted. Additionally, the method, wherein comparing the identified particular electronic activity further comprises the step of identifying a need to decrypt the encrypted output of the item of original data. Also, the method, wherein initiating the appropriate action further comprises the steps of: identifying, via the client module, a context-based key identifier relating to the encrypted output of the item of original data; transmitting a request for decryption of the encrypted output of the item of original data from the client module to the platform server, wherein the request includes the context-based key identifier; receiving, at the client module, a response from the platform server, wherein the response comprises unique cryptographic information corresponding to the context-based key identifier; and generating the item of original data as a function of the encrypted output of the item of original data and the unique cryptographic information.

According to one aspect of the present disclosure, the system, wherein the cryptographic identity data comprises a tenant-specific device identifier, a key space identifier, and unique cryptographic information. Furthermore, the system, where the processor is further operative to: prior to retrieving the secure enrollment profile, transmit an enrollment request to the server for enrollment of the user of the particular electronic computing device in the federated security platform; receive, from the server, an enrollment response corresponding to the enrollment request, wherein the enrollment response comprises the cryptographic identity data; generate, based on the enrollment response, the secure enrollment profile; and store the secure enrollment profile in a database operatively connected to the electronic computing device. Moreover, the system, wherein at least a portion of the enrollment response is encrypted. Further, the system, wherein the processor is further operative to decrypt the encrypted portion of the enrollment response as part of generating the secure enrollment profile. Additionally, the system, wherein the appropriate action is selected from the group comprising blocking a particular functionality of a particular application operating on the electronic computing device, removing a particular user interface element of a particular application, blocking network traffic associated with a particular application, and encrypting or decrypting electronic data entered into a particular data field of a particular application. Also, the system, wherein the processor is further operative, as part of identifying the particular electronic activity, to detect, via a client module operating on the electronic computing device, an item of original data entered into the particular data field that could be encrypted.

According to one aspect of the present disclosure, the system, wherein the processor is further operative, as part of comparing the identified particular electronic activity to the one or more tenant-specific policies, to identify a need to encrypt the item of original data. Furthermore, the system, wherein the processor is further operative, as part of initiating the appropriate action, to: identify, via the client module, contextual information relating to the item of original data; transmit a request for encryption of the item of original data from the client module to the server, wherein the request includes the contextual information relating to the item of original data; receive, at the client module, a response from the server, wherein the response comprises unique cryptographic information generated based on the contextual information corresponding to the item of original data; and generate an encrypted output of the item of original data as a function of the item of original data and the unique cryptographic information. Moreover, the system, wherein the processor is further operative, as part of identifying the particular electronic activity, to detect, via a client module operating on the electronic computing device, an encrypted output of an item of original data entered into the particular data field that could be decrypted. Further, the system, wherein the processor is further operative, as part of comparing the identified particular electronic activity, to identify a need to decrypt the encrypted output of the item of original data. Additionally, the system, wherein the processor is further operative, as part of initiating the appropriate action, to: identify, via the client module, a context-based key identifier relating to the encrypted output of the item of original data; transmit a request for decryption of the encrypted output of the item of original data from the client module to the server, wherein the request includes the context-based key identifier; receive, at the client module, a response from the server, wherein the response comprises unique cryptographic information corresponding to the context-based key identifier; and generate the item of original data as a function of the encrypted output of the item of original data and the unique cryptographic information.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates a high-level overview of the disclosed Fully Autonomous Federated Security System (FAF SS) in an exemplary operating environment, according to one embodiment of the present disclosure.

FIG. 2 illustrates architecture details of a FAFSS comprising various software modules, data stores, and other similar elements, according to one embodiment of the present disclosure.

FIG. 3 illustrates architecture details of the Cloud-based security platform comprising various software services, data stores, and other similar elements, according to one embodiment of the present disclosure.

FIG. 4 illustrates architecture details of the Key Service comprising various software modules, data stores, and other similar elements, according to one embodiment of the present disclosure.

FIG. 5 is an exemplary schematic showing an exemplary encryption process including intermediate processing steps and data, according to one embodiment of the present disclosure.

FIG. 6 is a flowchart summary of high-level, computer-implemented method steps illustrating exemplary FAFSS-client module processes, involving sender and recipient perspectives, and performed by various software modules and engines in a user's (sender or recipient) computing device, according to one embodiment of the present disclosure.

FIG. 7 is a flowchart showing an exemplary silent Verified Blind Enrollment engine process running as an exemplary FAFSS client module process at an end user's computing device, according to one embodiment of the present disclosure.

FIG. 8 is a flowchart showing an exemplary interactive Verified Blind Enrollment engine process running as an exemplary FAFSS client module process at an end user's computing device, according to one embodiment of the present disclosure.

FIG. 9 is a flowchart showing an exemplary detection engine process running as an exemplary FAFSS-client module process at a sender's computing device, according to one embodiment of the present disclosure.

FIG. 10 is a flowchart showing an exemplary end-point engine process running as an exemplary FAFSS-client module process at a sender's computing device, according to one embodiment of the present disclosure.

FIG. 11 is a flowchart showing an exemplary reinsertion engine process running as an exemplary FAFSS-client module at a sender's computing device, according to one embodiment of the present disclosure.

FIG. 12 is a flowchart showing an exemplary end-point engine process running as an exemplary FAFSS-client module process at a recipient's computing device, according to one embodiment of the present disclosure.

FIG. 13 is a flowchart showing an exemplary reinsertion engine process running as an exemplary FAFSS-client module process at a recipient's computing device, according to one embodiment of the present disclosure.

FIG. 14 (consisting of FIGS. 14A, 14B, 14C, 14D, and 14E) is a flowchart showing various steps performed in an exemplary FAFFS cloud-based security platform, according to one embodiment of the present disclosure.

FIG. 15 is a flowchart showing various steps performed in an exemplary FAFSS key service process, according to one embodiment of the present disclosure.

FIG. 16 is a flowchart showing various steps performed in an exemplary FAFSS enrollment service process, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

DEFINITIONS/GLOSSARY

Prior to a detailed description of the disclosure, the following definitions are provided as an aid to understanding the subject matter and terminology of aspects of the present systems and methods, which are expressed in the claims. Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Context-based key ("CBK"): generally, a key used in connection with encrypting or securing original data and decrypting the same, wherein the key is generated based on or stored in association with metadata relating to the parameters of the environment/framework wherein the original data is generated and/or stored, such that each key can be unique for each item of data generated. Examples of parameters affecting the "context" in which data is created may include, but are not limited to: user (user ID), application program being used to create the data (application program ID), specific computing session (session ID), computing device being used to create the data (computing device ID), network address, geographic location, etc. Typically, generated using a cryptographically secure random number generator. (Please refer to FIG. 5 for exemplary details). Generally synonymous with Encryption CBK.

Cryptographic algorithm: a computer algorithm that performs tasks of encryption and/or decryption. Examples include, but are not limited to, AES, RSA, and many others.

Encrypted output: generally, the final outcome of an exemplary encryption process executed in a FAFSS client operating on a user's/sender's computing device. Typically in a ciphertext format and either saved locally in a user's computing device, in an enterprise's database, remotely in a remote database server, in a cloud storage system or web application, and/or communicated via one or more networks to one or more recipients. (Please refer to FIG. 5 for exemplary details).

Encrypted version of original data: generally, un-decipherable information generated as a consequence of applying original data and a context-based key as input to a cryptographic algorithm. (Please refer to FIG. 5 for exemplary details).

Federation: generally, the ability for organizations that use the FAFSS (also referred to as tenants, per the definition below) to extend their visibility into and control over access to data to end users beyond their own boundaries. For example, federation capabilities are those that allow a company to grant customers, suppliers, and partners access to protected data in accordance with policies.

Key Tag ("CBK ID"): a unique identifier corresponding to a particular context-based key (CBK). In one exemplary, non-limiting embodiment, a key tag is created using a combination of a version number (e.g., a representation of the data format of the Key Tag), a key space ID, and a key number (e.g., a unique identifier for a particular key within one key space). (Please refer to FIG. 5 for exemplary details). In one exemplary aspect, a key tag is prepended to an instance of the encrypted version of original data to generate corresponding encrypted output.

Key Space: a partitioned storage location that contains multiple CBK IDs and CBKs; because the FAFSS, generally, serves more than one tenant, it partitions collections of key tags into key spaces. Generally, a single tenant may possess more than one key space, but a single key space belongs to only one tenant.

Key Space Identifier ("Key Space ID"): a unique identifier corresponding to a particular key space. In one exemplary aspect, a key space ID may uniquely identify a particular tenant.

Nonce: a random value that is used only once in a communication. A nonce is often used within a secure communications protocol as part of a control to prevent an attacker from impersonating a communicant by recording and replaying one or more messages.

Original data: digital information that is to be encrypted or secured. Generally, original data is generated by a user via an application program (software) and/or hardware system, or is associated with an electronic or digital file. Examples of original data include, but are not limited to, text files, audio files, video files, data files, system files, image files, or any form of digital data comprising emails, electronic documents, online messages, social media posts, web-based forms, etc., or any variant, sub-part, portion, or combination thereof. Generally synonymous with original information.

Secure Enrollment Profile ("SEP"): a collection of parameters that a client module may use to make queries associated with a specific tenant. Generally, a SEP comprises the key space with which the SEP is associated, the tenant-specific device identifier (e.g., an identifier, generated by a particular key space, that uniquely identifies a particular electronic computing device to that particular key space), a shared secret between the client modules and the key server, and a shared secret between the client modules and the cloud-based security platform.

Shared Secret: a piece of data known only to the participants in a secure communication. A shared secret may be any data, such as a password or a cryptographic key. In the context of the present disclosure, the shared secret between a client module and a key service is, in one embodiment, a 256-bit AES cryptographic key, allowing encrypted communications between the client module and the key service.

Tenant: an organization, enterprise, entity, or ephemeral group (e.g., a group of individual users connected for a common purpose but not necessarily organized into a formal legal entity) utilizing the FAF SS. In one embodiment, the FAF SS is a multi-tenant system, meaning that it provides its services to multiple organizations.

OVERVIEW

Aspects of the present disclosure generally relate to for providing information security on a contextual basis using a layer of software-based services that orchestrates the movement of context-based encryption keys without requiring plaintext access to the keys themselves.

Such a system may generate context-based keys (e.g., keys that are based on the environment wherein the data is generated) such that every key relating to every instance of data is different. In contrast to conventional data security systems, the disclosed system may have distinct aspects of authentication and encryption. Because authentication and encryption are considered distinct aspects, users should not encrypt data using a single key. On the contrary, data may be encrypted using context-based or data-based keys, and data access may be allowed based on authentication of users. Further, the disclosed key management system may provide auditing and validity capabilities, yet be scalable and flexible. Ideal auditing involves generation of an audit trail that is agnostic of the user's application software (e.g., web browser, email software, etc.) or even the operating system/platform on which the program is running.

Moreover, the authentication aspects of the disclosed system may provide the ability to manage the rights of individuals who are able to access data and/or programs according to pre-defined policies/roles (e.g., provide role-based access control functionality). In other words, the disclosed system may be implemented in user computing devices as a generic (e.g., device, platform, or application-agnostic) application software that does not require the use of specifically designed application programming interfaces (e.g., APIs) to communicate with application programs and/or hardware associated with each user's respective computing device.

Further, the system may be highly interactive and easily configurable by users having minimal technical skills and easily operable by system administrators. Further, the system may be easily accessible online by a plurality of users via their respective computing devices so that users can choose to secure data arising out of user interaction with any kind of software and/or hardware system associated any kind of computing device.

Additionally, the system may provide for federation and collaboration among organizations. If two enterprises choose to exchange data, the system may facilitate the secure movement of keys from storage within one enterprise to the end user in a partner organization (e.g., customer, vendor, or other associated organization). This movement may be done without permitting the orchestration layer to have visibility into the context-based keys, to ensure that the orchestration layer cannot, itself, become a threat to the confidentiality of the context-based keys or the data they protect. Similarly, the secure movement of keys prevents eavesdroppers (even those with pervasive access to networks) from accessing the context-based keys.

Briefly described, and according to one embodiment, aspects of the disclosed system, referred to herein as a Fully Autonomous Federated Security System (alternatively referred to herein as a "FAFSS," "federated security platform," and "virtual security platform"), include a platform as a service architecture comprising proprietary client software installed in user computing devices, proprietary server software installed in a server computer operated by an entity that utilizes an embodiment of the disclosed system, and a cloud-based platform that orchestrates the management and application of policies and the movement of keys between the end user client and the server software. In one aspect, the client software probes hardware and software associated with user computing devices in order to extract original data arising out of a user's interaction with a computing device (or application or platform operating on said computing device), thereby diverting the flow of original data directed towards an expecting application program running on the user's computing device. As will be understood, the present disclosure does not impose any limitations on the type or other specifics of application programs operating on user computing devices.

According to an aspect of the present disclosure, original data is encrypted or secured using a key created by an embodiment of the FAFSS. According to yet another aspect, the key created by the FAFSS is context-based and unique for every piece (instance) of data that is encrypted. For example, a context-based key might depend on environmental conditions associated with the context of the data (e.g., time instant at which the data is created, application program associated with the data, a unique user identifier, and other conditions). In one embodiment, a context-based key may be generated by a random number generator and stored in association with one or more metadata attributes dependent on the environmental conditions associated with the context of the data. Usually, such original data to be secured arises from user interactions with software and/or hardware components included in a user's electronic computing device. Generally, the data is secured while stored inside a user's computing device and/or enterprise data storage system and/or when electronically communicated to other person(s) or systems. Examples of data that may be secured/encrypted include (but are not limited to) text files, audio files, video files, data files, system files, image files, or any form of digital data comprising emails, electronic documents, online messages, social media posts, web-based forms, etc., or any variant, sub-part, portion, or combination thereof. Generally, the data to be secured is generated by or associated with a user's entry or input with any kind of application programs and/or hardware across a variety of computing devices (e.g., entry into an email program, spreadsheet software, social media website, etc.).

As will be described in greater detail in the discussions that follow, the result of encryption of the original data is referred to herein as the "encrypted version of the original data." In one embodiment, the encrypted version of the original data undergoes further processing and is then referred to as "encrypted output." In one exemplary scenario involving "at-rest encryption", the encrypted output is stored in the user's computing device and only temporarily decrypted via proprietary software (e.g., when later retrieved or accessed by the same user or a different user) so that a user can never access the original data without some policy being applied to that access. Alternately, in scenarios wherein secure cryptographic communication is desirable, the encrypted output is shared by a sender with one or more other users (e.g., recipients, machines, etc.). It will be understood that in many scenarios, such cryptographic communication can include one or more third party systems, providers, or services (e.g., social media systems, online bulletin boards, group email servers, etc.). Generally, encryption is performed by inputting the original data and the key into a cryptographic algorithm such as (but not limited to) Advanced Encryption Standard (AES).

According to an exemplary FAFSS aspect, functionalities of the server computer include generation and storage of encryption keys when requested by cloud-based platform services. Generally, such keys are stored inside exemplary FAFSS databases, optionally secured with a hardware security module and provided to the FAFSS cloud-based platform services when requested to orchestrate delivery of keys to FAFSS clients during a subsequent decryption process running in user computing devices. As will be understood, the disclosed FAFSS allows the same data (e.g., a single document) to be utilized by several users, potentially distributed among multiple organizations.

According to an exemplary FAFSS aspect, functionalities of the cloud-based platform services include the management of policies, delivery of application policies to FAFSS clients, and the adjudication of data protection policies. The FAFSS cloud-based platform manages the rights of individual users who are permitted to send and/or access data or denied the ability to send and/or access data according to pre-defined policies and roles. As will be understood by one skilled in the art, pre-defined policies ensure that only authorized users (e.g., depending on their roles within an organization) are able to access certain data and resources. For example, in an enterprise or corporate organization, an IT manager might be able to review any data associated with the enterprise and also change data access permissions of all employees; a director might access all data but not change access permissions; a department head might change permissions only for employees working in a department; a low-level employee may have very limited access to data; etc. In one embodiment, the FAFSS cloud-based platform routes inbound requests through the proper processing nodes to determine whether a request satisfies security policies set by organizations using the FAFSS. If a policy is satisfied, the FAFSS orchestrates the movement of keys from the sever computer to the FAFSS client, without gaining visibility into the keys themselves.

Exemplary Embodiments

Referring now to the figures, for the purposes of example and explanation of the fundamental processes and components of the disclosed systems and methods, reference is made to FIG. 1, which illustrates an exemplary, high-level overview of one embodiment of a Fully Autonomous Federated Security System (also referred to herein as "FAFSS") 100 in an exemplary environment, constructed and operated in accordance with various aspects of the present disclosure. As will be understood and appreciated, the conceptual overview shown in FIG. 1 represents merely one approach or embodiment of the present system, and other aspects are used according to various embodiments of the present system.

In one embodiment, the FAFSS 100 applies configuration-driven security policies to secure data or information based on the context in which the data is created and/or stored. Configuration-driven actions, defined in these policies, may include, but are not limited to, encrypting plaintext/cleartext data, decrypting ciphertext data, blocking the transmission of data, blocking the functionality of a website/application/program, etc. In the example shown in FIG. 1, original data 101 is encrypted using a context based key 111 (also referred to herein as "CBK" or "encryption CBK") to generate an encrypted output 117, which is subsequently decrypted using the same CBK 111. Details of usage of the CBK 111 will be better understood in connection with the discussion of FIGS. 5, 10, 12, 14, and 15. In one embodiment, the encryption and decryption that is explained in conjunction with the explanation of FIG. 1 generally occurs after verified blind enrollment (also referred to herein as "VBE") with the FAFSS 100, which is explained in further detail in conjunction with the explanation of FIGS. 6, 7, and 8.

As shown in FIG. 1, users (e.g., a sender 102 and a recipient 103) may utilize functionalities of the FAFSS 100 for purposes of cryptographically-secure communications. Generally, aspects of the present system 100 do not have to be used in a communication environment but can be used to encrypt electronic documents, database records, or other data objects for storage and subsequent use or access (through decryption of the same). In such scenarios, a "sender" may be thought of as an "encryptor," whereas the "recipient" may be thought of as an "accessor" or "decryptor."

In one embodiment, the FAFSS 100 allows cryptographic communication between a sender (user 102) and a recipient (user 103) involving a third party service such as a social media system. Generally, the FAFSS 100 comprises a client module 104A that runs inside of an electronic computing device of the sender 102, a client module 104B that runs inside of an electronic computing device of the recipient 103, a cloud-based security platform 300 (e.g., a collection of software modules running on cloud infrastructure as a service), and a key service 400 (e.g., a collection of software modules running on the utilizing organization's server hardware; although, in various embodiments, the key service 400 may be hosted on a cloud infrastructure or in the same location as the FAFSS 100) that are all connected via networks 107. Generally, the client modules 104A and 104B comprise proprietary software algorithms, modules, or applications used to perform the functionalities of the client modules as discussed herein. Details of the client modules 104A and 104B will be described later herein (e.g., in connection with the description of FIGS. 2 and 6-13). In one embodiment, the cloud-based security platform 300 provides functionalities of policy management, authorization, access control, data access policy enforcement, and auditing to support the functionality of the FAFSS 100. Accordingly, details of the cloud-based security platform 300 will be explained in connection with the description of FIGS. 3, 14, and in other places in this disclosure. In one embodiment, the key service 400 provides functionalities of key generation, secure key storage, and storage of key metadata. Further details of the key service 400 will be discussed in connection with the description of FIG. 15 and in other places in this disclosure.

As shown in FIG. 1, the FAFSS client modules 104A and 104B, the cloud-based security platform 300, and the key service 400 all communicate via networks 107 (such as, but not limited to the Internet) and typically involve the usage of one or several services (e.g., a Web-deployed service with client/service architecture, a corporate Local Area Network (LAN) or Wide Area Network (WAN), a cellular data network, or through a cloud-based system). Moreover, as will be understood and appreciated by one having ordinary skill in the art, various networking components like routers, switches, hubs, etc. are typically involved in these communications. Although not shown in FIG. 1, such communications may include, in various embodiments, one or more secure networks, gateways, or firewalls that provide additional security from unwarranted intrusions by unauthorized third parties and cyber-attacks. Additionally, FAFSS client modules 104A and 104B, the cloud-based security platform 300, and key services 400 may include, in one embodiment, operative connections to various other users, systems, and third parties via networks 107.

According to one embodiment of the present disclosure, FAFSS client modules 104A and 104B operate on users' (e.g., senders' 102 and recipients' 103) electronic computing devices (e.g., desktop computers, laptop computers, cellular phones, mobile devices, tablet PCs, or any other device capable of accessing a network or the Internet) and are proprietary software programs (e.g., plugins) that run transparently in the background of the users' devices (e.g., in an "always on" operating mode). In one embodiment, when a user desires to encrypt or secure original data 101 (or as defined in the configuration-driven security policies), the original data 101 does not leave the user's electronic computing device; rather, encrypted output 117, which is an un-decipherable form of the original data as a result of exemplary encryption processes (e.g., ciphertext data), is transmitted from the device to its intended destination. Generally, users' electronic computing devices may comprise mobile devices (e.g., smart phones, tablets, smart watches, etc.), and FAFSS client modules 104A and 104B may also be configured as a mobile device application (e.g., mobile app) such as those available for the popular APPLE® IPHONE® or GOOGLE® ANDROID® mobile device operating systems.

For purposes of example and explanation, it can be assumed that users (e.g., senders 102 and recipients 103) will initially register with an embodiment of the FAFSS 100. Details of the registration will be discussed in connection with FIGS. 6-8, 14, 16, and in other places in the disclosure. During registration, users 102 and 103 establish a shared secret with the key service 400 so that the cloud-based security platform 300 can route CBKs 111 without visibility into the CBKs 111 themselves (e.g., the cloud-based security platform 300, although it receives and transmits the CBKs 111, cannot access, view, use, and/or read the CBKs 111) and eavesdroppers in the network 107 cannot access, view, and or/read the CBKs 111.

Furthermore, although not shown in FIG. 1, in various embodiments, the FAFSS 100 may include one or more client module databases inside a user's (sender/recipient) electronic computing device. Generally, FAFSS client modules running on user computing devices will have access not only to FAFSS client module databases but also to volatile as well as non-volatile memory (e.g., RAM, hard drive, external drives, flash memory, etc.) associated with a user's electronic computing device.

Additionally, users or system administrators can leverage data security and access control functionalities of the FAFSS 100 by specifying various rules (alternately referred to herein as "policies") during initialization or normal operation of the FAFSS 100. Generally, rules govern the rights of users to access data and/or associated software programs to achieve information security. In various embodiments, these rules may be developed through a script developed using a scripting language, specified via a user's mobile device, or developed in some other manner as will occur to one of ordinary skill in the art. These rules are typically stored in the exemplary cloud-based security platform 300. Additionally, in various embodiments, the FAFSS 100 may obtain rules from other third-party sources, such as other applications, web services, cloud computing services, etc. Generally, rules governing application behavior (e.g., functionality of websites, software programs, etc.) are loaded into and enforced in the FAFSS client modules 104A and 104B on a user's electronic computing device, while those rules governing access to data (e.g., whether a particular user may receive a CBK to access a particular file) are loaded into and enforced in the cloud-based security platform 300 (further details of these rules will be provided in association with the descriptions of FIGS. 6 and 14).

Consider the following exemplary scenarios wherein embodiments of the present system may be used to secure information or data: in one exemplary scenario, confidential emails sent by the CEO of a hypothetical corporate organization using MICROSOFT™ OUTLOOK™ to internal employees of the organization are encrypted according to the present disclosure to provide information security. Consequently, non-employees (e.g., outside contractors, suppliers, etc.) or even unauthorized employees who somehow manage to obtain copies of the encrypted emails will not be able to decipher the confidential contents of such emails. Further, the CEO might restrict certain emails only to those individuals who have appropriate access rights (based on predetermined policies), such as members of the executive management team. Generally, policies can be based on various conditions as will occur to one skilled in the art. Examples of such conditions include the role of the user from whom the query originated, the IP address/location of the user, the time of the day at which the query originated, and various other parameters relating to the originating environment of the query. Exemplary policies will be discussed in connection with the description of FIG. 14. Additionally, the CEO could restrict different portions of the same e-mail so that only those individuals who have appropriate access rights can view those restricted portions (e.g., different portions of the e-mail could be individually encrypted with different CBKs 111). In another exemplary scenario, a hypothetical corporate organization might define policy information regarding data files in an enterprise file sharing and collaboration web application through its access control system. The FAFSS 100 system could use the policy knowledge in that enterprise file sharing and collaboration web application to restrict access to encrypted data objects to employees granted access in the file sharing application. Consequently, even if an encrypted file is removed from the file sharing and collaboration web application, an unauthorized employee who somehow manages to obtain a copy of that encrypted file will not be able to decipher its contents.

In another exemplary scenario, a hypothetical corporate organization might define policy information regarding websites through its access control system. The FAFSS 100 system could use the policy knowledge in that access control system to restrict access to certain functionalities of various websites, such as file uploading. Consequently, even if an unauthorized employee who somehow manages to obtain a decrypted copy of an encrypted file, the employee will not be able to upload that file to various websites.

In another exemplary scenario, a user who publishes messages on social media systems (e.g., TWITTER™, FACEBOOK™, and the like) might restrict the ability to view his or her messages to selected friends of the user. Information identifying the selected friends may be initially specified by the user to the FAFSS 100. Subsequently, persons aside from the user's selected friends will not be able to decipher the user's messages published by the user on the social media system, as the messages or posts will appear encrypted or as ciphertext to any non-authorized users. These aspects, along with various other details of the client modules (and also server modules) will be understood in greater detail in the discussions that follow herein.

Generally, by way of example, and not by way of limitation, a high level summary of actions involved in an exemplary cryptographic communication between a sender 102 and a recipient 103 involving a web application 108 is shown in FIG. 1. In this exemplary scenario, it is assumed that a sender 102 (generally, a FAFSS user) wishes to publish an instance of original data 101 on a web application 108 using an electronic computing device. It will be understood that the said web application may be associated with the sender 102 or can belong to other users, organizations, or entities. In the example shown, the original data 101 that the sender 102 wishes to publish is a message "SSN 123-45-6789" that may correspond to sensitive information regarding the sender 102 (e.g., the sender's 102 social security number, etc.). As will be understood, the scenario shown in FIG. 1 is just one, non-limiting example, and the FAFSS 100 may be used for storing/retrieving data and other use cases.

Generally, the FAFSS client module 104A tracks input (e.g., text entered into a text-entry field) by users (e.g., sender 102) directed to expecting third party application programs or software 108 (e.g., web-browsers, email programs, mobile applications, word processing applications, or any other external programs) for the purposes of identifying original data 101 that needs to be secured. In one embodiment, a FAFSS client module 104A detects original data 101 input by a user and compares the original data 101 and user actions to the policy loaded into the client module 104A from the cloud-based security platform 300. The policy may protect data security with a variety of actions, such as blocking the submission of data to the web application 108. For this example, the policy also provides for encryption of the data. The client module 104A thereafter diverts the data flow from the expecting third party application program into modules within the FAFSS client module 104A (sender). Details of the steps involved in detection and diversion of original data 101 will be further discussed in connection with FIGS. 6 and 9. Generally and in one embodiment, the FAFSS 100 secures or encrypts the original data 101 directed to third party application programs or software, without any limitations on the type, number of running programs, or the platform (operating system) associated with such programs or software. In embodiments wherein users or administrators do not wish to secure their data, FAFSS client modules are configurable, including an option to configure the FAFSS client modules not to provide security, as will be further discussed in connection with FIGS. 6 and 14.

Still referring to FIG. 1, before being published on the respective web application 108, the FAFSS client module 104A in the sender's computing device transmits a query 109 comprising a nonce, a tenant-specific device ID (alternatively referred to herein as a "device identifier," "device ID," and/or "tenant-specific device identifier"), a hardware fingerprint hash (e.g., electronic computing device identity identifier, as will be explained in association with the description of FIG. 3), and other relevant information to the cloud-based security platform 300 via the network 107. As will be understood and appreciated by a person skilled in the art, because of the real-time nature of the above scenario, steps involved in a cryptographic communication are performed in real-time or in virtually real-time and happen in an expeditious and generally imperceptible manner to the user. In one embodiment, the cloud-based security platform 300 verifies that the query 109 from user 102 satisfies predefined access control policies. Correspondingly, the cloud-based security platform 300 forwards a request 110 to the appropriate key service 400 to create a context-based key (CBK) and key tag (as explained in further detail in conjunction with the discussion of FIG. 5). The appropriate key service 400 creates a CBK 111 and key tag 112, internally storing any metadata associated with the key tag 112 (e.g., creating user ID, time of creation, application ID, etc.) in the key service 400. The key service 400 encrypts the CBK 111, effectively creating a secure enveloped CBK 113 using a key shared with client module 104A but unknown to the cloud-based security platform 300. The key service 400 then returns the enveloped CBK 113 and key tag 112 to the cloud-based security platform 300. The cloud-based security platform 300 returns the enveloped CBK 113 and key tag 112 to the client module 104A. The client module 104A uses its key shared with the key service 400 to unwrap (e.g., decrypt) the secure envelope around the CBK 111. Generally, the key tag 112 and CBK 111 are unique to the particular instance of data 101 to be secured. Details of the generation of the encryption CBK 111 will be discussed in greater detail in connection with FIG. 15. According to one embodiment, upon decrypting the enveloped CBK 113, thereby recovering the CBK 111, the client module 104A encrypts the original data 101 at step 114 using an encryption algorithm and the encryption CBK 111. The outcome of encrypting the original data 101 is referred to herein as the encrypted version of the original data 115. Details of an exemplary encryption process and associated terminologies will be explained in connection with FIG. 5. Examples of encryption algorithms include, but are not limited to Advanced Encryption Standard (AES), Data Encryption Standard (DES), and various other such algorithms. In one embodiment, at step 116, the client module 104A concatenates the key tag 112 with the encrypted version of original data 115 to generate encrypted output 117. Therefore, as shown in FIG. 1, in the above exemplary scenario, the original data 101, e.g., "SSN 123-45-6789" is transformed into the encrypted output 117, e.g., "Y$9#72!AG4", which is undecipherable to persons who do not have knowledge of the encryption CBK 111 used to encrypt the original data 101.

Subsequently, the exemplary output "Y$9#72!AG4" is processed by the client module 104A (sender) and reinserted into the expecting third party application program (e.g., a web-browser program as discussed above) in the sender's computing device. (Details of the steps involved in reinsertion of the encrypted output 112 and other associated processing will be discussed in connection with FIG. 11). Then, the sender's computing device transmits the encrypted output 117 across one or more networks 107 to a web application 108. It will be apparent to one skilled in the art that in alternate embodiments (not shown in FIG. 1), the encrypted output 117 can be transmitted to any third party system, service, or provider (e.g., enterprise database, email system, social media system, etc.) and stored or utilized within that environment (e.g., the email system may transmit the encrypted output 117 to a third party as an attachment to an email). The web application 108 in the scenario illustrated in FIG. 1 is simply an example of such a third party system, service, or provider. Alternately, in many scenarios, a sender (e.g., the client module 104A) can directly transmit a sender's communication (e.g., email message, text message, chat, or any other data or files) directly to a client module 104B (recipient) without involvement of a third party system, service, or provider.

Continuing with the description of FIG. 1, a recipient receives the sender's communication. Particularly, a recipient's computing device (or, a program such as a web-browser installed therein) communicates with the web application 108 and views/receives the encrypted output 117, e.g., "Y$9#72!AG4" as illustrated in FIG. 1. In the next steps, a client module 104B in a recipient's computing device processes the encrypted output 117 for the purposes of recovering the original data 101 from the encrypted output 117. Generally, the client module 104B processes the encrypted output 117 before rendering to the recipient 103 visually and/or in an otherwise perceptible manner via a respective application program. Therefore, at step 120, the client module 104B un-concatenates the encrypted output 117 to separate the encrypted version of the original data 115 from the key tag 112, thereby generating the encrypted version of the original data 115. It will be recalled that previously at step 116, the client module 104A (sender) had concatenated the key tag 112 and the encrypted version of the original data 115 to generate the encrypted output 117.

It will be understood that the encrypted version of the original data 115 is still in an undecipherable form (e.g., ciphertext), and recipients who are authorized by policies created by the sender 102 (or system administrators) will be allowed to access the original data 101. Thus, at step 121, the client module 104B transmits a query 121 to the cloud-based security platform 300, requesting the encryption CBK 111 that was used to encrypt the sender's original data 115 earlier at step 114. According to one aspect, the query 121 from the client module 104B comprises the key tag 112 that was extracted (previously at step 120) from the encrypted output 117.

In accordance with aspects of this disclosure, the cloud-based security platform 300 forwards a request for the CBK 111, which comprises its respective key tag 112, to the appropriate key service 400. The appropriate key service returns the CBK 111, encrypted with the shared secret/key known only to the key server 400 and the client module (recipient) 104B, but not the cloud-based security platform 300, forming a secure envelope to conceal the CBK from the cloud-based security platform and any eavesdroppers monitoring network traffic on the network 107. In one embodiment, the key server 400 response to the cloud-based security platform 300 also includes metadata 124 about the original data (e.g., original author's role/department, date of creation, etc.). The cloud-based security platform 300 uses this metadata 124 and other sources of information to determine whether the client module 104B is authorized to access the original data based on pre-defined policies or access rights. If the cloud-based security platform 300 determines that the client module 104B is authorized to access the original data 101 based on pre-defined policies or access rights, then the cloud-based security platform 300 provides the securely enveloped (encrypted) CBK 123 to the client module 104B. After receiving the securely enveloped CBK 123, the client module 104B unwraps (decrypts) the envelope using the shared secret (shared between the client module 104B and the key server 400), yielding CBK 111. Details of the cloud-based security platform process will be discussed in connection with FIG. 14.

After receiving the encryption CBK 111, the client module 104B decrypts (at step 125) the encrypted version of the original data 115 to generate the original data 101 (e.g., "SSN 123-45-6789"). In one aspect, the FAFSS integrates the original data 101 into an appropriate position inside the expecting third party application programs or software (e.g., at a specific location in a page or a document as applicable in web-browsers, email programs, mobile applications or any other external programs) in an unaltered manner having an identical "look and feel" to the original data, as expected by the expecting third party application programs or software.

In one embodiment, if the client module 104B is not authorized to access the original data 101 based on pre-defined policies or access rights (e.g., the cloud-based security platform 300 determines, based on metadata 124 and other sources, that access should be denied), then, instead of providing the securely-enveloped CKB 123, the cloud-based security platform 300 may take a particular predefined action. For example, the cloud-based security platform 300 may provide an error message, notify a predetermined administrative user, generate a record of the transaction, block requests from that particular client module 104B, unenroll the client module 104B, etc.

Although not specifically shown in FIG. 1, some embodiments of the FAFSS 100 (e.g., with the help of functionalities of the cloud-based security platform 300) provide an audit trail of any kind of communication or transaction involving FAFSS client modules. Information included in the audit trail includes, but is not limited to, details identifying the sender's computing device, the recipient's computing device, date/time when a query was received, corresponding to encryption (e.g., as shown in step 114 of FIG. 1), and/or decryption (e.g., as shown in step 125 of FIG. 1), the associated application programs at issue, and various other details. It will be appreciated that the audit trail of any kind of communication from client modules is helpful in different scenarios (e.g., financial services, healthcare, insurance, military defense, and many others).

The discussions above in association with FIG. 1 merely provide an overview of one embodiment of the present system for securing or encrypting a communication and/or information between a sender and a recipient involving a third party service (e.g., a web application 108) and are not intended to limit in any way the scope of the present disclosure. Also, multiple recipients can be involved in a cryptographic communication (e.g., in one-to-many scenarios). In such scenarios, every recipient may have respective FAFSS client modules running on their respective computing devices, constructed in accordance with the present disclosure. In one embodiment, if such client modules are not present on certain users' devices, then those users will be unable to decrypt or decipher the secured data 117. Furthermore, it will be also understood that senders or system administrators may predefine access control policies that govern the rights of recipients in being able to access the entire instance of a sender's original data (or a portion of the sender's original data) using certain types of software programs.

In alternate embodiments, a sender can communicate directly with a recipient without involving a third party service, system, or provider (e.g., chat/text/multimedia messages sent by a sender to a recipient). In another embodiment (not shown in FIG. 1) but in accordance with the present disclosure, the FAFSS 100 facilitates securing documents or other electronic data that are locally saved in a user's electronic computing device or are saved in a system-wide database by providing functionalities associated with "at-rest encryption." In one embodiment, the FAFSS 100 may secure data (or, more precisely, original data 101) that does not travel through any type of communication network, but instead is locally saved in an un-decipherable manner (e.g., ciphertext) inside the user's computing device or database. In one embodiment, the FAFSS 100 may permit only local, temporary decryption of encrypted output 117 (e.g., in a secure, proprietary application/program that limits a users' ability to interact with the original data 101 through use of policies, etc.) so that the original data 101, after encryption, is never available in plaintext form, without access/use restrictions, again. In some parts of this disclosure, such temporary decryption is referred to as "persistent encryption." Examples of such data that may be secured include a user's social security number, health records, financial data and other personal information of users. Generally, in scenarios wherein the FAFSS 100 provides functionalities of at-rest encryption, the client module inside a user's computing device operates in a dual role—operating as a "sender" during an encryption process (e.g., transformation of original data 101 into encrypted output 117) and subsequently as a "recipient" during a decryption process (e.g., reverse transformation of encrypted output 117 back into original data 101). Therefore, aspects of FAFSS client modules 104A and 104B in cryptographic communication (e.g., involving senders' perspectives and recipients' perspectives) as disclosed herein can also be applied to FAFSS 100 embodiments that provide functionalities of at-rest encryption. Various architectural details of an embodiment of the disclosed FAFSS 100 will be described next in greater detail.

FIG. 2 illustrates an exemplary system architecture 200 of the FAFSS 100 according to one embodiment of the present system, involving various modules and system components. The functions and operations of these exemplary modules and system components are described in greater detail below. As shown, in one scenario, cryptographic communication involves a sender 102 and a recipient 103. In such scenarios, the FAFSS 100 includes a cloud-based security platform 300, one or more key services 400, one or more enrollment services 201, and client modules 104A (sender) and 104B (recipient), each comprising a plurality of software modules, processes, sub-routines, or, generally, algorithms operated by the FAFSS 100, cloud-based security platform 300, key services 400, and enrollment services 201. Client modules 104A and 104B generally reside inside the sender 102 and recipient's 103 respective electronic computing devices. As recited previously and in one embodiment, client modules 104A and 104B are running on sender's and recipient's electronic computing devices (e.g., desktop computers, laptop computers, tablet PCs, or any other device capable of accessing the network 107) via proprietary software programs (e.g., plugins) that operate as background processes (e.g., in an "always on" operating mode without immediate visibility to the user). In one embodiment, the cloud-based security platform 300 includes proprietary programs that run on any and multiple of a number of cloud infrastructures, with federation services to route requests among the various nodes in the cloud-based security platform. In one embodiment, the key service 400 and enrollment service 201 include proprietary programs that reside on servers owned and operated by organizations utilizing the FAFSS 100.

Generally, the FAFSS client modules 104A and 104B are preconfigured so as to integrate with and operate seamlessly for every application program/software running on users' electronic computing devices. In one embodiment, configuration software is generated for all commonly-used application programs (e.g., word processing, browsers, spreadsheet, etc.) such that embodiments of the client modules run according to user-friendly plug and play mechanisms. If a new application program is identified with which the FAFSS 100 has not been configured to interact, then the FAFSS 100 can be modified such that it subsequently detects information from and interacts with the identified application.

In the specific embodiment shown in FIG. 2, a client module 104A comprises a detection engine 202, an end-point engine 203, a reinsertion engine 204, and a user's computing device database 205 that stores information locally on the device or within the client module. In the same embodiment, it is also shown that the FAFSS client module 104B (recipient) comprises an end-point engine 203, a reinsertion engine 204, and a user's electronic computing device database 205. Generally, the device database 205 comprises any storage medium associated with the user's electronic computing device (e.g., hard drive, network storage, thumb drive, etc.) that is used to store the SEPs, encrypted outputs 117, etc. in accordance with this disclosure.

In one embodiment, the end-point engine 203, reinsertion engine 204, and user's computing device database 205 are the same regardless of whether they comprise a sender client module 104A or a recipient client module 104B. Further, in one embodiment, client modules 104A and 104B may not be separate modules but, instead, are the same client module residing within a user's electronic computing device (e.g., when a user is both a sender 102 and a recipient 103). In what follows below, reason(s) explaining why some FAFSS 100 embodiments (e.g., as in recipient client module 104B) may not include the detection engine 202 (described in connection with FIG. 9) are provided. Generally (and as described elsewhere herein), client modules 104A and 104B can perform the same or similar processes when each module acts in a sending or receiving capacity. Specifically, in one instance, the module 104A might receive and decrypt certain original data that was encrypted by module 104B, and vice versa. Accordingly, the architecture 200 shown in FIG. 2 is for exemplary purposes only.

As will be understood from the descriptions subsequently herein, in one embodiment, the detection engine 202 performs the task of detecting user interaction with an electronic computing device (e.g., that of user 102 or recipient 103). Further details regarding detection of original data are provided elsewhere herein. For cryptographic communications involving multiple users, at any given snapshot of time in one embodiment, there may be one sender 102 and one or more recipients 103. Thus, in embodiments wherein a user is a recipient 103, the user's client module 104B does not necessarily comprise a detection engine 202 because recipients 103 typically do not have to input any kind of data into their respective electronic computing devices. Nevertheless, it will be understood by one of ordinary skill that a user who is a recipient 103 at one time instant can be a sender 102 of a communication at another instant of time so his/her client module 104A or 104B may comprise a detection engine 202. In alternate FAFSS 100 embodiments wherein multiple users attempt to send information simultaneously, information from multiple users is queued up and disseminated systematically according to some predetermined manner/policy.

As will be generally understood, in one embodiment, the functions of the end-point engine 203 depend on whether the FAFSS client module operates as a sender 104A or as a recipient 104B. Inside a sender's 102 electronic computing device, the end-point engine 203 performs the tasks of encrypting the original data 101 input by the sender 102 to ultimately generate the encrypted output 117. On the other hand, inside a recipient's 103 electronic computing device, the end-point engine 203 performs the task of decrypting the encrypted output 117 to extract the original data 101. Additionally, the end-point engine 203 is also typically involved in transmitting queries to and receiving responses from the cloud-based security platform 300. It will be recalled from the previous discussions in connection with FIG. 1 that the client module 104A or 104B can function both as a sender as well as a recipient in many scenarios (e.g., scenarios wherein the FAFSS 100 provides functionalities of at-rest encryption, etc.). Additional details of processing steps followed in an embodiment of an end-point engine indicating sender and recipient perspectives will be explained in connection with FIGS. 10 and 12 respectively.

Still referring to FIG. 2, in one aspect, the reinsertion engine 204 receives (or retrieves) the outcome of the processing performed by the end-point engine 203 and integrates the outcome into an appropriate position inside the expecting third party application in an unaltered manner. Generally, inside a sender's 102 electronic computing device, the reinsertion engine 204 inserts the encrypted output 117 into the expecting third party application program, whereas inside a recipient's 103 electronic computing device, the reinsertion engine 204 inserts the original data 101 into an appropriate position (e.g., proper dialog box, row, column) in the expecting third party application program.

As will be described further herein, the cloud-based security platform 300 provides a central point of management for policies applied by the FAF SS 100. In various embodiments, it answers queries from client modules 104A and 104B, providing application policy governing the users' actions to secure data. The cloud-based security platform 300 also orchestrates the movement of CBKs and Secure Enrollment Profiles (alternatively referred to herein as "SEP") without requiring access to unencrypted CBKs or SEPs.

Also shown in FIG. 2 are the key service 400 and enrollment service 201. In one embodiment, the key service 400 is responsible for creation and secure storage of CBKs and the keys used in SEPs. As will be detailed further herein, the enrollment service 201 interacts with the client modules 104A and 104B, the key service 400, and the cloud-based security platform 300, to establish a shared secret between the client modules 104A and 104B and the key service 400 using the VBE protocol (as detailed in FIGS. 7 and 8). This shared secret then allows the client modules 104A and 104B and the key service 400 to exchange CBKs that are encrypted with a shared secret (e.g., wrapped in a secure envelope) such that the cloud-based security platform 300 can orchestrate the movement of the CBKs while remaining blind to them (e.g., without being able to access/use the CBKs).

As also shown in FIG. 2, the client modules 104A and 104B have operative connections via networks 107 with the cloud-based security platform 300 and the enrollment service 201. The cloud-based security platform 300 further has operative connections via networks 107 with the key service 400. The composition of the cloud-based security platform 107 is further discussed in FIG. 3. It will be understood and appreciated that the specific modules and databases in FIG. 2 are shown for illustrative purposes only, and embodiments of the present system are not limited to the specific architecture shown. For example, functionalities of the detection engine 202, the end-point engine 203, and the reinsertion engine 204 can be combined into a single or even multiple module(s), possibly with other functionalities as will occur to one of ordinary skill in the art. In what follows next, several steps and functionalities (performed by the FAFSS modules) and terminologies associated therewith will be explained.

FIG. 3 illustrates an exemplary architecture of the cloud-based security platform 300 according to one embodiment of the present disclosure, involving various services, modules and system components. In various embodiments, the cloud-based security platform 300 comprises a client manager 301, management dashboard 302, federation service 303, authorization service 304, policy service 305, enterprise manager 306, analytics service 307, logging service 308, and data retention service 309. The functions and operations of these exemplary services, modules, and system components are described in greater detail below for exemplary purposes only.

As shown and in one embodiment, the client manager 301 is the component of the cloud-based security platform 300 that accepts connections from client modules 104A and 104B. The client manager 301 checks requests from client modules 104A and 104B to ensure that the requests contain all of the information necessary to process the request and that the information is free from obvious errors (e.g., that the key space refers to a real key space that has been registered with the cloud-based security platform, that the request format is correct, etc.). As will be understood and appreciated by one of ordinary skill, the client manager 301 also provides a security boundary for other services in the cloud-based security platform 300 (e.g., management dashboard 302, federation service 303, authorization service 304, policy service 305, enterprise manager 306, analytics service 307, logging service 308, and data retention 309). By standing between some of the other components and the networks 107, the client manager 301 limits an outside attacker's ability to attempt to exploit or conduct denial of service attacks against other components in the cloud-based security platform 300.

In one embodiment, the management dashboard 302 provides a web-based management console for system administrators among both the operator of the cloud-based security platform 300 and the organizations utilizing the FAFSS 100. Generally, the management dashboard 302 provides functionality for the cloud-based security platform's 300 operators to add and manage tenants (e.g., organizations utilizing the FAFSS 100). System administrators, including those among the organizations that utilize the FAFSS 100, may, in various embodiments, create, review, update, and delete information about end users, devices, and the policies to be enforced by the FAFSS 100.

In one embodiment, the federation service 303 is responsible for routing queries, such as requests to enroll, requests to create CBKs, and requests to fetch existing CBKs, to the correct portion of the cloud-based platform architecture 300 to answer the query. In some embodiments, multiple organizations utilize the same cloud-based security platform 300, which implements a multi-tenant architecture that allows each of these organizations to operate independently of the others (e.g., none of their respective data is intermingled, accessible by the other organizations, etc.). Moreover, the architecture of the cloud-based security platform 300 may be run on computing infrastructure (e.g., server computers, etc.) provided by a wide variety of infrastructure as a service cloud computing providers, as depicted in FIG. 3 (e.g., Cloud Provider A, Cloud Provider B, Cloud Provider C). Conducting operations across multiple cloud providers allows the system to operate with high availability, as a failure in any one cloud computing node leaves the remainder of the cloud-based security platform 300 operational. Additionally, tenants may choose to limit the locations to which their keys, metadata, user information, and device information are replicated. For example, some organizations may not permit their data to leave a certain geopolitical boundary (e.g., Switzerland). In other cases, the cloud-based security platform 300 may distribute data storage and processing load in such a fashion as to optimize query performance. In one embodiment, when a client module 104A and 104B makes a query to the cloud-based security platform 300, the federation service 303 checks the query against a mapping from tenant identities to cloud-based security platform 300 nodes. If the federation service 303 is not able to answer the query, it forwards the query to a federation service 303 of a cloud-based security platform node that has the capability to answer the query. The federation service 303 allows the cloud-based security platform 300, in one embodiment, to scale to larger volumes of requests by adding additional cloud nodes, thereby providing more resources over which to spread the requests. The federation service 303 also, in one embodiment, enables collaboration among organizations utilizing the FAFSS 100 by allowing client modules 104A and 104B to enroll and make requests for CBKs controlled by other organizations.

In one embodiment, the authorization service 304 is responsible for authenticating and authorizing users of the system 100. For administrators working with the management dashboard 302, the authorization service 304 generally compares a user's login credentials, such as a username and password, to stored credentials in order to authenticate a user of the system 100. When a client module 104A and 104B makes a query to the cloud-based security platform 300, in one embodiment the authorization service 304 uses the tenant-specific device ID included in the query to associate the query with the user ID of a previously registered user. Additionally, the authorization service 304 generally checks the device fingerprint hash for the electronic computing device on which the client module is operating against a previously stored fingerprint hash to ensure that client modules 104A and 104B are running on the same end user computing device that was used during enrollment. A fingerprint, according to one embodiment, is a set of data collected from the computing device on which the client modules run. This data could include, but is not limited to, hardware serial numbers, operating system component names and version numbers, and operating environment configuration parameters, such as the device's current network address. As will be understood and appreciated by one having ordinary skill in the art, such a data set may be used to uniquely identify the electronic computing device on which the client software runs. Generally, the fingerprint hash corresponding to a particular electronic computing device does not change. In one embodiment, a cryptographic hashing algorithm, such as but not limited to SHA-1 or MD-5, is used to reduce this collection of data to a single, small value that will change if the underlying fingerprint data set changes (e.g., if the fingerprint hash submitted with a query is the same as previous fingerprint hashes, it provides some assurance that the client modules are operating on the same device as previously; if the fingerprint hash changes, it indicates that the underlying fingerprint data set has changed values, which may indicate that the client module software is running on different hardware).

Still referring to FIG. 3, in one embodiment, the policy service 305 manages statements of policy, the rules that govern the application of security controls to protect data. In one embodiment, system administrators enter and define security policies using a management dashboard 302. For example, these policies may comprise when to encrypt/decrypt data, specific actions to take with regard to certain websites (e.g., block certain functionality, etc.), etc. In other embodiments, the cloud-based security platform 300 may receive policy information from other systems, the policies may be pre-established according to certain default setting, the policies may be learned through machine learning, etc. In one example, the cloud-based security platform 300 might take in statements of policy by monitoring the policies specified for an enterprise file sharing and collaboration SaaS application. The policy service 305 could then use the same policies, autonomously, without any additional system administrator action through the management dashboard 302, to adjudicate requests for access to data.

In one aspect, the policy service 305 responds to queries originating from client modules 104A and 104B, supplying application policy. In this aspect, the policy provided by the policy service 305 determines how the client modules 104A and 104B will respond to user inputs and actions within an application. For example, a policy might block the transmission of data from a client module 104A and 104B to a web application. In other cases, the application policy might allow transmission of the data but require that data be encrypted prior to transmission. These processes are described in greater detail in FIGS. 6 and 14.

In another aspect, the policy service 305 adjudicates requests to create and retrieve CBKs for the purpose of encrypting and decrypting data, respectively. The policy engine may consider a variety of factors, including user ID, tenant-specific device ID, network location, the software application in use on the client computing device, time, location, historical data, and other factors, in determining whether to allow access to CBKs, and thus, encrypted data. The FAFSS 100 need not be the source of information for all of the factors considered to render a policy decision. Based on the decision reached, the policy service 305 may return CBKs or an error message indicating that the request is denied. These processes are described in greater detail in FIGS. 6 and 14.

In one embodiment, the enterprise manager 306 is responsible for routing requests and replies between the cloud-based security platform 300 and the components of the FAFSS 100 that operate on server hardware provided and controlled by utilizing organizations (e.g., the key service 400 and the enrollment service 201). Generally, each key service 400 stores CBKs and metadata corresponding to different key spaces for different tenants. Moreover, in one embodiment, an organization may choose to deploy multiple key services 400 in geographically diverse locations to achieve high availability of CBKs (e.g., reduce lag time in generation/retrieval of CBKs, prevent loss of service, etc.). The enterprise manager 306 generally routes requests to the key service 400 that has the CBK and metadata to answer the query. Similarly, in another aspect, the enterprise manager 306 routes requests to enrollment services 201 during a verified blind enrollment (VBE) process, which will be described in greater detail below. As will be understood and appreciated by one of ordinary skill, the enterprise manager 306 also provides a security boundary for other services in the cloud-based security platform 300 (e.g., any service except for the client manager 301 such as the policy service 305, analytics service 307, etc.). By standing between some of the other components and the networks 107, the enterprise manager 306 limits an outside attacker's ability to attempt to exploit or conduct denial of service attacks against other components in the cloud-based security platform 300.

As also shown in FIG. 3, in one embodiment, the architecture of the cloud-based security platform 300 includes an analytics service 307. In one embodiment, the cloud-based security platform 300 creates a record of every query transaction. Every time a client module 104A or 104B makes a query to the cloud-based security platform 300, generally, the cloud-based security platform 300 records the query and the result. For example, in one embodiment, every time a client module 104A or 104B submits a query to request a CBK, the policy service 305 makes a record of the query, including all of the query parameters, such as the key tag, user ID, and tenant-specific device ID involved. These records are created during the processing of the request and, as described in the explanations of FIGS. 14C, 14D, and 14E, sent to the analytics service 307. These transaction records, a log of each request the client managers make to the cloud-based security service, generally provide an audit log of the FAFSS 100, for the analytics service 307 to use in producing insights into how the system is being used. The analytics service 307 consumes the transaction records, feeding them into a variety of streaming supervised, semi-supervised, and unsupervised analytics. Analytic results, provided through the management dashboard 302 provide insights to human administrators about end user usage of the system and patterns of data access, to include potentially anomalous patterns of attempted or actual data access.

As will be understood and appreciated by one skilled in the art, a cloud-based security platform 300 may require logging of processes and operations conducted during the course of operations in various embodiments. Log data provides a basis for troubleshooting, analyzing performance, and auditing system behavior. In one embodiment, each of the services records log entries during its operations. Generally, the logging service 308 collects and aggregates log data from throughout the cloud-based security platform 300.

In one embodiment, the data retention service 309 comprises persistent storage for databases, supporting the other services in the cloud-based security platform 300. For example, the data retention service 309 may store analytics data, logging data, policies, etc.

FIG. 4 illustrates an exemplary schematic of one embodiment of the key service 400, according to one exemplary embodiment of the present disclosure. The key service 400 generally provides secure storage and retrieval of CBKs and CBK metadata within software modules operating on the utilizing organization's (e.g., tenant's) server hardware. In one embodiment, a configuration and management interface 401 provides a web-based interface for system administrators to configure the key service 400. For example, system administrators may configure the key service 400 with a network addresses to connect with the cloud-based security platform 300. In one embodiment, the key service 400 uses public key certificates to establish a two-way authenticated tunnel with the cloud-based security platform 300. The configuration and management interface 401, in various embodiments, provides functionality for a system administrator to configure the certificates. The configuration and management interface 401 stores these configuration settings in configuration storage 402 for later retrieval and use by the other software modules and components in the key service 400.

In one embodiment, a cloud-based security platform communication manager 403 is the software module responsible for communications with the cloud-based security platform 300. Generally, it transforms information in memory in the key service 400 into an appropriate format for transmission over the network 107 to the enterprise manager 306. In various embodiments, a key management service 404 generates and manages access to CBKs in accordance with the present disclosure. A cryptographic library 405, in various embodiments, provides a set of cryptographic algorithms, such as those for encryption, decryption, digital signatures, and verification of digital signatures. A logging component 406 generally collects and stores log entries associated with transactions within the key service 400. A key storage 407, in one embodiment, provides a secure storage environment for storage of cryptographic keys (e.g., CBKs). In one embodiment, the key storage 407 may comprise multiple databases for storage of CBKs for efficiency and/or security purposes.

Referring now to FIG. 5, an exemplary schematic 500 is illustrated showing certain steps and functionalities performed in an encryption process involving processing at FAFSS client modules 104A, the cloud-based security platform 300, and the key service 400, according to one embodiment of the present system. It will be understood and appreciated by one skilled in the art that aspects of the encryption process are applicable to FAFSS 100 embodiments involving at-rest encryption functionalities as well as cryptographic communication functionalities, as discussed at various places in this disclosure. As shown in FIG. 5, within the FAFSS client modules 104A, cloud-based security platform 300, and key services 400, various steps are annotated with the letter "f" indicating a computational algorithm or a function.

From the previous discussions, it will be understood that the information security, as provided by FAFSS 100 embodiments, generally include aspects of three components—FAFSS client modules 104A running on user electronic computing devices, the cloud-based security platform 300 running on multiple cloud infrastructures, and key service 400 modules running in a physical server located inside a facility or in a virtual server operating remotely. As shown and labeled in FIG. 5, the vertical schematic steps (e.g., 505) typically correspond to processing performed by the cloud-based security platform 300, whereas the processing steps performed by the key service 400 are generally indicated horizontally in the lower portion of the schematic (e.g., 506 and 507), and processing steps performed by the client modules 104A are indicated horizontally in the upper portion of the schematic (e.g., 502, 503, and 504).

They key service 400 module typically begins processing when it receives a query from the cloud-based security platform 300, originating from a client module 104A or 104B (e.g., applicable generally to both senders 102 and recipients 103). In one embodiment, the query corresponds to a request from a user (via a client module 104A or 104B and forwarded through the cloud-based security platform 300) to encrypt some type of original data that is to be used in a communication, stored in a database, or otherwise secured. The request, as received by the cloud-based security platform 300, generally includes a tenant-specific device ID. In various embodiments, the cloud-based security platform 300 associates that tenant-specific device ID with other information about the user, such as a user ID, application program(s) for which the encryption is requested, the time at which the query was transmitted, as well as various other types of information as will occur to one of ordinary skill in the art.

Generally, encryption CBKs generated during an exemplary encryption process are used again during a subsequent decryption process, typically at a recipient's client module 104B. However, as discussed previously, in various scenarios (e.g., when the user desires functionalities of at-rest encryption) a user is first a sender during encryption and then also becomes a recipient (or another user may be the recipient) later during decryption. Furthermore, it will also be understood that decryption is generally considered a reverse of an encryption process, and details of a decryption process will be apparent to one skilled in the art from the discussions provided herein. Therefore, a schematic for a decryption process in not discussed herein.

Still referring to FIG. 5, at step 509, the key server 400 modules receive a query from a user (e.g., sender 102) who requests encryption, as routed and forwarded through the cloud-based security platform 300. As discussed previously, in some embodiments, the "query" from the user (or the user's application program) is not necessarily an affirmative request for encryption from the user but may be an indication from the application program or an identification by the client module 104A that some data has been entered into the application program for which encryption is desired.

Although the primary discussion examples in the present disclosure relate to an encryption scenario in which an initial user (e.g., sender 102) creates or generates some data or content to be encrypted, in some embodiments, existing data can be selectively encrypted at the request of a given user. Further, in certain embodiments, the encryption processes may be performed not by users but instead automatically by algorithms or system components based upon predetermined policies or system triggers. For example, in one hypothetical scenario, a collection of data may be identified, encrypted, and stored in system databases according to predefined policies associated with the type, date, or other contextual factors relating to the data. In this way, aspects of the detection engine 202 may function not on an individual user device, but instead in a central server or system-aware module that detects certain data in need of encryption, requests CBKs necessary for encryption of that data, encrypts the data, and stores/transmits the encrypted data based on predetermined rules.

In the same way, some decryption processes can occur automatically based on a predefined need to access or display data (in line with predefined policies). For example, data may need to be surfaced to end users in an automated way (and not based upon a specific, triggered request from the user), and so the data will be automatically identified, decrypted according to policies, and presented/transmitted to the requisite end user in a predetermined fashion.

In yet further embodiments, the "query" from the user may comprise a specific request from an administrative user to encrypt a certain file or files, folder or folders, database or databases, etc. for subsequent storage or use. One skilled in the art will appreciate that the content to be encrypted in this scenario may not necessarily be intended for transmission to another user (at least not immediately upon encryption). Instead, the "query" from the administrator is meant to provide encryption of content, which was not encrypted during the original creation of the data by a user via the FAF SS 100. For example, data can be encrypted in large groups or batches (e.g., encrypting content already in existence when an embodiment of the FAF SS 100 is implemented at a given tenant, namely, during the setup of the FAFSS 100). According to this embodiment, the administrative user's client module may not comprise a detection engine 202, and the FAFSS 100 need not wait for the administrative user's interaction with the administrative user's computing device (as discussed in relation to the explanation of FIGS. 6 and 9) to encrypt data associated with that interaction. Instead, the data may be actively selected for encryption by the administrative user. Or, the detection engine 202 may perform functions relating to selective encryption as opposed to automated detection.

After receiving the query, in one embodiment at step 508, the key service 400 creates a string (also referred to herein as a "key tag" 112) for identification of a particular CBK by concatenating a version identifier, a key space ID, and a key number. In other embodiments, the key tag 112 need not necessarily include the version, key space id, or the like, but may include some other unique, identifying information. Next, in one embodiment, the key service executes the algorithm 507, which may be any secure random number generation algorithm as will occur to one skilled in the art. As will be understood by those having ordinary skill in the art, FAFSS embodiments do not impose any form limitations on the selection of key generation, encryption, and/or decryption algorithms.

Generally, the random number generated by algorithm 507 produces an encryption CBK 111. Typically, a CBK ID 112 (also referred to herein as a "key tag") uniquely identifies a corresponding encryption CBK 111, via a one-to-one mapping, as will occur to one skilled in the art. Again, the CBK 111 is not limited to the specific exemplary discussions herein and may comprise some other portion of bits, numerals, or the like that will comprise the key used to encrypt the at-issue original data. Subsequently, the encryption CBK 111 and the key tag 112 are saved in databases associated with the key service 400. In some embodiments, to add an additional layer of protection, CBKs 111 stored in the key service database 407 are encrypted with a key managed by a hardware security module. Next in one embodiment, using algorithm 506, the key service encrypts CBK 111 using a shared secret 501 previously established during the enrollment of the client modules (e.g., a piece of data known only to the client modules and the key service, such as a 256-bit AES cryptographic key, allowing encrypted communications between the client module and the key service. This encryption is akin to wrapping the CBK 111 in a secure envelope 113, thereby allowing the cloud-based security platform to route the CBK 111 to the client modules 104A without being privy to the content of the CBK 111 itself. Accordingly, the secure envelop 113, in one embodiment, acts as an additional layer of protection by preventing unauthorized access to the CBKs 111 while they are in transit. Next, the key service 400 returns the securely enveloped CBK 113 and the key tag 112 to the cloud-based security platform 300.

At step 505, in various embodiments, the cloud-based security platform responds back to the client module 104A or 104B with the securely enveloped encryption CBK 113 and the key tag 112. Upon receiving the securely enveloped encryption CBK 113 and the key tag 112, in one embodiment, the client module 104A first decrypts the securely enveloped CBK 113 in step 502 using the shared secret 501 established during initial enrollment of the client modules, as described elsewhere in this disclosure. Decrypting the securely enveloped CBK 113 reveals the encryption CBK 111.

As shown in the embodiment of FIG. 5, the FAF SS client module 104A utilizes the encryption CBK 111 along with the original data 101 as an input to an encryption algorithm 503 (e.g., AES, or any other such algorithm). As will be understood, according to exemplary aspects, the encryption/decryption algorithms running in the client modules 104A or 104B can be selected independently of the encryption/decryption algorithms running in the key service 400, except that the algorithms used for encryption of CBK 111 in step 506 and the decryption of the securely enveloped CBK 113 in step 502 must complement one another such that the decryption algorithm successfully reveals the CBK 111 if provided with the correct shared secret 501, which allows for a modular architecture. Also, as shown in FIG. 5, according to one aspect of the present disclosure, the original data typically does not leave its point of genesis (e.g., a user's computing device) in an unencrypted form, which provides greater protection to the original data by preventing it from being compromised during its passage over different types of communication networks. Additionally, FAF SS 100 embodiments are also applicable to environments wherein bandwidth is scarcely available.

Typically, the output of the AES algorithm 503 (or, any other encryption algorithm) at the client module is an un-decipherable form of data, referred to herein as the encrypted version of original data 115. Next, in one embodiment, the client module concatenates (using a prepend function 504) the key tag 112 to the encrypted version of original data 115, thereby generating the encrypted output 117. Further, it will be understood that in one exemplary aspect, the key tag 112 (that is included in the encrypted output 117) will be extracted and later used by a recipient to query the cloud-based security platform for the encryption CBK 111 corresponding to the respective key tag 112. If the cloud-based security platform services are able to successfully authenticate and authorize (based on pre-defined user access policies, and other qualifying factors) the request from the recipient, then the cloud-based security platform provides the respective encryption CBK to the recipient. Details of the cloud-based security platform processing will be explained in connection with FIG. 14.

Turning now to FIG. 6, a flowchart representing a high-level process 600 of the provision of information security performed by various modules and software components that comprise an embodiment of an exemplary FAFSS client module is shown. Details of steps performed by individual software components are explained in connection with FIGS. 7-13. It will be generally understood that in the embodiment in FIG. 6, the FAFSS client module processes are shown as running inside both senders' and recipients' computing devices, unless the context or description suggests otherwise. As will be understood by one having ordinary skill in the art, the steps and processes shown in FIG. 6 (and those of all other flowcharts and sequence diagrams shown and described herein) may operate concurrently and continuously, are generally asynchronous and independent, and are not necessarily performed in the order shown. Generally, the client modules may be operating on an electronic computing device (e.g., laptop owned by an employee of a particular tenant, tablet computer, etc.).

At step 601, the client module 104A or 104B examines the local device database 205 to determine whether the client module currently has any Secure Enrollment Profiles (SEPs) stored. According to one embodiment, a SEP is a collection of parameters that a client module uses to make queries associated with a specific tenant. A SEP generally comprises an identifier or routing information for the key space with which the SEP is associated, a tenant-specific device identifier, a shared secret (e.g., 256-bit AES key) between the client modules and the key server 400, and a shared secret between the client modules and the cloud-based security platform 300. If the client module does have a SEP, it continues to step 603. If the client does not yet have a SEP stored in the local device database 205, it enrolls with at least one tenant. Most often, a client module would not have a SEP if this is the first time the client has executed after being installed. If enrollment is required, the client module proceeds to step 602.

At step 602, in one embodiment, the client module determines whether it is configured for silent verified blind enrollment ("VBE") or interactive VBE. As will be discussed further in the context of FIGS. 7 and 8, VBE is the method by which a client module establishes a shared secret with a key service 400, allowing the two to exchange CBKs without the cloud-based security platform 300 having visibility into the unprotected keys. In various embodiments, client modules support two variants of VBE, silent and interactive. Interactive VBE generally requires user interaction in several steps, such as entering a token received via an outside communication mechanism such as email or text messaging. However, as will be understood and appreciated by one skilled in the art, many organizations manage their information technology with tools that can install software in a manner that is silent and transparent to the end user. For these scenarios, requiring user interaction to enroll a client module could be onerous and error prone or cause confusion among users. Accordingly, the silent mode of VBE generally requires a system administrator to configure the client module with additional information at the time of installation, but it allows the client module to conduct VBE enrollment without requiring any end user interaction. Details of an exemplary silent mode VBE engine process 700 and an exemplary interactive mode VBE engine process 800 are described in connection with FIGS. 7 and 8, respectively.

At step 603, in various embodiments after VBE or if an applicable SEP is already present, the client module selects a default profile for the creation of new keys. If the module is enrolled under only a single tenant, then, in one embodiment, it will select the SEP for that tenant. If the client module is enrolled under multiple tenants, then, in one embodiment, it may select any one of the SEPs associated with those tenants. In one embodiment, the client module prompts the user to select a SEP. However, in one embodiment, there are many alternatives for selecting a SEP for use in creating keys, including allowing users to designate a default that is used on future occasions until the user's preference is changed, or selecting a SEP based on other factors, such as the order in which the user enrolled under each tenant, the last SEP used, or other methods.

At step 604, in various embodiments, the client module queries the cloud-based security platform 300 to obtain an application policy. In one embodiment, the client module may be preconfigured to generate these queries at a predetermined interval (e.g., every 10 minutes). Generally, the query is encrypted using a symmetric key shared with the cloud-based security platform 300, contained within the SEP selected in step 603. The cloud-based security platform's process for providing this policy is described in detail in connection with FIG. 14C. Application policies will be described further in the discussion of step 606, below.

Starting at step 605, in various embodiments, the client module waits for user interaction with the application, so as to provide information security in response to those interactions, or some other trigger (e.g., time interval, etc.). For example, the client module can detect mouse movements, joystick movements, keyboard entries, voice-based commands, hand-gestures, or any other form of conceivable user input into an application program and/or hardware. Interactions may also include output, such as the display of data visually, output of textual information through accessibility devices such as screen readers, the playback of audio, or any other form of conceivable user output from an application program and/or hardware. In various embodiments, at certain predefined intervals, the client module will return to step 604 to update the application policies it is applying.

Some aspects of the detection at step 605 may be real-time (or, virtual real time) while others can be event-based. For example (and in one embodiment), the client module tracks (probes) real-time movements of the cursor, joystick, feed from hardware, memory etc. corresponding to any form of user interactions to extract original data. An example of event-based detection includes events that involve a user inputting text into a box in a user interface ("UI") application. The client module, in one embodiment, is aware that the user is presently interacting with the box, although it may not be aware of the original data that the user is inputting. The client module, in one embodiment, is not aware of the interaction until the user, for example, has clicked on a UI menu or button indicating that he or she has completed inputting text. Such interaction by the user with a field or button within the UI may provide an indication to the FAFSS 100 that information has been entered into the electronic computing device and that such interaction should be evaluated in comparison to one or more applicable policies.

In other scenarios, the client module may detect the interaction via movement-based or time-based processes. For example, embodiments of the FAFSS 100 may simply define segments of original data for encryption as the data being entered in periodic time intervals (e.g., every second, 10 seconds, 10 minutes, etc.) and will accordingly encrypt such data that has been entered or saved into the electronic computing device during that time interval with a unique context-based key.

Alternatively, the client module may detect instances in which a user has stopped keying information or moving a cursor for a predetermined period of time. For example, if a user was typing into an application program virtually continuously for a period of time and then stopped interacting with or typing into the application program for a predetermined time period (e.g., 5 seconds), then the client module may define the information that was entered via the continuous typing session as a discrete item of original data that should be encrypted. Aspects of the FAFSS 100 may also detect movements in certain parts of a user interface by a cursor or control mechanism and will rely on those movements to indicate a need for data to be encrypted. Generally, by tracking and identifying user interaction with various UIs and application programs, the FAFSS 100 is able to automatically identify when certain policies should be applied to the interactions and is similarly able to segment or partition the interactions according to predefined business rules or logic.

It will be understood by one skilled in the art that FAFSS client and server modules can be coded using event-driven languages (e.g., Java). These languages generally allow UI type applications wherein users typically review an interface containing components such as controls, buttons, menus and other graphical elements. Thus, aspects of the FAFSS 100 coded using such event-driven languages allow the system to respond to events that are generated by the various components of the application, both in response to user interactions and other system components such as client-server processing. Moreover, it is also well known to one skilled in the art that there are a finite number of ways that a user input can be rendered in a web browser or any other application program/software. Therefore, aspects of the client module are designed to track such user inputs and are further described below.

Generally, in UI applications, users interact with UI controls to make something happen. For example, a user may click a button or choose a menu item. Whatever users choose to do, they will initiate an event, which in turn, initiates a program, module, or code in an event-handler that is a part of the client module coded to respond to the specific event. According to aspects of the present disclosure, the event-handler informs the FAF SS (e.g., client module) with respect to handling the event and thereafter the FAFSS 100 usually waits for the user to do something else. It will be additionally understood that the FAF SS 100 extracts information from the event-handler based on the specific application or based on the contents and UI components of the specific page. Examples of such "events" that can be identified include user interactions such as clicking "submit" or "save" buttons, "post" or "like" buttons on FACEBOOK®, "send" indications in connection with email communications, etc.

Still referring to FIG. 6, at step 606, in various embodiments, the client module evaluates the application policy obtained in step 604 in response to recognition, by the client module, of the user's interaction with the application (or some other trigger). As will be appreciated by one skilled in the art, deploying software within large organizations is complex, time-consuming, and costly. Generally, changing software behavior by downloading new configurations offers a simpler approach to modifying behavior to adapt to new requirements and scenarios. In one embodiment, the client module's behaviors for providing information security are configuration-driven. A system administrator can author policies that describe a set of conditions to be met, such as a user trying to upload a file to a particular web application, and then specify a configuration-driven action for such conditions. Based on this policy configuration, the client module will execute the action prescribed in the application policy. To continue the example, the client might block a user from uploading a file to a web application, thereby securing the information in the file from disclosure. In another scenario, the configuration-driven action might permit the upload of the file, but only if the client module encrypts the file prior to its transmission.

At step 607, in one embodiment, the client module determines whether a given policy requires blocking an action, such as preventing a web browser from posting information to a web application. If so, the client module proceeds to step 612, wherein the client module takes a predetermined action with respect to the application (e.g., cancels the action that the application running on the end user's computing device was about to take). For example, policy might require the client module to block the upload of a file to a web application, thereby securing the information by preventing it from being uploaded. If the policy does not require the client module to block the action, it continues to step 608.

At step 608, in various embodiments, the client module determines whether the policy requires removing user interface elements from the application running on the end user's computing device. If so, the client module proceeds to step 609. At step 609, the client module suppresses the display of certain user interface elements generally to prevent user interaction with them. For example, a web application might have a button that a user clicks to upload a file. Accordingly, the configuration-driven action prescribed by policy might be to remove the file upload button. With no button to click, the user could not upload a file, thereby securing information stored in files from disclosure by upload. It is often possible to apply multiple configuration driven actions as a layered defense. To continue the previous example, a set of policies might include one rule requiring removal of a file upload button in step 609 and a separate rule that requires the client module to cancel file upload actions in steps 607 and 612, in case a user circumvents the removal of the UI element.

At step 610, in various embodiments, the client module determines whether a given policy requires encrypting data. For example, in one embodiment, the client module waits for user interaction in the form of submitting data to a Software-as-a-Service ("SaaS") web application. When such an event occurs, in one embodiment, the client module compares the Uniform Resource Locator ("URL") of the SaaS application to which the user is submitting data to a set of URLs pre-defined in the policy as requiring encryption. If the URL matches, the client module further examines the policy to determine the fields of submitted data that require encryption. If encryption is required, the client module then proceeds to process 900. In embodiments wherein a user is a recipient, a detection is not required as recipients typically do not have to input any kind of data for encryption into their computing devices. Therefore, in the process shown in FIG. 6, it is assumed that the detection engine process 900 usually runs in a sender's computing device. Details of an exemplary detection engine process 900 are discussed in connection with FIG. 9. Generally, after process 900, the client module proceeds to process 1000 (details of which will be explained in association with the description of FIG. 10).

It will occur to one skilled in the art that in many scenarios, several types of user inputs need not be encrypted. Examples of such user inputs might include general search queries entered by users, date/time data entered by users, and the like. Therefore, in many aspects, the detection engine 202 functions as a "decision engine" that uses predetermined and intelligent logic to determine whether or not user inputs need to be secured. Further, as will be understood, in embodiments wherein users or system administrators do not wish to secure their data, client modules can toggle off provision of data security through configuration driven policy, as decided in step 610. However, as will be understood by one skilled in the art, in certain embodiments, one cannot toggle off previously performed encryption on original data (e.g., the previously-encrypted data will remain encrypted). If the policy does not require the client module to encrypt data, it continues to step 611.

At step 611, in one embodiment, the client module determines whether the policy requires decrypting data. For example, in one embodiment, the client module waits for user interaction in the form of retrieving data from a SaaS web application. When such an event occurs, in one embodiment, the client module compares the URL of the SaaS application from which the user is retrieving data to a set of URLs pre-defined in the policy as requiring decryption. If the URL matches, then the client module further examines the policy to determine the fields of submitted data that require decryption. If decryption is required, the client module then proceeds to process 1200 (which will be described in greater detail herein).

Now referring to sub-processes 1000 and 1200 in FIG. 6, wherein the end-point engine encrypts/decrypts data. At sub-process 1000, the end-point engine process (in a sender's computing device) retrieves from the user's computing device the original data 101 that is to be encrypted and transmits a query to the cloud-based security platform 300 requesting one or more context-based keys (e.g., encryption CBK(s)) that will be used in an exemplary encryption process. In a decryption scenario (sub-process 1200), the end-point engine process (in a recipient's computing device) retrieves from the user's computing device the encrypted output 117 that is to be decrypted and transmits a query to the cloud-based security platform 300 requesting context-based keys that will be used in decryption. It will be understood that according to aspects of the present disclosure, in an exemplary decryption process, the client module uses the same context-based keys as those used for encryption. For ease of understanding of the discussions in this disclosure, general definitions of various terms used herein have been provided in the glossary above and in the description relating to FIG. 5. Detailed steps of an exemplary end-point engine process from senders' perspectives and recipients' perspectives are provided in connection with FIGS. 10 and 12.

Still referring to FIG. 6, in various embodiments, the outcome of encryption/decryption as performed by an exemplary end-point engine in a sender/recipient's computing device is next processed via sub-processes 1100 and/or 1300 by an exemplary reinsertion engine 204. For example, the reinsertion engine receives (or retrieves) the outcome of the processing performed by the end-point engine and integrates it into an appropriate position inside the expecting third party application in an unaltered manner. Generally, inside a sender's computing device the reinsertion engine inserts the encrypted output 117 into the expecting third party application program, whereas inside a recipient's computing device, the reinsertion engine 204 inserts the original data 101 into an appropriate position. As will be understood, an appropriate position can be, for example, a dialog box, a row/column (or any other position), a data entry field, an image posting field, a portion of text, or any other predetermined location or field in the expecting third party application program. Generally, data may then be viewed, accessed, etc. in accordance with the relevant policies.

After the reinsertion engine process 1100 and 1300, steps 609 and 612, and determining, at step 611, that decryption was not required, the client module, in various embodiments, proceeds at step 613, wherein the client module determines whether an additional action should be taken. Generally, this additional action may be taking one of the actions previously discussed herein as part of steps 607-612 (including process 900, 1000, 1100, 1200, and 1300), and thus, the client module may return at step 606 to evaluate the policies. In one embodiment (not shown in FIG. 6), the additional action may be returning to wait for user interaction with the application at step 605. If, however, the client module determines, at step 613, that no additional action should be taken, then the process 600 ends thereafter.

Although the discussions in connection with several FAFSS client modules (e.g., in FIGS. 1, 2, 9, 10, 12, and other places in this disclosure) do not specify a particular step of flushing memory storing intermediate variables/data, it will be apparent to one skilled in the art that FAFSS 100 embodiments can be designed to periodically flush or delete such data for privacy purposes, if such data is stored in non-volatile memory.

In various embodiments, functionalities of the detection engine 202 can be leveraged regardless of the end-point engine process (e.g., in scenarios wherein at-rest encryption functionalities are desirable). Additionally, in such scenarios, the FAFSS also optionally allows users to review audit trail(s) of any kind of communications/transactions between client modules and cloud-based security platform, as mentioned previously. Further details of cloud-based security platform steps pertaining to generation of audit trails and other steps will be provided in connection with FIG. 14.

Turning now to FIG. 7, a flowchart representing an exemplary silent mode of a Verified Blind Enrollment ("VBE") process 700 performed by various modules and software components that comprise an embodiment of the FAFSS client module is shown. In one embodiment, the VBE process enrolls a client module with a tenant (e.g., an organization) utilizing the FAFSS so that the client module may communicate securely with both the cloud-based security platform 300 and the key service 400. The "silent mode" of VBE generally refers to enrollment using parameters seeded by system administrators through the installation process, eliminating the need for user interaction during the enrollment process. As will be understood and appreciated by one skilled in the art, many organizations manage their information technology with tools that can install software in a manner that is silent and transparent to the end user. For these scenarios, requiring user interaction to enroll a client module could be onerous and error prone or cause confusion among users. Accordingly, the silent mode of VBE generally requires a system administrator to configure the client module with additional information at the time of installation, but it allows the client module to conduct VBE enrollment without requiring any end user interaction. In various embodiments, VBE establishes a shared secret between the client module 104A or 104B and the key service 400 (e.g., a data item known only to the participants in a confidential communication). In one embodiment, the shared secret is a 256-bit AES key, allowing the client module and the key service to exchange CBKs that are encrypted to prevent their disclosure to the cloud-based security platform 300 or to any other party with access to the network 107.

In the embodiment shown, Silent VBE begins at step 701, wherein a client module queries the operating system of the end user's computing device for authentication information. In one embodiment of the present system, the authentication data is the User Principal Name ("UPN") for the user's current login session in an Active Directory domain. However, as will be understood by one skilled in the art, this authentication data could come from other sources and other authentication systems (e.g., IP address of the electronic computing device, unique device identifier, etc.). At step 702, the client module generally retrieves additional enrollment data pre-placed by the installer. Like most software, prior to running on a computing device, the client modules must first be installed onto the device. This process is not described in this disclosure and is assumed to have taken place prior to enrollment. Methods of installation vary based on the computing device and operating system. For example, for personal computers running the Windows® operating system, software may be installed via a Microsoft® installer (e.g., a file ending with the .msi extension). An Apple® iPhone® might instead have software installed through a public application store. In one embodiment, silent VBE relies on the installer, as part of the installation process, to pre-place certain configuration data for use during the Silent VBE process 700.

In one embodiment, the enrollment data pre-placed by the installer includes a silent VBE token, an identifier for the key space in which the client modules should enroll, and the public key of a public/private key pair, with the private key held by the key service 400. As will be discussed further in the discussion of FIG. 16, the silent VBE token provides confirmation that the enrollment package bearing the token is a legitimate attempt to enroll, expected and approved by the system administrators of the organization utilizing the FAFSS 100. As will be appreciated by one skilled in the art, pre-placing the public key for the key service 400 will allow the client modules, in subsequent steps, to encrypt data such that only the key service 400 can decrypt and understand the data. This allows the client module to send an enrollment package through the cloud-based security platform 300 without making the contents of the enrollment package visible to any entity other than the key service 400.

At step 703, in one embodiment, the client module concatenates the silent VBE token retrieved in step 702 and the user authentication information collected in step 701 in order to generate the identity information about the user that the enrollment service 201 will require to verify the identity of the user operating the respective client module. Similarly, at step 704 in one embodiment, the client module generates the keys necessary to protect the enrollment package and protects/encrypts the same using those keys. In one embodiment, the client module randomly generates an RSA-4096 public/private key pair and an AES-256 session key (although, as will be understood, any secure public/private key and session key may be used). Using the AES-256 session key, in one embodiment, the client module encrypts the identity information generated in step 703 along with the client module's public key generated at step 704 (e.g., the identify information and public key together comprise the enrollment package). Generally, the client module signs the payload that was encrypted with the AES-256 session key using the client module's private key. The client module also, in one embodiment, encrypts the AES-256 session key using the enrollment service's public key, retrieved in step 702.

At step 705, in various embodiments, the client prepares an enrollment query to send to the cloud-based security platform 300. In one embodiment, the query contains three items of data: 1) the identifier of the key space with which the client module should enroll (it will be recalled that, in one embodiment, a key space belongs to a single tenant, such that this key space identifier also serves to uniquely identify the tenant with which to enroll); 2) the identity information and client module's public key that was encrypted with an AES-256 session key at step 704; and 3) the AES-256 session key, used at step 704, encrypted with the key service's public key, obtained at step 702. The client module generally sends this query to the cloud-based security platform 300. Because of the encryption performed in step 704, other than the identifier of the key space in which the client module intends to enroll, the information comprising the enrollment query is not accessible to the cloud-based security platform 300, nor to any other entity/individual with visibility into network 107.

At step 706, the client module receives the server's response that, if properly constructed by the server, comprises an encrypted SEP and cloud platform enrollment profile for the particular client module. Generally, at step 707, the client module validates that the server's response has a valid payload structure. If the server's answer has been corrupted due to a network error or other unforeseen circumstance and does not have a valid payload, then this step prevents the client module from continuing to operate based on bad data and the process ends. If, however, the server's response has a valid payload structure, then, in one embodiment, the process continues at step 708.

Still referring to FIG. 7, at step 708, in various embodiments, the client module validates the digital signature on the response, using the public key for the enrollment service 201. If the signature is found to be invalid, the enrollment process halts. Although not depicted in FIG. 7, it will be understood and appreciated by one skilled in the art that the client modules might record this failure in an audit log and notify the user of the error. A failed signature validation could indicate corruption of the data, or it could indicate an attacker's attempt to compromise the security of the system. If the signature is valid, then the client modules may conclude that the response provided by the cloud-based security platform originated with the key service 400 and has not been tampered with, and the process continues at step 709.

At step 709, in one embodiment, the client module decrypts the cloud platform enrollment profile, which comprises an encrypted version of the shared secret between the cloud-based security platform 300 and the client module, using the client module private key generated at step 704. Generally, this decryption yields an AES-256 key shared between the cloud-based security platform 300 and the client module. In other exchanges with the cloud-based security platform 300, this key is used to secure queries, including queries to download application policies, create new CBKs, or retrieve existing CBKs.

At step 710, in various embodiments, the client module decrypts the Secure Enrollment Profile (SEP) using the client module private key generated at step 704. This decryption yields an AES-256 key, a shared secret between the key service 400 and the client module. The client modules 104A or 104B and the key service 400 generally use this shared secret when creating new CBKs and fetching existing CBKs. Because this key is known only to the client-modules 104A or 104B and the key service 400, the cloud-based security platform 300 is not able to decrypt CBKs that are encrypted—wrapped in a secure envelope—using this shared secret. Thus, the cloud-based platform 300 is able to orchestrate the movement and delivery of CBKs on a large scale, over untrusted networks 107, without requiring organizations utilizing the FAF SS 100 to trust that the cloud-based security platform 300 will protect the confidentiality of the CBKs, because that confidentiality is assured using the shared secret known only to the client modules 104A or 104B and the key service 400.

At step 711, the client module places the Secure Enrollment Profile (SEP) in secure storage. In one embodiment, the stored SEP includes the identifier of the key space in which the client module enrolled, the tenant-specific device ID for the client modules, the symmetric key shared between the client module and key service 400, the different symmetric key shared between the client module and the cloud-based security platform, a human readable title for the SEP, and a human-readable description of the SEP.

Turning now to FIG. 8, a flowchart representing an exemplary interactive mode of a Verified Blind Enrollment ("VBE") process 800 performed by various modules and software components that comprise an embodiment of the FAF SS client module is shown. In one embodiment, the VBE process enrolls a client module with a tenant (e.g., an organization) utilizing the FAF SS 100. The interactive mode of VBE generally occurs with some interaction with the end user (e.g., entering a token received in an email, text message, etc.) Generally, interactive VBE may be used when a tenant is not large/sophisticated enough to use silent VBE, a tenant trusts each of its users to be able to complete the VBE process on their own, etc. VBE establishes a shared secret between the client module 104A or 104B and the key service 400 (e.g., a data item known only to the participants in a confidential communication). In one embodiment, the shared secret is a 256-bit AES key, allowing the client module and the key service 400 to exchange CBKs that are encrypted in order to prevent their disclosure to the cloud-based security platform 300 or to any other party with access to the network 107.

In the embodiment shown, the Interactive VBE process 800 begins at step 801, wherein an end user navigates to the enrollment service 201 (typically using a web browser). At step 802, in various embodiments, the enrollment service 201 requires the user to authenticate himself/herself. As will occur to one skilled in the art, any number of a variety of authentication methods could be used. For example, the user might enter a username and password; the user might have to provide a secondary authentication factor, such as a security code generated by a hardware device; or the user might authenticate through a corporate single sign on service, enabled by the Security Assertion Markup Language ("SAML 2.0") specification. Generally, the method of authentication can vary based on specific application.

At step 803, in various embodiments after authenticating to the enrollment service 201, the service 201 provides an authentication token to the user (e.g., via email, text message, etc.). The token will be used later, as explained in the discussion on FIG. 16, to determine that the user has authenticated successfully. In one embodiment, in the same response (e.g., email, text message, etc.) from the enrollment service 201, the service 201 provides a public key. Generally, the private key of the public/private key pair is held by the enrollment service 201. This public key will allow the client module 104A to encrypt data in a subsequent step, providing confidence that only the enrollment server 201 will be able to decrypt and understand the data.

At step 804, in one embodiment, the user provides an out of band token (e.g., the token was received via a communications mechanism other than the one used for other VBE-related communications, such as email, text message, or the like) received from the enrollment service 201 to the client module. Generally, in combination with the authentication in step 802, sending the user an out of band token increases confidence in the user's identity. In one embodiment, the enrollment service sends an email to the user's email address containing the out of band token. However, one skilled in the art will appreciate that any other out of band communication capable of imparting the token would serve as well, including sending the out of band token via a text message to the user's mobile device (e.g., phone). In one embodiment, the token need not be provided out of band (e.g., may be provided directly to the user/client module by the enrollment server 201). It will be recalled that although the method for obtaining the data was different, the first steps of the silent VBE process 700 also resulted in obtaining a token, a user identity, and the public key for the enrollment service 201.

In one embodiment, the remainder of the interactive VBE process 800 is similar to the silent VBE process 700. Accordingly, at step 703, in various embodiments, the client module concatenates the token entered in step 804 and the user authentication information collected in step 803 in order to generate the identity information about the user that the enrollment service 201 will require to verify the identity of the user operating the client modules. Similarly, the remaining steps of the interactive VBE process 800 continues as described in association with the description of FIG. 7. As shown, the remaining steps of interactive VBE process 800 are virtually identical to those of silent VBE process 700. Accordingly, except as discussed previously, the discussion of FIG. 7 also applies to FIG. 8.

Now referring to FIG. 9, an exemplary detection engine process 900 that is running on senders' electronic computing devices is shown. Generally, the purpose of the detection engine process 900 is to identify original data (e.g., in plaintext/cleartext) that requires encryption and divert that data away from its traditional processing steps into the client module's encryption process. At step 901, the detection engine 202 probes the hardware and software in a user's electronic computing device to extract original data 101 corresponding to a user's interactions with a user's computing device and/or connected peripheral device(s) and/or application programs operating on such devices. Examples of software in a user's computing device that may be probed include (but are not limited to) HTML source code, image files, audio files, multimedia files, all file systems related to the operating system (OS) running on the user's computing device, Internet browsers, electronic document applications, and various other sources. Examples of hardware relating to users' computing devices include volatile memory (RAM), hard disk drives, etc. In one embodiment, hardware associated with user computing devices registers mouse movements, joystick movements, keyboard entries, voice-based commands, human gestures, or any other form of conceivable user input to indicate original data being entered or accessed within an application program.

At step 902, the FAFSS 100 determines, in various embodiments, whether the original data 101 should be modified (e.g., encrypted). In other words, in many scenarios, several types of user inputs need not be encrypted. Examples of such user inputs include general search queries entered by users, date/time data entered by users, and the like (although, in some applications, these types of inputs/actions may require encryption). Therefore, in many aspects, the detection engine 202 functions as a "decision engine" in determining whether user inputs need to be secured. These decisions are generally based on predetermined rules or logic that identify when certain information should or should not be encrypted. As described earlier, these rules or logic are downloaded from the cloud-based security platform 300, allowing the detection engine 202 to be configuration driven. In some embodiments, step 902 may be skipped, as step 610 (from FIG. 6) may have already decided that encryption should occur.

If the FAFSS 100 determines that the original data does not need to be encrypted, then in one embodiment, the process 900 returns to step 905, and the entire detection engine process 900 is retriggered. However, if the FAFSS determines that the original data needs to be encrypted, then the process moves to step 903 wherein the FAFSS 100 diverts the flow of original data and saves (at step 904) the diverted original data into a secured location in volatile/non-volatile memory, hard disk drive, etc., thereby bypassing the flow of the original data into the expecting application program. In one embodiment, the original data is temporarily diverted from being utilized by the respective application program such that the data can be encrypted or otherwise processed via an embodiment of the FAFSS 100. Depending on the specifics of software implementation, the original data extracted in step 903 can be in discrete chunks of limited size, and therefore, the FAFSS 100 might need to continue the detection process 900 further. Thus, the FAFSS determines, in various embodiments at step 905, whether to continue detection. Accordingly, the process 900 reverts back to step 901 if continued detection is desired or ends thereafter if continued detection is no longer necessary. Further processing of the saved (diverted) original data as performed by an end-point engine, is described next.

Turning to FIG. 10, an exemplary end-point engine process 1000 is shown for encrypting the original data detected from a user's electronic computing device, according to one embodiment of the present disclosure. The process 1000 shown in FIG. 10 is shown from the perspective of FAFSS client modules running on sender computing devices. Starting at step 1001, in various embodiments, the FAFSS client module retrieves original data 101 from volatile/non-volatile memory in a user's electronic computing device. It will be recalled that an instance of the original data input by a sender was diverted from the expecting application program and saved inside databases associated with a sender's electronic computing device (or some other data storage means) by an exemplary detection engine process 900, as discussed previously in connection with FIG. 9. In one embodiment, original data is diverted in real time, thus, at step 1001, the FAFSS client modules receives original data 101.

After retrieval of the original data, the FAFSS client module 104A builds (at step 1002 in one embodiment) a query for encryption of the original data. In one embodiment, the query includes the tenant-specific device ID and a query payload encrypted using a symmetric key shared between the client module and the cloud based service platform 300. This shared secret is established during the VBE processes 700 or 800, as described previously. In one embodiment, the encrypted query payload includes one or more requests for CBKs, each of which includes metadata about the data object to be protected, such as a classification of the data (e.g. for public release, confidential, restricted) or any other attributes as might occur to one skilled in the art.

At step 1003, in one embodiment, the FAFSS client module transmits the query to the cloud-based security platform 300 via a secure communication protocol (e.g., SFTP, SSH, TLS, etc.). The handling of the query by the cloud-based security platform 300 is described later in the discussion of FIG. 14. Generally, the server responds back to the client module at step 1004. In various embodiments, the response is decrypted using the shared secret between the client module 104A and cloud-based security platform 300.

In one embodiment, the cloud-based security platform 300 positively responds back (at step 1004) to the FAFSS client module with an encryption CBK encrypted with the symmetric key shared between the client modules and key service 400 and a key tag 112, if the query transmitted at step 1003 is valid (e.g., corresponds to a sender and an associated application program that are authorized to encrypt original data). Thus, at step 1005, the FAFSS client module determines whether the response received at step 1004 comprises a positive acknowledgment (response).

If, however, the FAFSS client module (e.g., end-point engine 203) determines that the cloud-based security platform has not responded (at step 1004) positively, then in one embodiment, the encryption CBK 111 (refer to FIG. 5 for details) perhaps was not generated by the FAFSS key service 400 and, hence, encryption cannot be successfully performed at the FAFSS client module. In one aspect, the FAFSS client module reverts back to step 1001, and the entire process is retriggered. In alternate aspects, the FAFSS client module displays a message to the user indicating one or more reasons why the encryption could not be successfully performed, and the process exits thereafter (not specifically shown in FIG. 10).

Still referring to FIG. 10, if a positive acknowledgement is received from the cloud-based security platform (via steps 1004 and 1005), then, in one embodiment, the FAFSS client module parses (at step 1006) the response received to extract the securely enveloped encryption CBK 113 and the key tag 112 pertaining to the particular item of original data 101 to be encrypted. The securely enveloped (encrypted) CBK is decrypted using the symmetric key shared between the client modules 104A or 104B and the key service 400, established during the VBE process described earlier.

At step 1007, in one embodiment, the FAFSS client module (e.g., the end-point engine 203) encrypts the original data 101 using the encryption CBK 111 and an encryption algorithm to generate an encrypted version of the original data 115. An exemplary schematic for an encryption process is shown in FIG. 5. Additionally, in one embodiment, at step 1008, the FAFSS client module prepends the key tag 112 to the encrypted version of the original data 115 to generate an encrypted output 117. It will be realized that both the encrypted version of the original data 115 and the encrypted output 117 are in a form un-decipherable to the human eye (e.g., ciphertext). Eventually, at step 1009 in one embodiment, the FAFSS client module saves the encrypted output 117 locally in a database or memory in the user's (sender's) computing device. Depending on the specifics of software implementation, the original data 101 that is encrypted can be in discrete chunks of limited size, and therefore, the client module might need to continue the encryption process further. Thus, in one embodiment, the client module determines at step 1010 whether to continue encryption. Accordingly, the process 1000 reverts back to step 1001, or, ends thereafter. According to aspects of the present disclosure, the FAFSS client module eventually re-inserts the encrypted output for use by the respective application program. Details of such an insertion are described next.

Now referring to FIG. 11, an exemplary process 1100 is shown for reinserting encrypted outputs into expecting application programs, as implemented by an embodiment of the reinsertion engine 204 in an FAFSS client module 104A running on a sender's electronic computing device. Starting at step 1101, the reinsertion engine 204 retrieves encrypted output 117 from a device database or volatile/non-volatile memory in a user's electronic computing device. Next, at step 1102, the reinsertion engine 204 processes the encrypted output 117 to correspond to an appearance and format as expected by a respective application program. The outcome of the processing (at step 1102) is inserted into the respective application program at step 1103 in various embodiments. Subsequently (not shown in FIG. 11), the FAFSS client module, in various embodiments, transmits the encrypted output to one or more recipients, third party systems, or to databases for storage within a larger system, via networks 107, and the process 1100 ends thereafter.

Now referring to FIG. 12, an exemplary process 1200 for receiving/accessing and decrypting an encrypted output 117, from the perspective of a recipient 103, as implemented in an FAFSS client module 104B (recipient) is shown according to one embodiment of the present disclosure. Starting at step 1201, the recipient (or, the recipient's computing device) receives encrypted output 117. In one embodiment, this "receiving" at step 1201 may be an indication for accessing or downloading content and not just a receipt of a communication (e.g., the client module retrieves, at the request of a user, content from storage that is accessed according to one or more applicable policies). At step 1202, the FAFSS client module generally parses the encrypted output to extract a key tag 112 and the encrypted version of original data 115. It will be understood that in one embodiment the FAFSS client module (recipient) is aware of the relative positions occupied by the key tag 112 with respect to the encrypted output 117. For example, the key tag 112 might correspond to the last ten (10) bits or the first fifteen (15) bits of the encrypted output 117.

In various embodiments, at step 1212, the FAFSS client module builds a query (comprising the key tag 112, along with information identifying the client module running in the recipient's electronic computing device) with an accompanying request for decryption. In one embodiment, the client module encrypts portions of this query, including the key tag 112, using a symmetric key shared between the client module and the cloud-based server platform 300. The client module transmits the query to the cloud-based security platform at step 1204. In this particular embodiment, the key tag is the identifier that uniquely relates to the encryption CBK 111, details of the respective application program, and various other attributes, and allows the FAFSS 100 to identify the appropriate key necessary to decrypt the relevant data item.

Typically, the FAFSS query is transmitted via a secure communication protocol (e.g., SFTP, SSH, etc.). Generally, a FAFSS cloud-based security platform 300 receives the query and responds back with a reply, which is received at step 1205 by the FAFSS client module. Details of steps included in cloud-based security platform processing will be discussed in connection with FIG. 14. As will be understood from the description of FIG. 14, cloud-based security platform modules, in one embodiment, positively respond back with a securely enveloped encryption CBK 113 if the query transmitted at step 1204 is valid (e.g., corresponds to an authorized recipient along with an associated authorized application program that is authorized access to decrypt the original data). In one embodiment, the reply is encrypted using a symmetric key shared between the client modules and cloud-based security platform 300, and the client decrypts the response in step 1205.

At step 1206, the FAFSS client module determines, in various embodiments, whether the response received at step 1205 is a positive acknowledgment (response). However, if the FAFSS client module (e.g., end-point engine 203) determines (at step 1206) that the server modules have not responded positively, then in one embodiment, this generally implies that the FAFSS cloud-based security platform 300 has not provided the encryption CBK 111 that would have been utilized in a decryption process at the FAFSS client module (recipient). For example, if the particular recipient is not authorized to view information or data provided by the sender (e.g., based on predetermined access rules, authorizations, or policies), then the recipient may be denied access to the data (and the corresponding CBK). In some scenarios, the FAFSS server module provides one or more reasons related to the denial of the CBK. Thus, in one embodiment, the FAFSS client module displays (at step 1203) a message to the user indicating one or more reasons why the decryption could not be successfully performed, and reverts back to step 1201. Correspondingly, the end-point process 1200 exits thereafter.

If a positive acknowledgement is received from the cloud-based security platform 300, then the FAFSS client module parses (at step 1207 in one embodiment) the response received to extract the securely enveloped encryption CBK 113. The secure envelope ensures that even though the cloud-based security platform 300 orchestrates the movement of the CBK, it remains blind to the key. Similarly, others with access to network 107 are not able to obtain the CBK 111 because it is encrypted (wrapped in a secure envelope). In one embodiment, the client module decrypts the securely enveloped CBK 113 using a symmetric key shared between the client modules and the key service 400, thereby generating the CBK 111.

At step 1208, the FAFSS client module (e.g., the end-point engine 203) decrypts the encrypted version of the original data 101 using the encryption CBK 111 and a decryption algorithm to generate the original data 101. An exemplary schematic of an encryption process is shown in FIG. 5. Eventually, at step 1209, the FAFSS client module saves the original data 101 locally in a database or memory in the recipient's electronic computing device. Alternatively, rather than data being saved locally, the original data is simply displayed to the recipient via a UI or other viewing mechanism. Depending on the specifics of software implementation, in various embodiments, the FAFSS 100 may need to continue the decryption process further. Thus, the FAFSS determines at step 1210 whether to continue decryption. Accordingly, the process 1200 reverts back to step 1201, or, ends thereafter. According to aspects of the present disclosure, the FAFSS client module (recipient) eventually provides the original data 101 to the application program for use and/or display to the recipient. Details of such an insertion are described next.

Now referring to FIG. 13, an exemplary reinsertion engine process 1300 is shown, as implemented in one embodiment of a FAFSS client module 104B running on a recipient's electronic computing device. Starting at step 1301 in one embodiment, the reinsertion engine process 1300 retrieves original data 101 (obtained as an outcome of processing by the end-point engine) from a device database (or, volatile/non-volatile memory) in a user's computing device. In one embodiment, at step 1302, the reinsertion engine 204 processes the original data 101 to correspond to an appearance and format (e.g., font, position, etc.) as expected by a respective application program for eventual display to the recipient via a UI (or other subsequent use). The outcome of the processing (in one embodiment at step 1302) is inserted into the respective application program at step 1303. Described next are exemplary FAFSS server module processes.

Now referring to FIG. 14 (consisting of FIGS. 14A, 14B, 14C, 14D, and 14E), exemplary cloud-based security platform 300 module processes are shown and described, including steps involved in the functionalities of federation, authorization, access control, key management, policy management, and auditing. As will be understood and appreciated, the exemplary functionalities described above (and others) are flexible and user-friendly. Furthermore, in one embodiment, the design of the cloud-based security platform 300 is modularized such that individual functionalities of the FAFSS cloud-based security platform 300 can be altered, regardless of the underlying data. Moreover, in one embodiment, the cloud-based security platform 300 is architected such that it can run on a wide variety of underlying cloud infrastructure as a service ("IaaS") provider offerings, allowing for deployment in and federation of security services across a variety of geopolitical jurisdictions.

Starting first with FIG. 14A, illustrated is a process 1400A that permits the cloud-based security platform 300 to process client module requests and return a response. At step 1401, the FAFSS cloud-based security platform 300 receives a query from a FAFSS client module 104A or 104B (e.g., an end-point engine 203 running in a client's electronic computing device). In one embodiment of the system, the cloud-based security platform 300 distinguishes the type of query from the client based on the calls made to a Representational State Transfer ("ReSTful") Application Programming Interface ("API") exposed by the cloud-based security platform 300 for client modules. However, as will be understood and appreciated, the exemplary functions could be invoked through any system for remote invocation of functionality.

At step 1402, the cloud-based security platform 300 determines whether the request from the client module 104A or 104B is to enroll with a key space. It will be recalled that, in one embodiment, a key space belongs to a single tenant, such that a key space identifier may also serve to uniquely identify the tenant with which to enroll the client module. If the request is to enroll, then, in one embodiment, the cloud-based security platform 300 proceeds with sub-process 1400B, as detailed in the discussion of FIG. 14B. If not, then the cloud-based security platform 300 determines, at step 1404 whether the request from the client module is to retrieve the applicable application policy configuration, used to drive configuration-driven actions for information security, as described in the discussion of FIG. 6. If so, then, in one embodiment, the cloud-based security platform 300 continues with sub-process 1400C, as described in detail in the discussion of FIG. 14C. If not, then, in one embodiment, the cloud-based security platform 300 proceeds, at step 1406, wherein it determines whether the request from the client module is to create one or more CBKs (e.g., in connection with encryption of original data). If so, then, in one embodiment, the cloud-based security platform 300 proceeds to sub-process 1400D, as explained in detail in the discussion of FIG. 14D. If not, then, in one embodiment, the cloud-based security platform 300 proceeds at step 1408, wherein it determines whether the request from the client module is to fetch one or more CBKs (e.g., in connection with decryption of data), in which it proceeds at sub-process 1400E, as explained in detail in the discussion of FIG. 14E. If not, then, in one embodiment, the cloud-based security platform 300 returns an error in step 1410 to the client module in reaction to an unrecognized request. In one embodiment, that error would be an HTTP error 404, "Not Found," indicating that the client module made a call to a URL that does not correspond to a valid ReST API call. Generally, after completing processes 1400B, 1400C, 1400D, and/or 1400E, the cloud-based security platform 300 returns an applicable response and the process 1400 ends thereafter.

Turning now to FIG. 14B, an exemplary sub-process 1400B to enroll a new plugin (e.g., client module 104A and 104B) is shown according to one embodiment of the present disclosure. In one embodiment, the cloud-based security platform 300 executes this sub-process 1400B in response to a client module request for enrollment, as described above. It will be recalled from the discussion of FIGS. 7 and 8 that the client module sends a request that includes (in one non-limiting example): 1) an identifier for the key space in which to enroll; 2) identification information for the user, comprising authentication information and a token, encrypted with a symmetric session key; and 3) the aforementioned symmetric session key encrypted using the public key of the enrollment service 201 operated on server hardware belonging to the organization utilizing the FAFSS 100. Because of the encryption of the enrollment request (using the public key of the enrollment service 201), the cloud-based security platform 300 has no visibility into the request nor do any other parties with access to networks 107. As will be understood and appreciated by one of skill in the art, this encryption prevents the cloud-based security platform 300 or any other party with visibility into network 107 from crafting a response that impersonates the enrollment service 201 or determining the contents of the enrollment request.

At step 1411, in various embodiments, the cloud-based security platform 300 routes the enrollment request to the appropriate enrollment service 201 (in one embodiment, managed separately from the platform 300), using the key space identifier included in the request. At step 1412, in various embodiments, the cloud-based security platform 300 receives a response from the enrollment service. As will be explained in the discussion of FIG. 16, the response comprises a user ID, a tenant-specific device ID, the client module's public key for this enrollment session, and a symmetric key that has been encrypted using the client module's public key for this enrollment session. In one embodiment, the entire response is signed with the private key of the enrollment service 201. Because the response is signed by the enrollment service 201, any recipient with the enrollment service's public key can verify the authenticity of the response. This precludes the cloud-based security platform 300 or any other entity with access to the network 107 from crafting a response to impersonate the enrollment service 201. Because the symmetric key in the response is encrypted with the client module's public key for this enrollment session, neither the cloud-based security platform 300 nor any other actor with access to the network 107 will be able to access and utilize the key. At step 1413, in various embodiments, the cloud-based security platform 300 extracts the user ID, tenant-specific device ID, and the client module's public session key from the response received at step 1412.

At step 1414, the cloud-based security platform 300, in one embodiment, generates a symmetric key to be used between the client module and the cloud-based security platform 300 to encrypt future requests and responses. The user ID, tenant-specific device ID, and this symmetric key are generally stored, at step 1415, with an association between all three pieces of data such that the user and tenant-specific device identifiers can be used to retrieve all three pieces of data from storage.

At step 1416, the cloud-based security platform encrypts the symmetric key generated in step 1414 using the session public key of the client module. In one embodiment, the platform appends the encrypted symmetric key returned from the enrollment service 201 at step 1412 as well as the tenant-specific device ID to the encrypted symmetric key. In step 1417, these three pieces of data: 1) tenant-specific device ID, 2) symmetric key from the cloud-based platform encrypted with the client module's session public key, and 3) the symmetric key from the enrollment service 201 encrypted with the client module's session public key are returned in a response to the client device. As will be understood and appreciated, each of these three pieces of information is not always returned in the response to the client module. The client module processes the response as described in the discussion of FIGS. 7 and 8.

Turning to FIG. 14C, in one embodiment, the cloud-based security platform 300 executes exemplary sub-process 1400C in response to a client module request for an application policy configuration, as described in the discussion of FIG. 6. Generally, the purpose of exemplary sub-process 1400C is to respond to a client module's request to download a configuration-driven application policy. It will be recalled that, in one embodiment, the client module 104A or 104B sends a request that includes: 1) a tenant-specific device identifier; and 2) device identifying information encrypted with the symmetric key established between the client modules 104A or 104B and the cloud-based security platform 300 as part of the enrollment process, described elsewhere in this disclosure.

Accordingly, at step 1418, the client manager 301 of the cloud-based security platform 300, in one embodiment, forwards the request to the federation service 303 (within the platform 300) for determination of the appropriate key space to which the request should be submitted. Although not shown in FIG. 14C, the client manager 301, in one embodiment, prior to forwarding the request first, performs a number of simple validation checks to ensure that the request is well-formed and has not been corrupted by errors in transmission.

As explained in the discussion of FIG. 3, in various embodiments, the cloud-based security platform 300 operates across the servers and networks of multiple cloud Infrastructure-as-a-Service providers. Additionally, in certain embodiments, the cloud-based security platform provides service to multiple organizations (e.g., "tenants") utilizing the FAFSS 100 concurrently. Because multiple tenants may route their requests through the same cloud-based security platform 300, that platform 300 is, in one embodiment, able to route requests among the various clients and tenants. Generally, a single client module 104A or 104B may obtain multiple Secure Enrollment Profiles (SEPs) corresponding to multiple tenant organizations, through the enrollment process discussed elsewhere in this disclosure. To support these multiple concurrent users, the federation service 303, in various embodiments, maintains a mapping of tenant identifiers and key spaces to the nodes in the mesh network of cloud-based security platform nodes (e.g., a network topology wherein each node cooperates in the distribution of data through the data by relaying data for the network).

Thus, at step 1419, the federation service determines which cloud-based security platform node has the data to answer the client module's request. Specifically, in one embodiment, the federation service 303 maintains a database that maps each key space to the network address of the federation service 303 responsible for that key space. Based on that mapping, at step 1420, the federation service 303 generally forwards the request to the correct cloud-based platform node to answer the query. This node could be, but is not necessarily, the same node that initially received the request, in which case no forwarding operation takes place.

Still referring to FIG. 14C, at step 1421, the federation service 303, in various embodiments, forwards the request to the authorization service 304 to determine whether the client modules 104A and 104B are authorized to make the request received by the cloud-based security platform 300 (e.g., at step 1401). At step 1422 in one embodiment, the authorization service 304 requests data from the data retention service 309 to support its authorization of the request (e.g., data records containing the device identifying information, etc.). Generally, that data is looked up and returned in steps 1423 and 1424, respectively. In one embodiment, the authorization service 304 may comprise the data retention service 309 so that data requests need not be forwarded and steps 1422-1424 occur locally to the authorization service 304.

At step 1425, in one embodiment, the authorization service 304 compares the device identifying information reported in the request against a historical record of device identifying information to ensure that the devices are the same (e.g., that the device identifying information in the request matches that in the historical record). As will be understood, the authorization service 304 may consider a variety of identity and authentication factors as will occur to one skilled in the art (e.g., password and user name combinations, etc.). In one embodiment at step 1426, if the device is authorized to make the request, then the request is forwarded to the policy service 305. If the device is not authorized to make the request (e.g., if the request could not be authenticated because the device identifying information did not match), then, at step 1427 in one embodiment, the authorization service 304 returns an error indicating that the request is unauthorized to the client manager 301. In one embodiment, the client manager 301 may return that response to the client module 104A or 104B at step 1441.

If the authorization service 304 determines at step 1426 that the request/requesting device is authorized, then the process continues at step 1428, in various embodiments, wherein the policy service 305 requests data from the data retention service 309 to adjudicate the client's request (e.g., data mapping a tenant's policies to client modules, etc.). In one embodiment, the policy service 305 also retrieves the application policy configuration that it may return to the client. This data is generally identified and returned in steps 1429 and 1430, respectively. In various embodiments, the policy service 305 is highly configurable. For example, the policy service 305 may condition the selection and release of application policy configurations based on a number of factors, including but not limited to, user identity, device identity, network location, application usage, time, location, and historical data. To obtain geographic information for consideration, the policy service 305 may request, in one embodiment, data from a geolocation service 1487 that provides information regarding the geographic location of the client module 104A or 104B, as shown in FIG. 14C in steps 1431, 1432, and 1433. Although shown as one example, there is no limitation on the policy service's ability to consume information from other external services as well to factor into policy decisions.

At step 1434, in consideration of the policy configuration determined by the organization utilizing the FAF SS 100 and the data gathered from the client module 104A or 104B, data retention service 309, and if applicable, other sources, such as the geolocation service 1487, the policy service 305 determines which application policies, if any, apply to the client module 104A and 104B. At step 1435, in one embodiment, the policy service 305 sends a record of the transaction to the analytics service 307 so that subsequent users may determine which policies have been provided to the client modules and other information about the provision of the same. Generally, the transmission of this request is asynchronous, and the policy service 305 does not wait for any output from steps 1436 and 1437 to continue on to step 1438. Steps 1436 and 1437 occur separately and concurrently from the remainder of the process flow for requesting an application policy configuration. In step 1436, the analytics service 307 receives the transaction record sent from the policy service 305. In step 1437, it ingests that record into a streaming graph system for the purpose of running supervised, semi-supervised, and unsupervised analytics.

In various embodiments, at step 1438, the policy service 305 returns the relevant application policy configuration to the authorization service 304. At step 1439, the authorization service 304, in one embodiment, returns the same policy to the federation service 303. At step 1440, the federation service 303, if applicable, routes the policy back to return the data to the correct client manager 301. At step 1441, the client manager 301 responds to the client module 104A and 104B with the policy. Generally, the routing that occurs at steps 1438 through 1441 may occur as based on information included in the request (e.g., the device identifying information, etc.).

Turning to FIG. 14D, in one embodiment, the cloud-based security platform 300 executes sub-process 1400D in response to a client module request to create one or more CBKs, as described in the discussion of FIGS. 6 and 10. In various embodiments, the client module 104A sends a request that includes 1) a tenant-specific device identifier, 2) device identifying information, and 3) a quantity of keys to create, and 4) the metadata attributes associated with the keys. Generally, items 2-4 are encrypted with the symmetric key established between the client modules 104A and 104B and the cloud-based security platform 300 as part of the enrollment process (e.g., VBE), described elsewhere in this disclosure. Exemplary metadata attributes associated with the keys include the classification of the information to be protected, the authoring organization of the data object, or other data that might be needed as inputs to later policy determinations about whether to grant access to the CBK.

At step 1442, the client manager 301 forwards the request to the federation service 303. Although not shown in FIG. 14D, in one embodiment, the client manager 301 performs a number of simple validation checks, prior to forwarding the request, to ensure that the request is well-formed and has not been corrupted by errors in transmission.

As explained in the discussion of FIG. 3, in one embodiment, the cloud-based security platform 300 operates across the servers and networks of multiple cloud Infrastructure-as-a-service providers. Additionally, in one embodiment, the cloud-based security platform 300 provides service to multiple organizations (e.g., tenants) utilizing the FAFSS concurrently. Because multiple tenants route their requests through the same cloud-based security platform 300, that platform is able to route requests among the various clients and tenants. This routing allows a single client module 104A or 104B to obtain multiple Secure Enrollment Profiles (SEPs) with multiple tenant organizations, through the enrollment process discussed elsewhere in this disclosure (e.g., in conjunction with the explanation of FIGS. 6 and 8). To support these multiple concurrent users, the federation service 303 maintains a mapping of tenant identifiers and key spaces to the nodes in the mesh network of cloud-based security platform nodes.

Accordingly, at step 1443, the federation service 303 determines which cloud-based security platform node has the data to answer the client module's request (e.g., by determining the network address of the appropriate federation service 303 to handle the request). Specifically, in one embodiment, the federation service 303 maintains a database that maps each key space to the network address of the federation service 303 responsible for that key space. In one embodiment, the database may not be maintained locally to the federation service 303 (e.g., may be part of the data retention service 309, etc.) At step 1444, the federation service 303 forwards the request to the correct cloud-based platform node to answer the query. This node could be, but is not necessarily, the same node that initially received the request, in which case no forwarding operation takes place.

At step 1445, the correct federation service 303 generally forwards the request to the authorization service 304 to determine whether the client module 104A is authorized to make the request received by the cloud-based security platform 300 at step 1401. In various embodiments, at step 1446, the authorization service 304 requests data from the data retention service 309 to support its authorization of the request (e.g., device identifying information, historical device identifying information, etc.). Generally, that data is looked up and returned in steps 1447 and 1448, respectively. At step 1449, in one embodiment, the authorization service 304 considers the device identifying information reported in the request against a historical record of device identifying information to ensure that the electronic computing devices are the same. As will be understood, the authorization service 304 may consider a variety of identity and authentication factors as will occur to one skilled in the art (e.g., biometric information about the user, etc.). As shown at step 1450, if the device is authorized to make the request, then, in one embodiment, the request is forwarded to the policy service 305. If the device is not authorized to make the request (e.g., it could not be authenticated), then, in one embodiment at step 1451, the authorization service 304 returns an error indicating the request is unauthorized to the client manager 301. The client manager 301 generally returns that response to the client manager 301 at step 1461.

If the device is authorized, then, in various embodiments, the process 1400D continues at step 1452, wherein the policy service 305 sends a request to the enterprise manager 306 requesting the creation of one or more CBKs to encrypt items of data, per the request originating from the client module 104A. At step 1453, the enterprise manager 306, in one embodiment, routes that request to the appropriate key service 400 for generation of the CBK(s). Because an organization utilizing the FAFSS generally may have multiple key services in order to provide for high availability, better performance characteristics, or compliance with data residency laws, in one embodiment, the enterprise manager 306 maintains a mapping of tenants and key spaces to key services.

At step 1454, in various embodiments, the enterprise manager 306 receives the response from the key service, which may comprise the CBKs that were requested and encrypted (and, thus, securely enveloped) using the shared secret symmetric key established between the client module 104A and the key service 400 during the VBE process. Because, in one embodiment, the key service 400 resides on hardware controlled by the tenant organization using the FAFSS 100, the encryption of the CBKs ensures that only the client module 104A and the organization utilizing the FAFSS 100 have visibility into each CBK. The cloud-based security platform 300 and any other entity capable of observing the traffic on network 107 generally have no ability to recover and use the CBK. The key service generally also provides key tags (e.g., identifiers) for each of the encrypted CBKs, to be used in later identifying the correct CBK to decrypt the data object encrypted with the CBK. At step 1454, in one embodiment, the enterprise manager 306 forwards the response from the key service 400 to the policy service 305.

At step 1455, in various embodiments, the policy service 305 sends a record of the transaction to the analytics service 307 (e.g., number of keys created/provided, time, user, device identifier, etc.). Generally, the transmission of this request is asynchronous, and the policy service 305 does not wait for any output from steps 1456 or 1457 to continue on to step 1458. In one embodiment, steps 1456 and 1457 occur separately from and concurrently with the remainder of the process 1400D for requesting a new CBK. At step 1456, the analytics service 307, in one embodiment, receives the transaction record sent from the policy service 305. At step 1457, the analytics service 307, in one embodiment, ingests that record into a streaming graph system for the purpose of running supervised, semi-supervised, and unsupervised analytics.

At step 1458, the policy service 305 generally returns the CBK creation response (e.g., the generated CBKs, key tags, etc.) to the authorization service 304. At step 1459 in one embodiment, the authorization service 304 returns the same information to the federation service 303. At step 1460, the federation service 303, if applicable in one embodiment, routes the information back through the mesh network to cloud-based security platform nodes, to return the data to the correct client manager 301. At step 1461, the client manager 301 generally responds to the client module 104A with the CBK creation response. Generally, the routing that occurs at steps 1458 through 1461 may occur as based on information included in the request (e.g., the device identifying information, etc.).

Turning to FIG. 14E, the cloud-based security platform 300 executes exemplary sub-process 1400E in response to a client module request to retrieve one or more CBKs, as described in the discussion of FIGS. 6 and 11. It will be recalled that, in one embodiment, the client module 104B sends a request that includes 1) a tenant-specific device identifier, 2) device identifying information, and 3) the key tags the client module requests. Generally, items 2 and 3 are encrypted with the symmetric key established between the client modules 104A and 104B and the cloud-based security platform 300 as part of the enrollment process, describe elsewhere in this disclosure (e.g., in conjunction with the explanation of FIGS. 6 and 8).

At step 1462, the client manager 301, in one embodiment, forwards the request to the federation service 303. Although not shown in FIG. 14E, the client manager 301 may first perform a number of simple validation checks to ensure that the request is well-formed and has not been corrupted by errors in transmission.

As explained in the discussion of FIG. 3, the cloud-based security platform 300 operates across the servers and networks of multiple cloud Infrastructure-as-a-service providers. Additionally, in certain embodiments, the cloud-based security platform 300 provides service to multiple organizations (e.g., tenants) utilizing the FAFSS 100 concurrently. In one embodiment, because multiple tenants may route their requests through the same cloud-based security platform 300, that platform 300 is able to route requests among the various clients and tenants. This routing allows a single client module to obtain multiple Secure Enrollment Profiles (SEPs) with multiple tenant organizations, through the enrollment process discussed elsewhere in this disclosure. To support these multiple concurrent users, the federation service 303 maintains a mapping of tenant identifiers and key spaces to the nodes in the mesh network of cloud-based security platform nodes.

Accordingly, at step 1463, the federation service 303 determines which cloud-based security platform node has the data to answer the client module's request (e.g., the requested CBKs). Specifically, in one embodiment, the federation service 303 maintains a database that maps each key space to the network address of the federation service 303 responsible for that key space. Based on that mapping, at step 1464 in one embodiment, the federation service 303 forwards the request to the correct cloud-based platform node to answer the query. This node could be, but is not necessarily, the same node that initially received the request, in which case no forwarding operation takes place.

At step 1465, the federation service 303 generally forwards the request to the authorization service 304 to determine whether the client module 104B is authorized to make the request received by the cloud-based security platform at step 1401. Thus, in various embodiments at step 1466, the authorization service 304 requests data from the data retention service 309 to support its authorization of the request (e.g., device identifying information, etc.). That data is generally identified and returned at steps 1467 and 1468, respectively. At step 1469, in one embodiment, the authorization service 304 considers the device identifying information reported in the request against a historical record of device identifying information to ensure that the devices are the same. As will be understood, the authorization service 304 could consider a variety of identity and authentication factors as will occur to one skilled in the art (e.g., network IP address and user identifier, etc.). As shown at step 1470, if the device is authorized to make the request, then the request is generally forwarded to the policy service 305. If the device is not authorized to make the request (e.g., if it could not be authenticated), however, then, at step 1471 in one embodiment, the authorization service 304 returns an error indicating the request is unauthorized to the client manager 301. The client manager 301 generally returns that response to the client module 104B at step 1486.

If the device is authorized, then the process 1400E generally continues to step 1472. Although not shown in FIG. 14E, in one embodiment, the policy service 305 requests data from the data retention service 309, including the policy statements application to the client module's request. The policy service 305 may also send a request (at step 1473) to the enterprise manager 306 requesting the CBK(s) that the client manager 301 requested, along with any associated metadata (e.g., the metadata that was generated/stored when the CBK is created, as described elsewhere in this disclosure). The enterprise manager 306 generally returns a response with the CBKs and metadata at step 1474. In one embodiment, the CBKs are encrypted (that is, securely enveloped) using the symmetric key established between the client modules 104A and 104B and the key service 400 during the VBE process described elsewhere in this disclosure. Because the CBKs are encrypted with this symmetric key, the cloud-based security platform 300 and any third parties with access to network 107 generally remain blind to the CBK and cannot recover it for use in decrypting the encrypted version of the original text 115. The metadata is, in one embodiment, not encrypted, as the policy service 305 requires the metadata to render policy decisions.

As will be understood and appreciated, the policy service 305 is highly configurable. For example, the policy service 305 may condition the selection and release of application policy configurations based on a number of factors, including but not limited to, user identity, device identity, network location, application usage, time, location, and historical data. To obtain geographic information for consideration, the policy service 305 may request data from a geolocation service 1487 or other location-determination technology, as shown on FIG. 14E at steps 1476, 1477 and 1478. Although shown as one example, there is no limitation on the policy engine's ability to consume information from other external services to factor into policy decisions.

At step 1479, in various embodiments, in consideration of the policy rules determined by the organization utilizing the FAF SS 100 and the data gathered from the client module 104B, data retention service 309, and if applicable, other sources, such as but not limited to the geolocation service 1487, the policy service 305 determines whether the client module 104B satisfies the policy requirements to access the requested CBK(s). If the client module 104B requested multiple CBKs in a single request, then the policy service 305 may satisfy the policy requirements for some, all, or none of the requested CBKs.

At step 1480, the policy service 305, in one embodiment, sends a record of the transaction to the analytics service 307 (e.g., number of CBKs requested, resultant action, etc.). The transmission of this request is generally asynchronous, and the policy service 305 does not wait for any output from steps 1481 and 1482 to continue on to step 1483.

Generally, steps 1481 and 1482 occur separately from and concurrently with the remainder of the process 1400E for requesting one or more CBKs. At step 1481, the analytics service 307 receives the transaction record sent from the policy service 305. At step 1482, in one embodiment, it ingests that record into a streaming graph system for the purpose of running supervised, semi-supervised, and unsupervised analytics.

At step 1483 in various embodiments, the policy service 305 returns the CBK request response to the authorization service 304 (e.g., containing the CBKs if appropriate, etc.). At step 1484, the authorization service 304 generally returns the same information to the federation service 303. At step 1485, the federation service 303, if applicable, routes the information back through the mesh network to cloud-based security platform nodes, to return the data to the correct client manager 301. At step 1486, the client manager 301, in one embodiment, responds to the client module 104B with the CBK request response. Generally, the routing that occurs at steps 1483 through 1486 may occur as based on information included in the request (e.g., the device identifying information, etc.).

FIG. 15 illustrates a flowchart representing an exemplary key service process 1500 performed by the modules and software components that comprise an embodiment of the key service 400 for secure generation and storage of CBKs, as well as the symmetric keys used to secure CBKs while in transit between the key service 400 and the client modules 104A and 104B. Generally, a key service 400 may be maintained separately from the cloud-based security platform 300 to avoid intermingling of different tenant's data and to increase the security of the keys managed by the same.

Beginning at step 1501, the key service 400 receives a request (e.g., at the cloud platform communication manager 403), in one embodiment, from the cloud-based security platform 300 (e.g., the enterprise manager 306) corresponding to either CBK creation or retrieval. Generally, at step 1502, if the request is not to create a key (e.g., CBK), then the process 1500 continues to step 1503. If, however, the request is to create a key (e.g., in connection with an encryption process), then, in one embodiment, the process 1500 proceeds at step 1505, wherein the key management 404 module of the key service 400 uses a cryptographically secure random number generator within the cryptographic library 405 to create a CBK, as described in more detail in the discussion on FIG. 5, and a key tag to identify the particular CBK. At step 1506, the key service 400 writes the CBK and associated metadata to its storage system 405. The key service 400 generally stores the metadata associated with the CBK so that the metadata may later be provided to the policy service 305 to assist in rendering policy decisions.

At step 1507, the key service 400, in one embodiment, encrypts the CBK using a symmetric key established with the client module 104A during the VBE process 700 or 800, using cryptographic algorithms provided by the cryptographic library 405, as described in the discussions of FIGS. 7 and 8. Generally, this encryption step (e.g., 1507) ensures that only the intended client module 104A can access the CBK. Although the cloud-based security platform 300 orchestrates the movement of keys and applies policy controls, in one embodiment, it has no access to the CBKs themselves. Similarly, a third party with access to a network 107 may also be unable to retrieve the CBKs necessary to decrypt the encrypted version of the original data 115. The CBKs and their associated (unencrypted) key tags are returned to the cloud-based security platform 300 at step 1504. At step 1503, the key service 400 generally determines whether the request is to fetch/retrieve a CBK (e.g., the request contains a valid key tag). If not, the process 1500 continues at step 1504, sending an error message back the enterprise manager 306 that its request was invalid (not shown on FIG. 15). If the request is to fetch an existing CBK (e.g., in connection with a decryption process), then, in one embodiment, the process continues at step 1508, wherein the key service uses the key tag contained within the request to retrieve the corresponding CBK from key storage 407, along with the metadata related to that CBK (at step 1509). At step 1510, the key management module 404 uses the cryptographic library 405, in various embodiments, to encrypt the CBK(s) using the symmetric key shared with the client module 104B. Because the CBKs are encrypted, although the cloud-based security platform 300 orchestrates the movement of the keys to client modules 104B, it has no insight into the keys. Similarly, a third party with access to the network 107 will not be able to recover the CBK and use it to decrypt the encrypted version of original data 115. At step 1504, the encrypted CBK and the unencrypted metadata are returned to the enterprise manager 306, and the process 1500 ends thereafter.

FIG. 16 shows a flowchart representing an exemplary enrollment service process 1600 performed by the modules and software components that comprise an embodiment of the enrollment service 201. Generally, the purpose of process 1600 is to enroll client modules 104A and 104B with the enrollment service 201 and key service 400 hosted on the tenant's server hardware. The enrollment service 201, in one embodiment, may reside on server hardware provided by a utilizing organization.

At step 1601, the enrollment service 201 generally determines whether the request is from a system administrator selecting users for silent enrollment (e.g., as described in association with the description of FIG. 7). If not, the process 1600 generally continues at step 1602. If the request corresponds to silent enrollment, then, in one embodiment, the enrollment service 201 generates a silent VBE token at step 1604. In various embodiments, the token may comprise a randomly-selected alphanumeric string of sufficient length and complexity as to make it unlikely that another entity could reproduce the same string with random guesses. Generally, the token is used later, as described in the discussion of FIG. 7, by the client module to show that the request to enroll was authorized by an organization's system administrators. At step 1605, the enrollment service 201 stores, in one embodiment, the associations between the users selected for silent enrollment and the silent enrollment tokens generated in step 1604 (e.g., identifying which tokens correspond to which users). The enrollment service 201 generally returns the token to the administrator at step 1606. As noted in the discussion of FIG. 7, the administrator may pre-place the token in installations of client modules 104A and 104 B to make that token available for the client modules' use during enrollment.

At step 1602, the enrollment service 201 determines whether the request is an interactive session with a user trying to authenticate as part of an interactive VBE enrollment, as was described in the discussion of FIG. 8. If not, the process 1600 generally continues at step 1603. If the request corresponds to interactive enrollment, then, in one embodiment, the process 1600 proceeds at step 1607, wherein the enrollment service 201 determines whether the user has authenticated himself/herself correctly. If the user is unsuccessful in authenticating, then the process 1600 ends thereafter. Although not shown in FIG. 16, as one skilled in the art would expect, there may be an error message returned to the user warning of the failed authentication. If the user authenticates successfully, then, in one embodiment, the process 1600 continues at step 1608.

At step 1608, the enrollment service 201, in various embodiments, generates a token, an alphanumeric string of sufficient length, complexity, and randomness that a third party is unlikely to reproduce it without knowledge of the token. At step 1609, the service 201 stores this token along with the user's identity and authentication information for later use at step 1616. The service 201 generally communicates (e.g., emails) the token to the user at step 1610 as an extra step of validation of the user's identity that relies on an out of band communications method other than the FAFSS system 100 itself. It will be understood and appreciated by one skilled in the art that although the present embodiment uses email, this token could be sent by any other out of band communications medium that allows the service to send an alphanumeric string to the user, such as a text message or a private message through a collaboration web application.

At step 1611, the enrollment service 201, in one embodiment, sends a reply to the client module 104A and 104B. The reply generally includes the identity and authentication information resulting from the user's successful authentication. The enrollment service 201 also sends a copy of the public key in its public/private key pair to the client module 104A and 104B. As discussed in greater detail in relation to FIG. 8, the client module 104A and 104B later uses this key to ensure that its enrollment request is readable only to the enrollment service 201.

At step 1603, the enrollment service 201 determines whether the request is an enrollment package received through the cloud-based security platform 300. In one embodiment, this determination is based on the URL used to submit the request to the enrollment service 201. If the request is not an enrollment package, then, in one embodiment, the enrollment service 201 replies with an error (not shown on FIG. 16) and ends its processing of that request. If the request is an enrollment request, at step 1612, then the enrollment service 201 generally checks the structure of the package to ensure that it has not been corrupted in the course of transmission to the enrollment service 201.

At step 1613, the enrollment service 201, in one embodiment, attempts to decrypt the payload of the request using its private key. As discussed in connection with FIGS. 7 and 8, the client module 104A and 104B encrypts portions of its request with the enrollment service's public key to ensure that any other entities, including the cloud-based security platform 300, that observe the request are unable to access some of the information sent to the enrollment service 201. If the data does not decrypt successfully at step 1613, then the process 1600 generally ends. If the data does decrypt successfully, then, in one embodiment, the process 1600 continues at step 1614.

At step 1614, the enrollment service 201 extracts the user's identification information and the client module's session public key from the payload that was decrypted at step 1613. Generally, the enrollment service 201 uses the client module's session public key to verify the wrapped payload's signature. If the signature verification fails, then, in one embodiment, the enrollment service 201 halts the enrollment process 1600. Although not shown in FIG. 16, it will be expected by one skilled in the art that the enrollment service 201 logs the event and returns an error message. If the signature validates successfully, then, in one embodiment, the process 1600 continues at step 1615.

At step 1615, the enrollment service 201 extracts the user's authentication information and VBE token from the identity information decrypted at step 1613. At step 1616, the enrollment service 201 generally verifies that the user identity and authentication information, as well as the VBE token, match the values that were previously stored at step 1609. A match generally indicates that this enrollment package belongs to a user who successfully authenticated with the enrollment service 201 and, thus, has the authorization to enroll a new device under the tenant. If the identity and authentication information or the token do not match, then the enrollment package lacks the authorization to proceed, and the process 1600 ends. Thought not shown on FIG. 16, the enrollment service 201 will provide appropriate login, auditing, alerts, and error messages. In one embodiment, after verification, the process continues at step 1617.

At step 1617, the enrollment service 201 generates a symmetric key for use in securing future communications with the client modules 104A and 104B. Among other purposes, this symmetric key is used to protect the CBKs that are transferred between the key service 400 and the client modules 104A and 104B. Though not shown in FIG. 16, the enrollment service 201 stores this symmetric key in the key service 400, associated with the tenant-specific device ID enrolling, such that the key service 400 has access to the key for later operations. The enrollment service 201 generally encrypts this symmetric key using the public session key for the client device included in its request and decrypted at step 1613. Also included in the enrollment service's response are a user ID for the user requesting enrollment, a tenant-specific device ID, and the public session key for the client manager 301. This response is returned to the cloud-based security platform 300, which continues its own process as described in detail in the discussion of FIG. 14B.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method, comprising the steps of:
receiving, at a server, a request for encryption of data from an electronic computing device being operated by a user;
determining, at the server, a particular key space corresponding to the user and/or the electronic computing device based on the request for encryption, wherein the particular key space comprises a partitioned storage location that contains at least one encryption key;
transmitting the request for encryption from the server to a particular key service corresponding to the determined particular key space for generation of unique cryptographic information relating particularly to the request for encryption, wherein the particular key service provides functionalities of at least encryption key generation and/or encryption key storage;
receiving, at the server, the unique cryptographic information from the particular key service, wherein the unique cryptographic information comprises an encryption key uniquely corresponding to the request for encryption; and
transmitting the unique cryptographic information from the server to the electronic computing device for unique encryption of the data.

2. The method of claim 1, wherein the request for encryption comprises identifying information that uniquely identifies the electronic computing device and/or the user of the electronic computing device.

3. The method of claim 2, wherein the identifying information is selected from the group comprising a nonce, a device ID, and a hardware fingerprint hash.

4. The method of claim 2, wherein the user and/or electronic computing device is associated with a particular tenant.

5. The method of claim 4, wherein the determining step comprises analyzing the identifying information to determine the particular tenant and then identifying the particular key space associated with the particular tenant.

6. The method of claim 2, wherein the server comprises one or more federation services.

7. The method of claim 6, wherein the step of determining the particular key space corresponding to the electronic computing device further comprises the steps of:
extracting the identifying information from the request for encryption;
determining, based on the extracted identifying information, a particular federation service corresponding to the user and/or the electronic computing device for authenticating the request for encryption;
transmitting the request for encryption to the determined particular federation service for authenticating the request for encryption;
authenticating, based on the identifying information, the request for encryption; and
determining, based on the authenticated request for encryption and the extracted identifying information, the particular key space corresponding to the user and/or the electronic computing device.

8. The method of claim 1, wherein the step of determining the particular key space corresponding to the user and/or the electronic computing device further comprises the step of determining, based on the particular key space, the particular key service corresponding to the determined particular key space.

9. The method of claim 1, wherein the particular key service is managed separately from the server.

10. The method of claim 1, wherein the server has no access to data maintained in the particular key service.

11. The method of claim 1, wherein the server comprises a cloud-based security platform.

12. The method of claim 1, wherein the particular key service generates the unique cryptographic information according to one or more predefined rules.

13. The method of claim 1, wherein the request for encryption of data and the unique cryptographic information are securely enveloped.

14. The method of claim 1, wherein the electronic computing device encrypts the request for encryption data prior to transmitting the request for encryption to the server.

15. The method of claim 14, wherein the particular key service decrypts the request for encryption prior to generating the unique cryptographic information.

16. The method of claim 1, wherein the particular key service encrypts the unique cryptographic information prior to transmitting the unique cryptographic information to the server.

17. The method of claim 16, wherein the electronic computing device decrypts the unique cryptographic information prior to using the unique cryptographic information to uniquely encrypt the data.

18. The method of claim 1, wherein the unique cryptographic information further comprises a key tag.

19. The method of claim 18, wherein the encryption key uniquely corresponding to the request for encryption comprises a context-based key.

20. The method of claim 18, wherein the key tag comprises a context-based key identifier.

21. The method of claim 1, wherein the request for encryption includes contextual information relating to creation of the data.

22. The method of claim 21, wherein the unique cryptographic information is associated with the contextual information.

23. The method of claim 21, wherein the unique cryptographic information corresponds to the request for encryption and is used solely to encrypt the data relating to the request for encryption.

24. The method of claim 21, wherein the contextual information is selected from the group comprising: a user identifier associated with a user entering the data, a user identifier of a user interacting with the data, a session identifier, a time instant at which the data was generated, a time instant at which the data was accessed, an electronic computing device identifier, an application program identifier, a tenant identifier, a network address.

25. The method of claim 1, wherein subsequent decryption of the data is dependent upon one or more predefined policies.

26. The method of claim 1, wherein the unique cryptographic information is used for a subsequent auditing function.

27. A system, comprising:
an electronic computing device that generates or receives data and is associated with a user, wherein the electronic computing device generates a request for encryption of the data and transmits the request for encryption to a server;
the server that receives the request for encryption from the electronic computing device, wherein the sever determines a particular key space corresponding to the user and/or the electronic computing device based on the request for encryption, wherein the particular key space comprises a partitioned storage location that contains at least one encryption key, and transmits the request for encryption to a particular key service corresponding to the determined particular key space, wherein the particular key service provides functionalities of at least encryption key generation and/or encryption key storage;
the particular key service that receives the request for encryption from the server, wherein the particular key service generates unique cryptographic information relating particularly to the request for encryption and transmits the unique cryptographic information to the server, wherein the unique cryptographic information comprises an encryption key uniquely corresponding to the request for encryption;
the server that receives the unique cryptographic information from the particular key service, wherein the server transmits the unique cryptographic information to the electronic computing device; and
the electronic computing device that receives the unique cryptographic information from the server, wherein the electronic computing device uniquely encrypts the data using the unique cryptographic information.

28. The system of claim 27, wherein the request for encryption comprises identifying information that uniquely identifies the electronic computing device and/or the user of the electronic computing device.

29. The system of claim 27, wherein the server comprises a cloud-based security platform.

30. The system of claim 27, wherein the particular key service is managed separately from the server.

* * * * *